(12) United States Patent
Pei et al.

(10) Patent No.: US 12,555,341 B2
(45) Date of Patent: Feb. 17, 2026

(54) RAPID GENERATION OF CUSTOM-FIT GARMENT PATTERNS FROM 3D BODY SCANS

(71) Applicant: CORNELL UNIVERSITY, Ithaca, NY (US)

(72) Inventors: Jie Pei, Greenville, TX (US); Susan P. Ashdown, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 39 days.

(21) Appl. No.: 18/566,240

(22) PCT Filed: Jun. 3, 2022

(86) PCT No.: PCT/US2022/032071
§ 371 (c)(1),
(2) Date: Dec. 1, 2023

(87) PCT Pub. No.: WO2022/256598
PCT Pub. Date: Dec. 8, 2022

(65) Prior Publication Data
US 2025/0046038 A1 Feb. 6, 2025

Related U.S. Application Data

(60) Provisional application No. 63/196,409, filed on Jun. 3, 2021.

(51) Int. Cl.
*G06T 19/20* (2011.01)
*G06T 7/11* (2017.01)
(Continued)

(52) U.S. Cl.
CPC .............. *G06T 19/20* (2013.01); *G06T 7/11* (2017.01); *G06T 7/74* (2017.01); *G06T 11/203* (2013.01);
(Continued)

(58) Field of Classification Search
CPC ... G06T 19/20; G06T 7/11; G06T 7/74; G06T 11/203; G06T 2200/24; G06T 2207/30196;
(Continued)

(56) References Cited

U.S. PATENT DOCUMENTS 3,907,310 A 9/1975 Dufour
6,564,118 B1 5/2003 Swab
(Continued)

FOREIGN PATENT DOCUMENTS

EP 3085822 A1 10/2016
EP 3252687 A1 12/2017
(Continued)

OTHER PUBLICATIONS

Brownbridge et al. (NPL), 2013, "Effectiveness of 3D Scanning in Establishing Sideseam Placement for Pattern Design" (Year: 2013).*
(Continued)

*Primary Examiner* — Daniel F Hajnik
*Assistant Examiner* — Adeel Bashir
(74) *Attorney, Agent, or Firm* — Scully, Scott, Murphy & Presser, P.C.

(57) ABSTRACT

Methods, device, system and one or more computer readable media having one or more computer programs with instructions to generate custom-fit garment patterns from a 3D body scan are disclosed. The patterns may be obtained by unwrapping the 3D body scan (3D image) into 2D using defined datapoints associated with the surface of a body in a target region. Patterns may be generated for different types of garments. The custom-fit garment patterns generated from the 3D body scan may be basic patterns, which may be further customized or modified as desired.

32 Claims, 50 Drawing Sheets
(46 of 50 Drawing Sheet(s) Filed in Color)

(51) Int. Cl.
    *G06T 7/73*         (2017.01)
    *G06T 11/20*      (2006.01)

(52) U.S. Cl.
    CPC .............. *G06T 2200/24* (2013.01); *G06T 2207/30196* (2013.01); *G06T 2207/30204* (2013.01); *G06T 2210/16* (2013.01); *G06T 2219/2004* (2013.01); *G06T 2219/2016* (2013.01); *G06T 2219/2021* (2013.01)

(58) Field of Classification Search
    CPC ....... G06T 2207/30204; G06T 2210/16; G06T 2219/2004; G06T 2219/2016; G06T 2219/2021; G06T 2215/08; G06T 15/10; G06V 20/647; G06V 40/10
    See application file for complete search history.

(56) References Cited

U.S. PATENT DOCUMENTS

| | | | |
|---|---|---|---|
| 6,654,046 | B2 | 11/2003 | Eccleshall |
| 6,968,075 | B1 | 11/2005 | Chang |
| 7,584,122 | B2 | 9/2009 | Kozinn |
| 9,345,280 | B2 | 5/2016 | Selvarajan |
| 9,695,529 | B2 | 7/2017 | Ng et al. |
| 9,820,519 | B2 | 11/2017 | Jung et al. |
| 10,664,629 | B2 | 5/2020 | Gupta et al. |
| 11,244,223 | B2 | 2/2022 | Sareen et al. |
| 2002/0103566 | A1 | 8/2002 | Gadson |
| 2013/0083065 | A1 | 4/2013 | Schulze |
| 2013/0315475 | A1 | 11/2013 | Song et al. |
| 2014/0277663 | A1 | 9/2014 | Gupta et al. |
| 2015/0302597 | A1 | 10/2015 | Bentson |
| 2017/0205801 | A1 | 7/2017 | Manning et al. |
| 2018/0087196 | A1 | 3/2018 | Jeon |
| 2018/0253508 | A1 | 9/2018 | Gupta et al. |
| 2018/0263324 | A1 | 9/2018 | Anderson |
| 2019/0122424 | A1 | 4/2019 | Moore et al. |
| 2019/0150526 | A1 | 5/2019 | Lehna et al. |
| 2019/0350287 | A1 | 11/2019 | Litchfield |
| 2020/0349758 | A1 | 11/2020 | Paulson et al. |
| 2021/0350649 | A1 | 11/2021 | Ju |

FOREIGN PATENT DOCUMENTS

| | | |
|---|---|---|
| JP | H08325821 A | 12/1996 |
| JP | H09147002 A | 6/1997 |
| JP | 2001109789 A | 4/2001 |
| JP | 2001262416 A | 9/2001 |
| JP | 2007138317 A | 6/2007 |
| JP | 2014071878 A | 4/2014 |
| JP | 2017076400 A | 4/2017 |
| JP | 2017166114 A | 9/2017 |
| JP | 2017226947 A | 12/2017 |
| JP | 2018049590 A | 3/2018 |
| WO | 2018152763 A1 | 8/2018 |
| WO | 2019021349 A1 | 1/2019 |
| WO | 2020093090 A1 | 5/2020 |

OTHER PUBLICATIONS

Ashdown et al. (NPL), 2008, "Automated side-seam placement from 3D body scan data" (Year: 2008).*
Yunchu et al. (NPL), 2007, "Prototype garment pattern flattening based on individual 3D virtual dummy" (Year: 2007).*
Choi et al. (NPL), 2007, "A Method for Garment Pattern Generation by Flattening 3D Body Scan Data" (Year: 2007).*
Decaudin et al. (NPL), 2006, "Virtual Garments: A Fully Geometric Approach for Clothing Design" (Year: 2006).*
Okabe, H. et al., "Three dimensional apparel CAD system", Computer Graphics, Jul. 1992, pp. 105-110, vol. 26, No. 2.
McCartney, J. et al., "Dedicated 3D CAD for garment modelling", Journal of Materials Processing Technology, 2000, pp. 31-36, vol. 107, Nos. 1-3.
Kim, S. et al., "Garment pattern generation from body scan data", Computer-Aided Design, 2002, pp. 611-618, vol. 35, No. 7.
Wang, C. et al., "Surface flattening based on energy model", Computer-Aided Design, 2002, pp. 823-833, vol. 34, No. 11.
Wang, C. et al., "Design automation for customized apparel products", Computer-aided design, 2005, pp. 675-691, vol. 37, No. 7.
Zhong, Y. et al., "A physically based method for triangulated surface flattening", Computer-Aided Design, 2006, pp. 1062-1073, vol. 38, No. 10.
Jeong, Y. et al., "3D pattern construction and its application to tight-fitting garments for comfortable pressure sensation", Fibers and polymers, 2006, pp. 195-202, vol. 7, No. 2.
Kim, S. et al., "Basic garment pattern generation using geometric modeling method", International Journal of Clothing Science and Technology, 2007, pp. 7-17, vol. 19, No. 1.
Meng, Y. et al., "Computer aided clothing pattern design with 3D editing and pattern alteration", Computer-Aided Design, 2012, pp. 721-734, vol. 44, No. 8.
Wang, J. et al., "Customer participating 3D garment design for mass personalization", Textile Research Journal, 2011, pp. 187-204, vol. 81, No. 2.
Hinds, B. et al., "Pattern development for 3D surfaces", Computer-aided design, 1991, pp. 583-592, vol. 23, No. 8.
Levy, B. et al., "Least squares conformal maps for automatic texture atlas generation", ACM transactions on graphics (TOG), Jul. 2002, pp. 362-371, vol. 21, No. 3.
Sheffer, A. et al., "ABF++: fast and robust angle based flattening", ACM Transactions on Graphics (TOG), 2005, pp. 311-330, vol. 24, No. 2.
Fontana, M. et al., "3D virtual apparel design for industrial applications", Computer-Aided Design, 2005, pp. 609-622, vol. 37, No. 6.
Choi, Y. et al., "A method for garment pattern generation by flattening 3D body scan data", International Conference on Digital Human Modeling, 2007, pp. 803-812.
Huang, H. et al., "Automatic Block pattern generation from a 3D unstructured point cloud", Research Journal of Textile and Apparel, 2010, pp. 26-37, vol. 14, No. 1.
Huang, H., "Development of 2D block patterns from fit feature-aligned flattenable 3D garments", Feb. 2011, Doctoral dissertation, The Hong Kong Polytechnic University, pp. 1-297.
Huang, H. et al., "Block pattern generation: From parameterizing human bodies to fit feature-aligned and flattenable 3D garments", Computers in Industry, 2012, pp. 680-691, vol. 63, No. 7.
Decaudin, P. et al., "Virtual garments: A fully geometric approach for clothing design", Computer Graphics Forum, Sep. 2006, pp. 625-634, vol. 25, No. 3.
Volino, P. et al., "Simple linear bending stiffness in particle systems", Proceedings of the 2006 ACM SIGGRAPH/Eurographics symposium on Computer animation, Sep. 2006, pp. 101-105.
Lu, J. M. et al., "The development of an intelligent system for customized clothing making", Expert Systems with Applications, 2010, pp. 799-803, vol. 37, No. 1.
Daanen, H. et al., "Made-to-measure pattern development based on 3D whole body scans", International Journal of Clothing Science and Technology, 2008, pp. 15-25, vol. 20, No. 1.
Yang, Y. et al., "Investigating the development of digital patterns for customized apparel", International Journal of Clothing Science and Technology, 2007, pp. 167-177, vol. 19, No. 3/4.
Satam, D. et al., "Intelligent design systems for apparel mass customization", The Journal of The Textile Institute, 2011, pp. 353-365, vol. 102, No. 4.
Yunchu, Y. et al., 'Prototype garment pattern flattening based on individual 3D virtual dummy', International Journal of Clothing Science and Technology, 2007, pp. 334-348, vol. 19.
Kim, C. et al., "Automatic basic garment pattern generation using three-dimensional measurements", International Journal of Clothing Science and Technology, 2010, pp. 101-113.
Kang, T. et al., "Optimized garment pattern generation based on three-dimensional anthropometric measurement", International Journal of Clothing Science and Technology, 2000, pp. 240-254.

(56) References Cited

OTHER PUBLICATIONS

Cho, Y. et al., "Computerized pattern making focus on fitting to 3D human body shapes", International Journal of Clothing Science and Technology, 2010, pp. 16-24.

* cited by examiner

Fig. 6
Determine Average with Respect to First Direction
S600
↓
Determine Average with Respect to Second Direction
S602
↓
Define Central Axis
S604
Fig. 7A
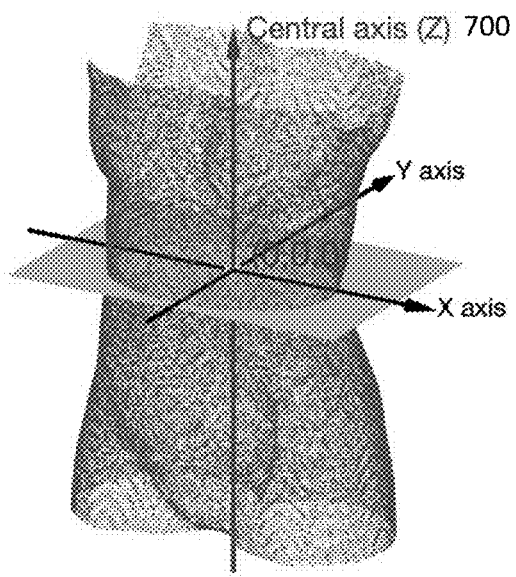
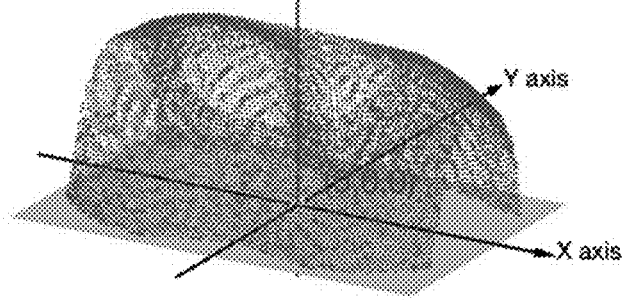
Fig. 7B

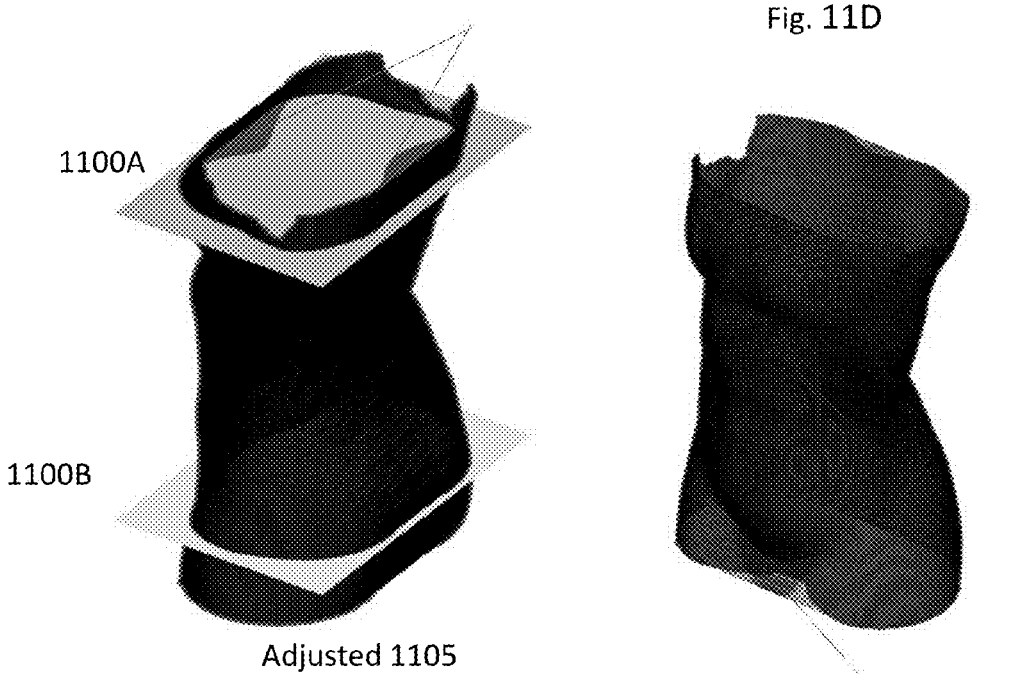
Fig. 11A  Adjusted 1105
1100A
1100B
Adjusted 1105
Fig. 11D
Garment 1150
Fig. 11B
1100A
Original
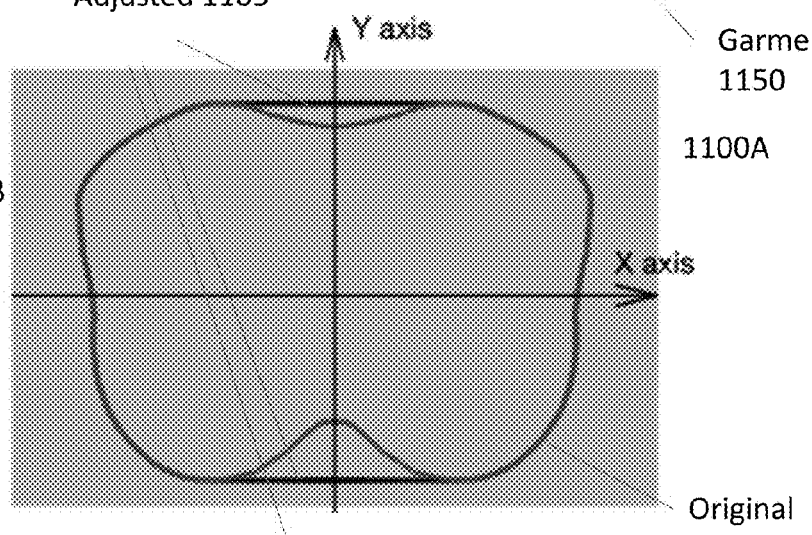
Fig. 11C
1100B
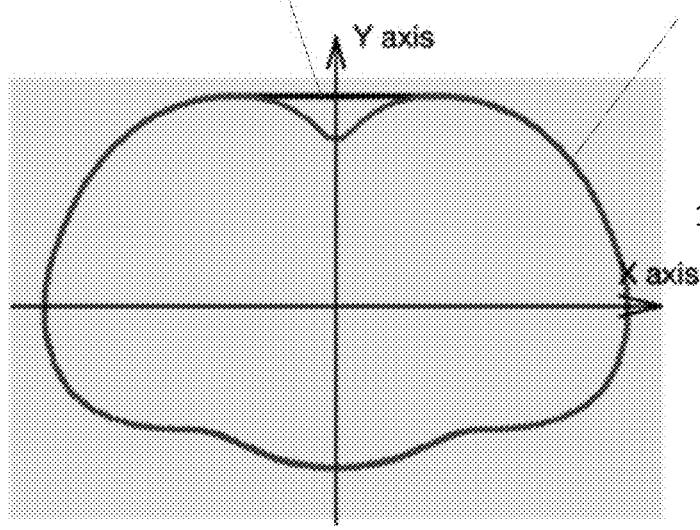

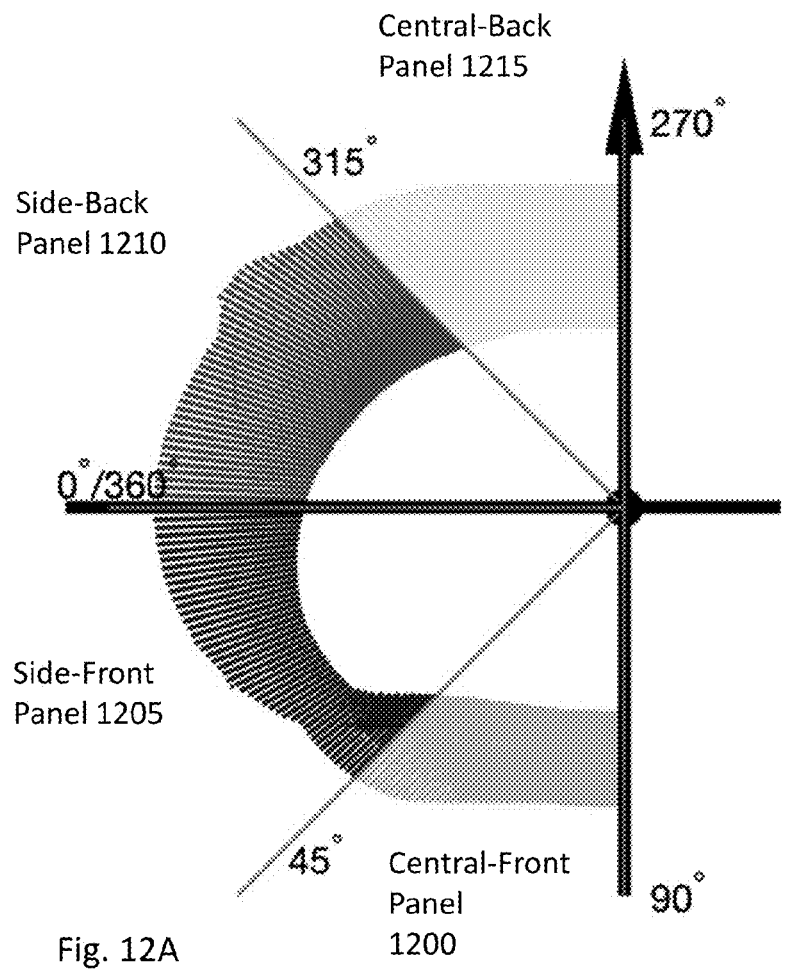
Fig. 12A
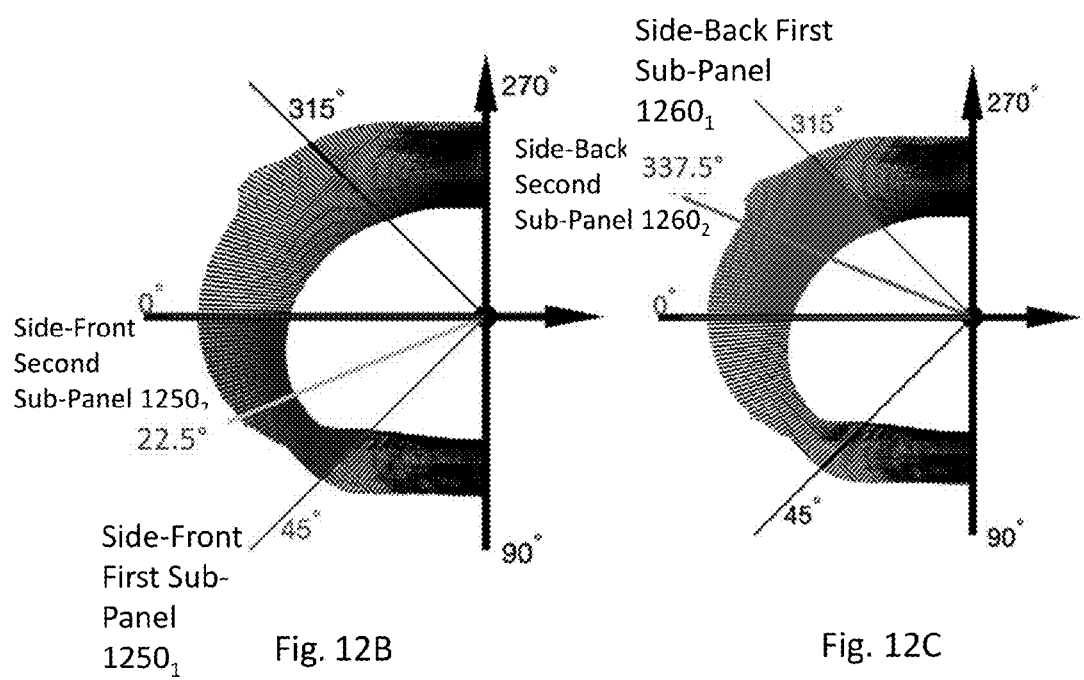
Fig. 12B
Fig. 12C

Central-Front
Panel 1200

Central-Back
Panel 1215

Fig. 15A
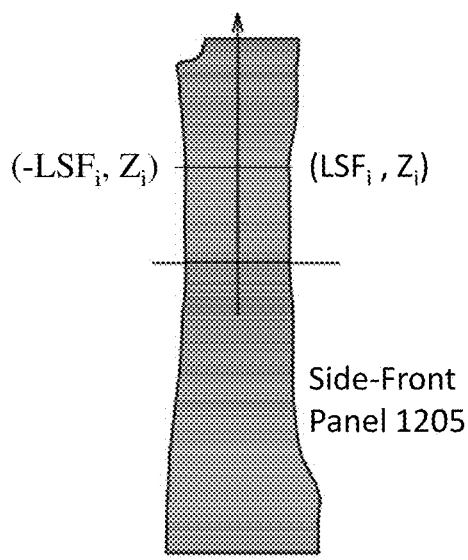
$(-LSF_i, Z_i)$  $(LSF_i, Z_i)$
Side-Front
Panel 1205
Fig. 15B
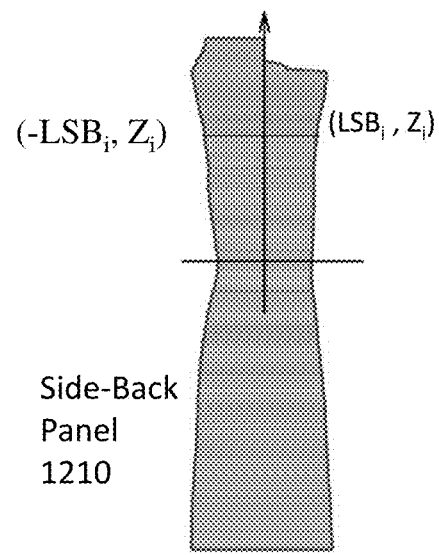
$(-LSB_i, Z_i)$  $(LSB_i, Z_i)$
Side-Back
Panel
1210
Shifted
Portion
1500
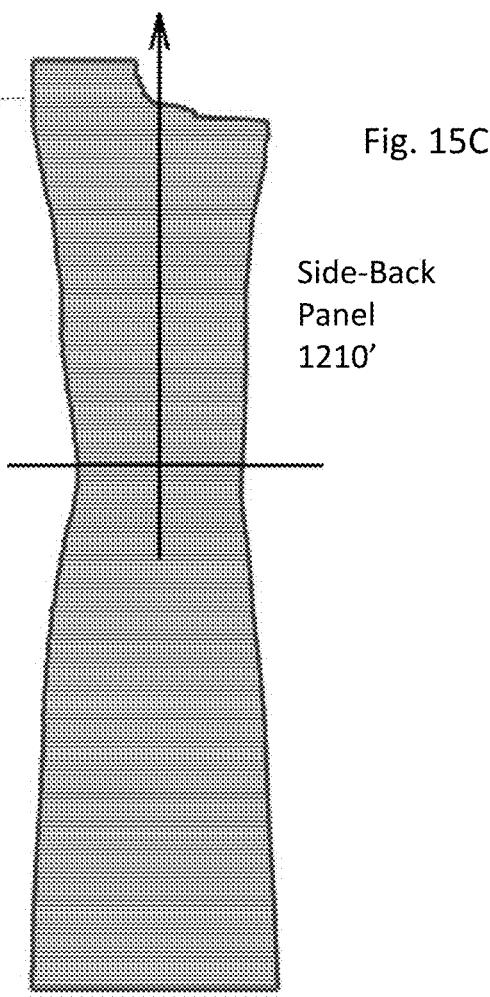
Fig. 15C
Side-Back
Panel
1210'

Side-Front Combination 2700

Central-Back Combination 2715

Side-Back Combination 2710

Central-Front Combination 2705

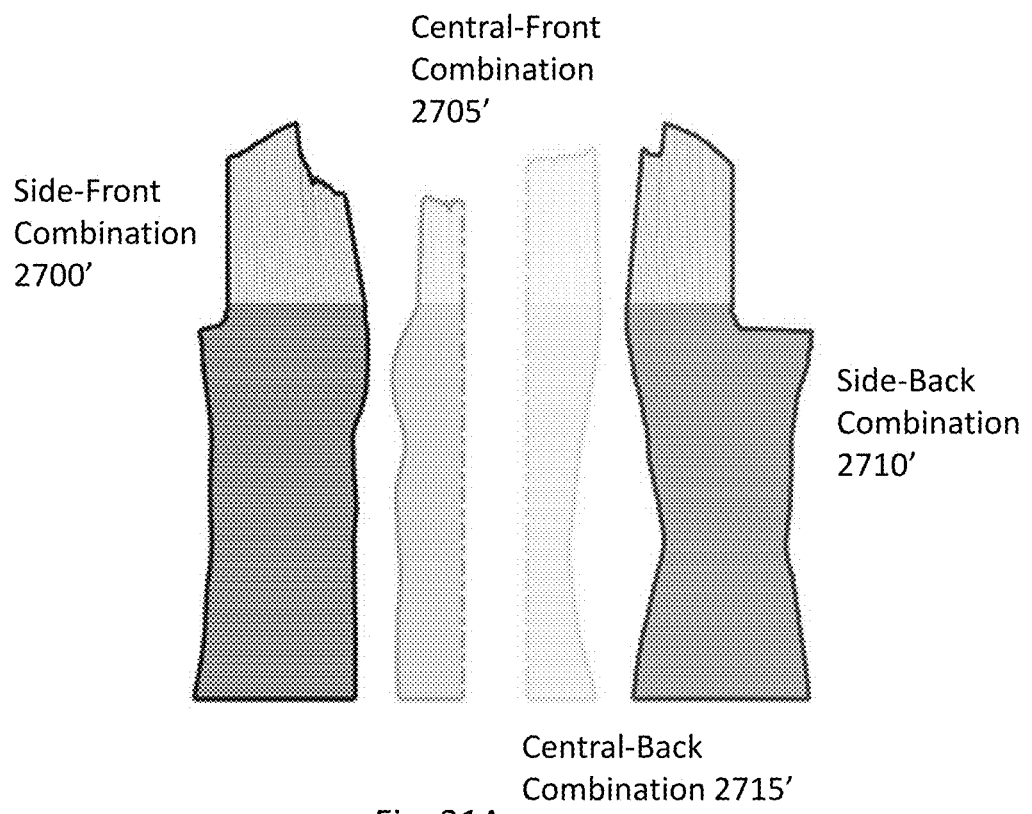
Fig. 31A
Fig. 31B
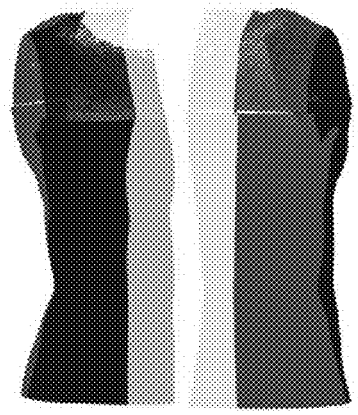

Fig. 34

| | polar coordinates on the original scan | coordinates on the modified scan |
|---|---|---|
| Slice 1 | $r=10, \phi=10°, z=z\_max$ | $r=10, \phi=10°, z=z\_max$ |
| Slice 2 | $r=11, \phi=10°, z=z_2$ | $r=11, \phi=10°, z=z_2$ |
| Slice 3 | $r=15, \phi=10°, z=z_3$ | $r=15, \phi=10°, z=z_3$ |
| Slice 4 | $r=21, \phi=10°, z=z_4$ | $r=21, \phi=10°, z=z_4$ |
| Slice 5 | $r=16, \phi=10°, z=z_5$ | $r=21, \phi=10°, z=z_5$ |
| Slice 6 | $r=14, \phi=10°, z=z_6$ | $r=21, \phi=10°, z=z_6$ |
| Slice 7 | $r=15, \phi=10°, z=z_7$ | $r=21, \phi=10°, z=z_7$ |
| Slice 8 | $r=18, \phi=10°, z=z_8$ | $r=21, \phi=10°, z=z_8$ |
| Slice 9 | $r=21, \phi=10°, z=z_9$ | $r=21, \phi=10°, z=z_9$ |
| Slice 10 | $r=24, \phi=10°, z=z_{10}$ | $r=24, \phi=10°, z=z_{10}$ |
| Slice 11 | $r=28, \phi=10°, z=z_{11}$ | $r=28, \phi=10°, z=z_{11}$ |
| Slice 12 | $r=21, \phi=10°, z=z_{12}$ | $r=28, \phi=10°, z=z_{12}$ |
| ... | ... | ... |
| Slice 200 (bottom slice) | $r=37, \phi=10°, z=z\_min$ | $r=r\_max, \phi=10°, z=z\_min$ |

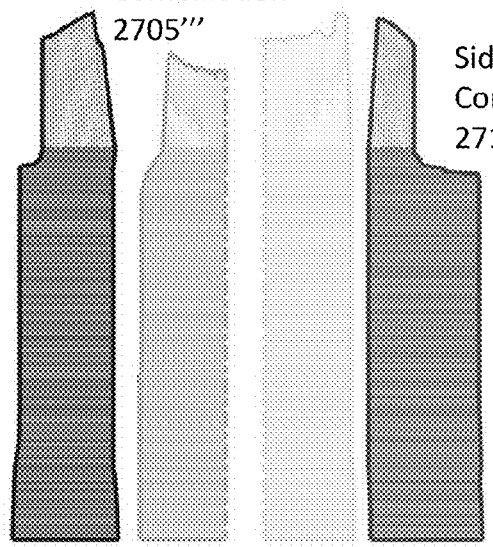

Fig. 35A

Central-Front Combination 2705'''

Side-Back Combination 2710'''

Side-Front Combination 2700'''

Central-Back Combination 2715'''

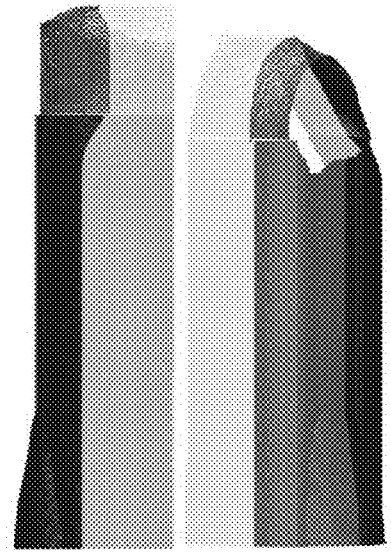

Fig. 35B

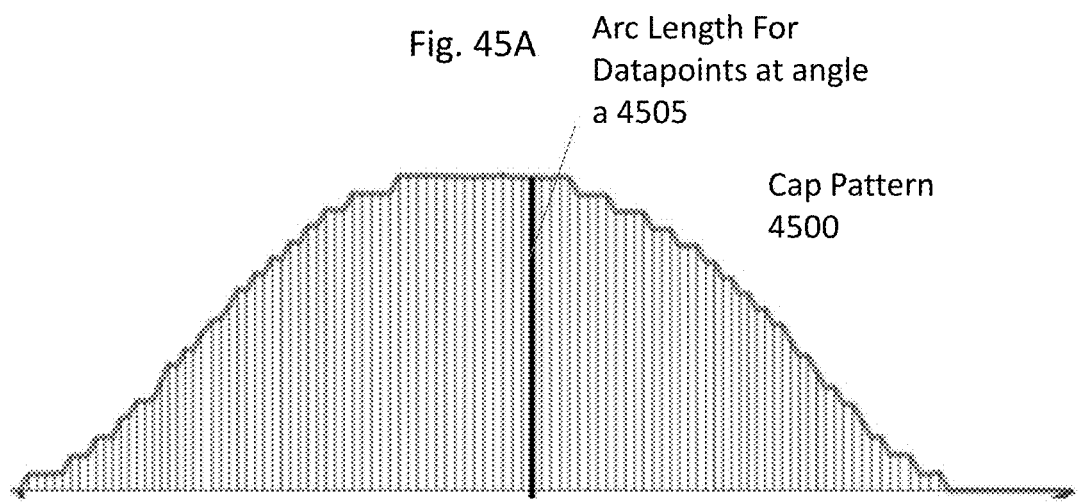
Fig. 45A  Arc Length For Datapoints at angle a 4505
Cap Pattern 4500
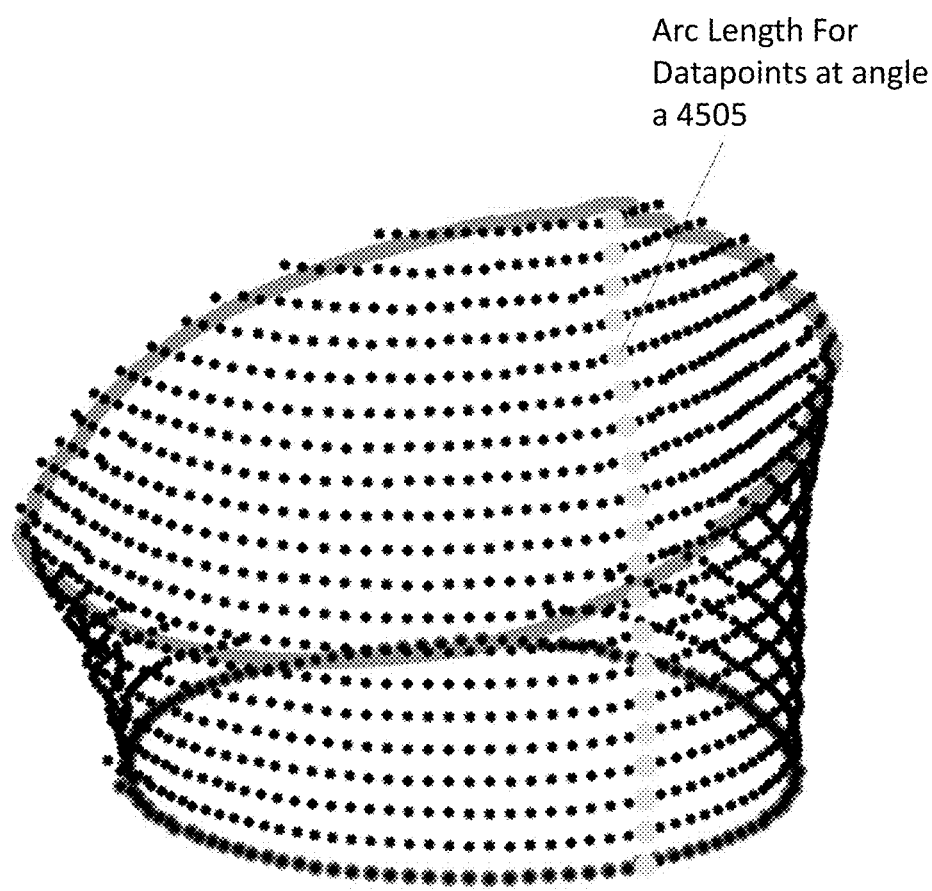
Arc Length For Datapoints at angle a 4505
Fig. 45B Custom-fit sleeve pattern 4600

Custom-fit sleeve pattern 4600

Custom-fit sleeve pattern with Ease 4600′

Fig. 47A
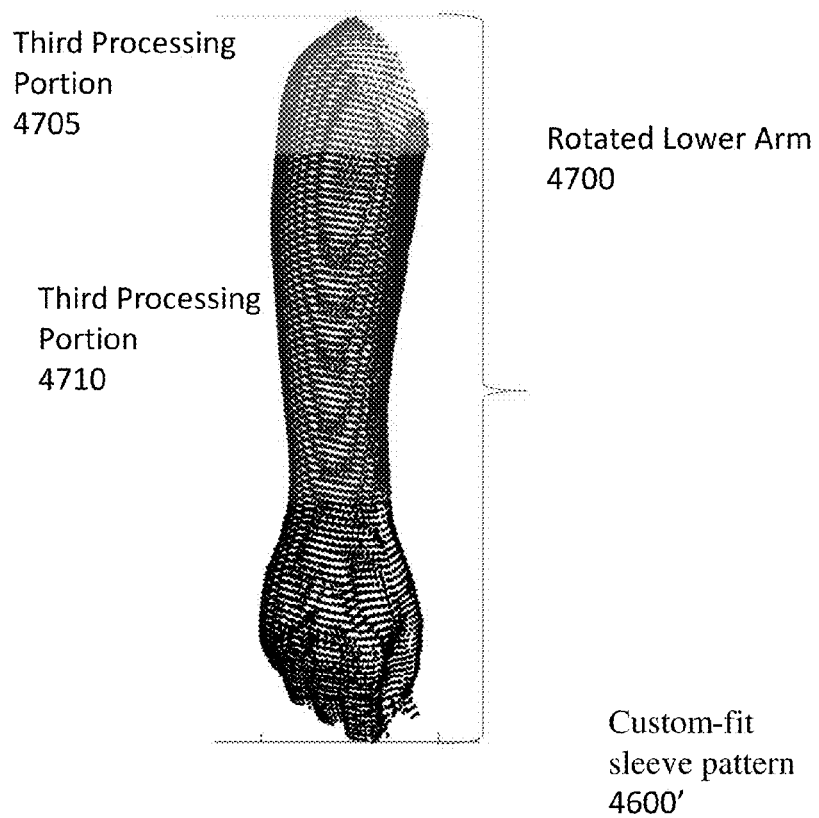
Third Processing Portion 4705
Third Processing Portion 4710
Rotated Lower Arm 4700
Custom-fit sleeve pattern 4600'
Fig. 47B
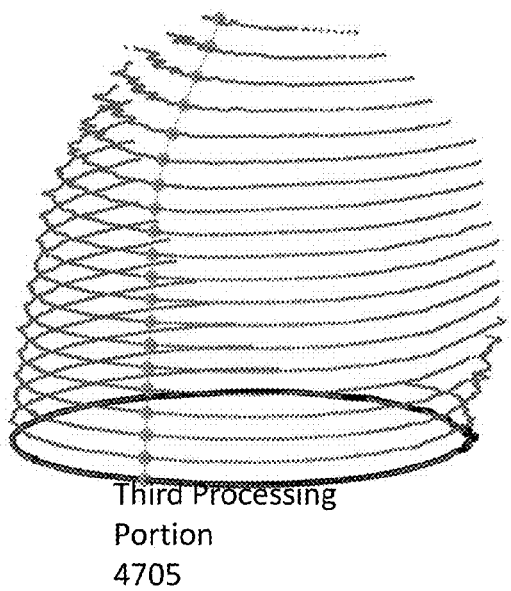
Third Processing Portion 4705
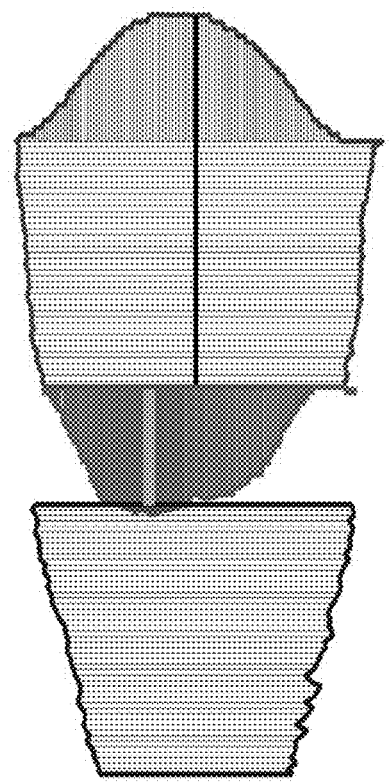
Fig. 47C

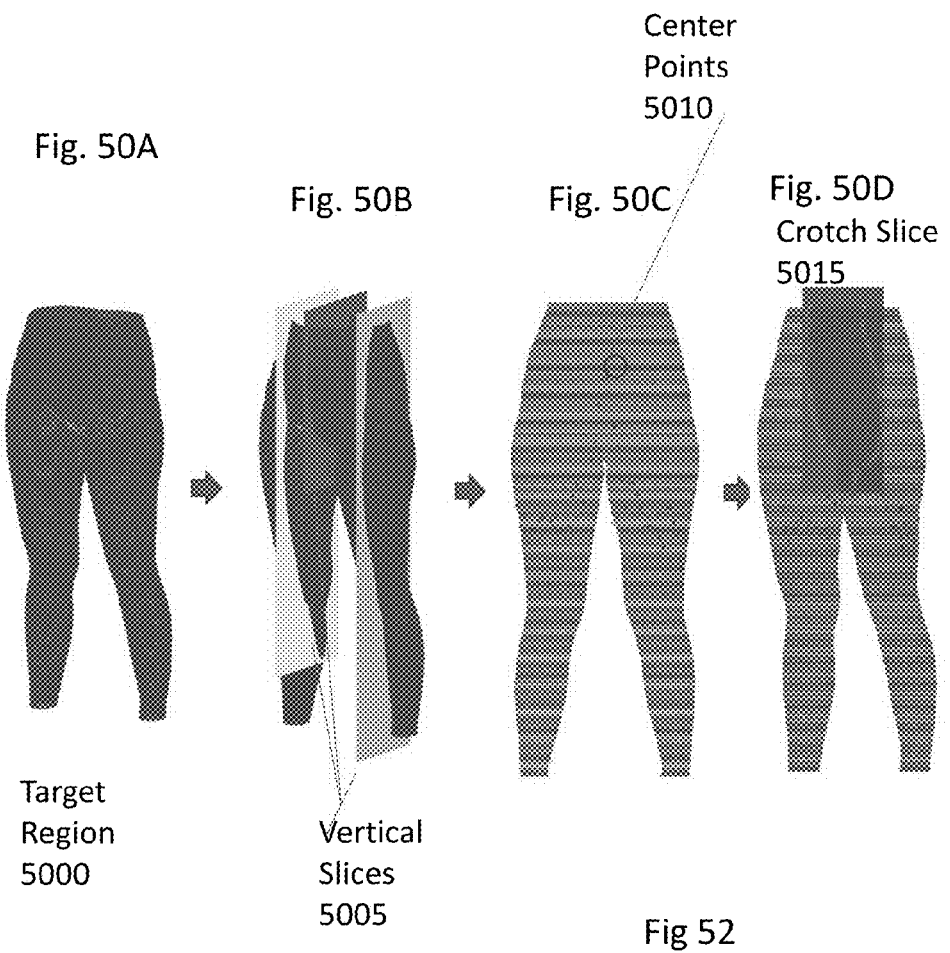
Fig. 50A — Target Region 5000
Fig. 50B — Vertical Slices 5005
Fig. 50C — Center Points 5010
Fig. 50D — Crotch Slice 5015
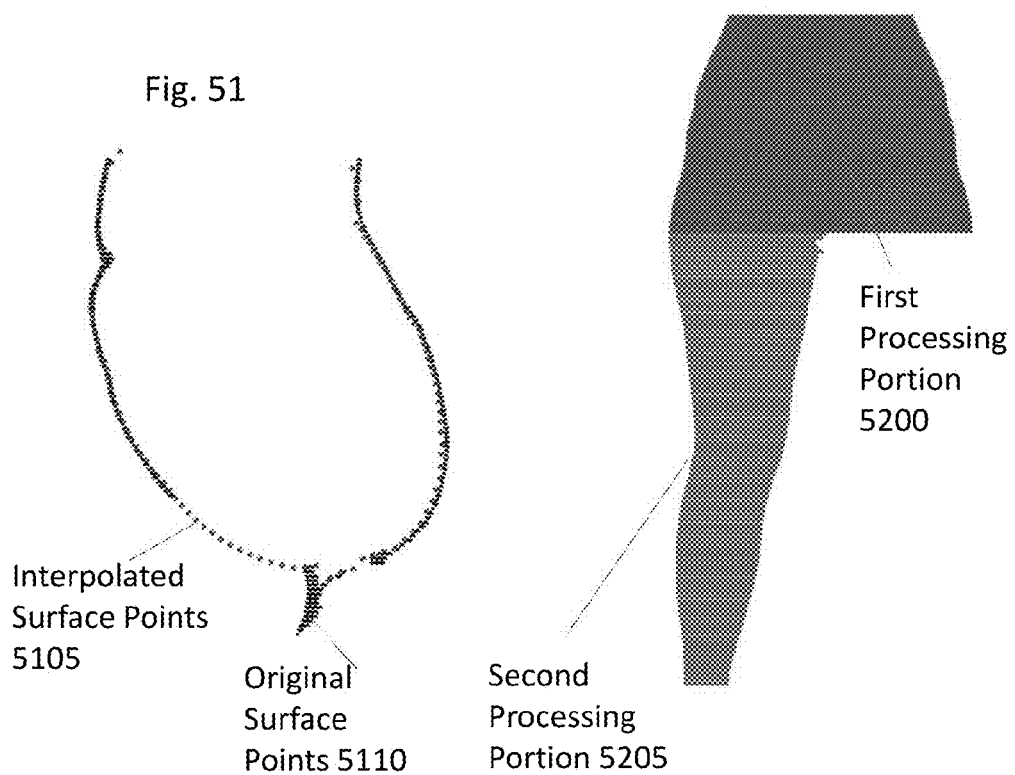
Fig. 51 — Interpolated Surface Points 5105, Original Surface Points 5110
Fig 52 — First Processing Portion 5200, Second Processing Portion 5205

Fig. 55
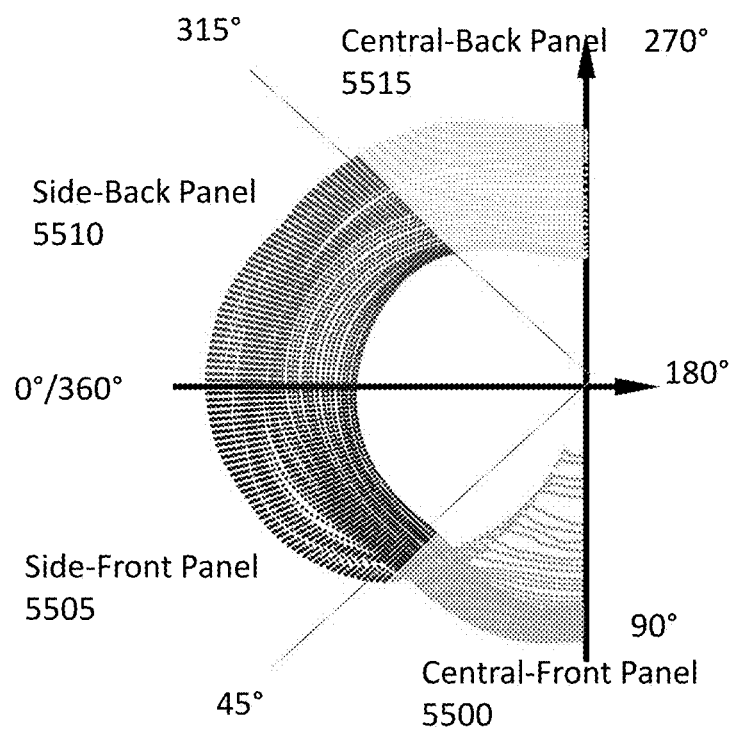
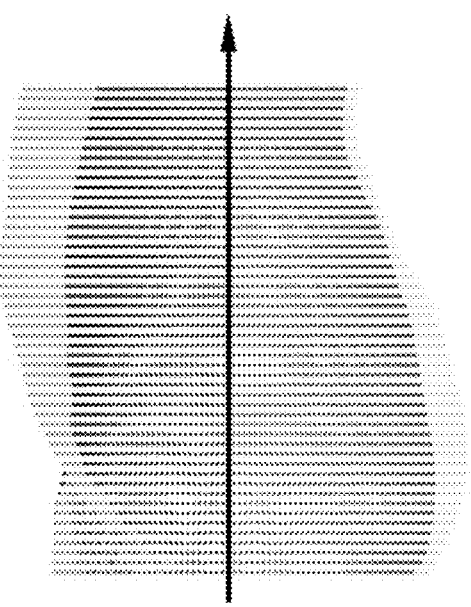
Fig. 56

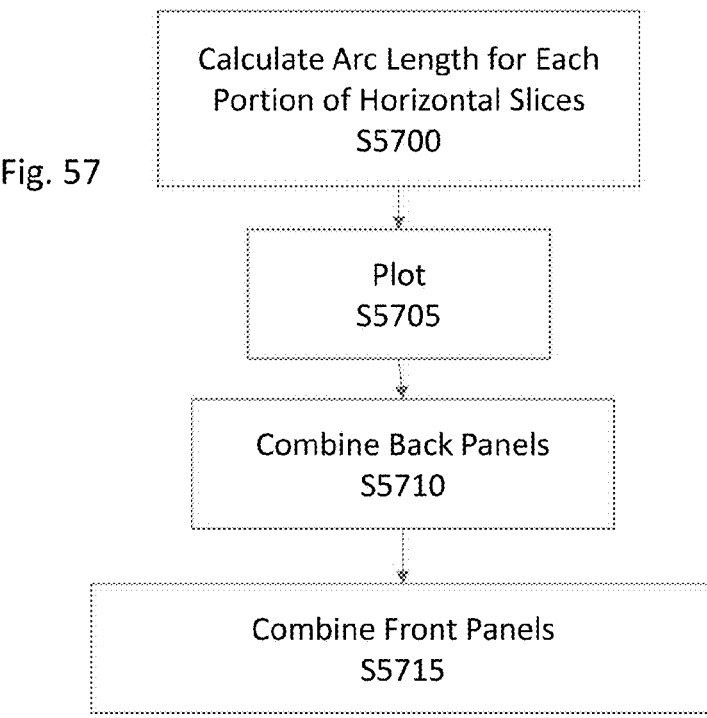
Fig. 57
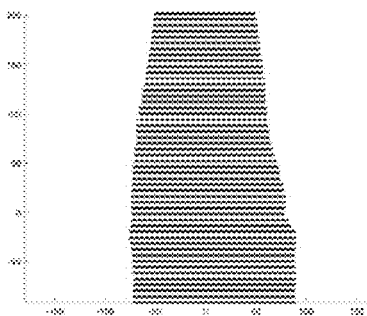
Fig. 58A Side-Front Panel 5505
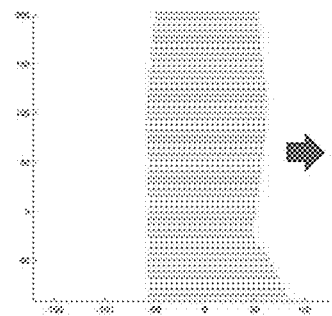
Fig. 58B Central-Front Panel 5500
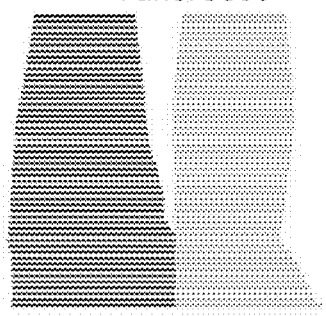
Fig. 58C Combined Front Panel 5800
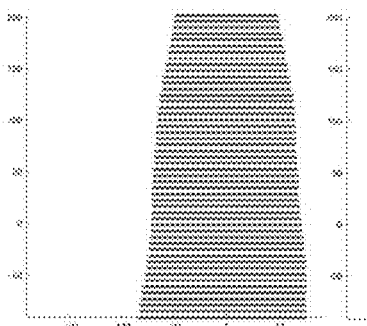
Fig. 58D Side-Back Panel 5510
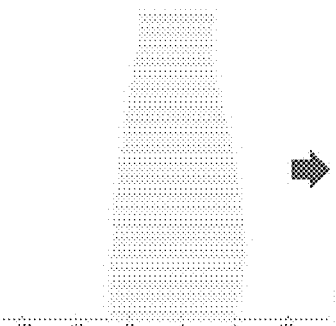
Fig. 58E Central-Back Panel 5515
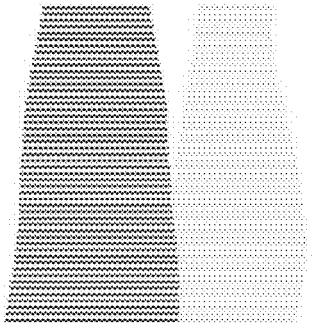
Fig. 58F Combined Back Panel 5805

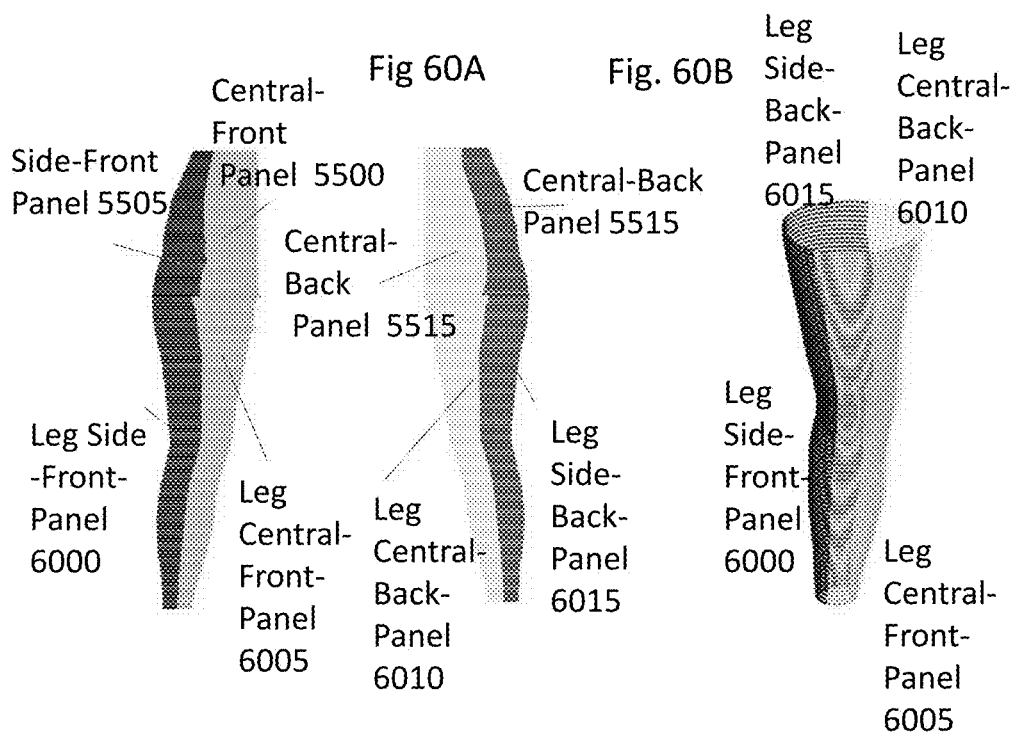
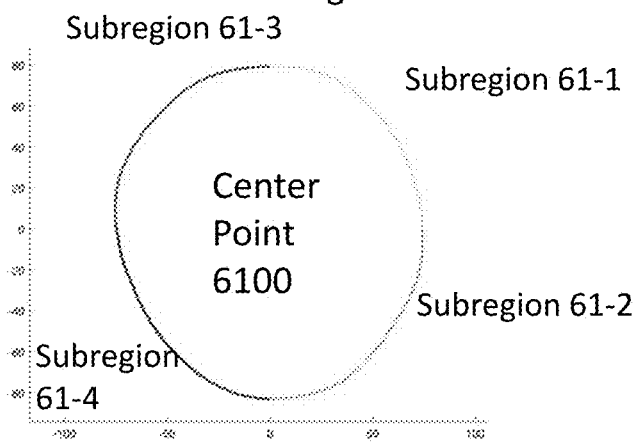
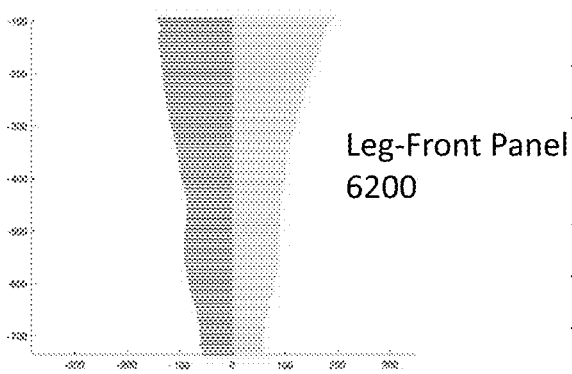
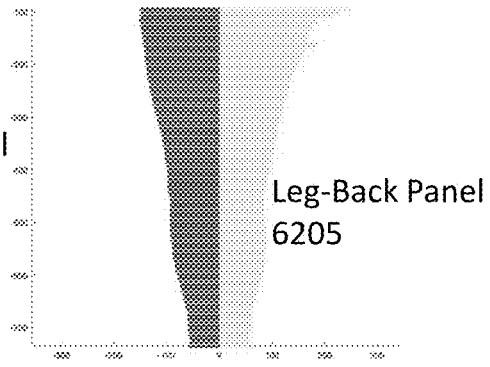

Front Pants
Panel 6300

Preliminary Back
Pants Panel 6305

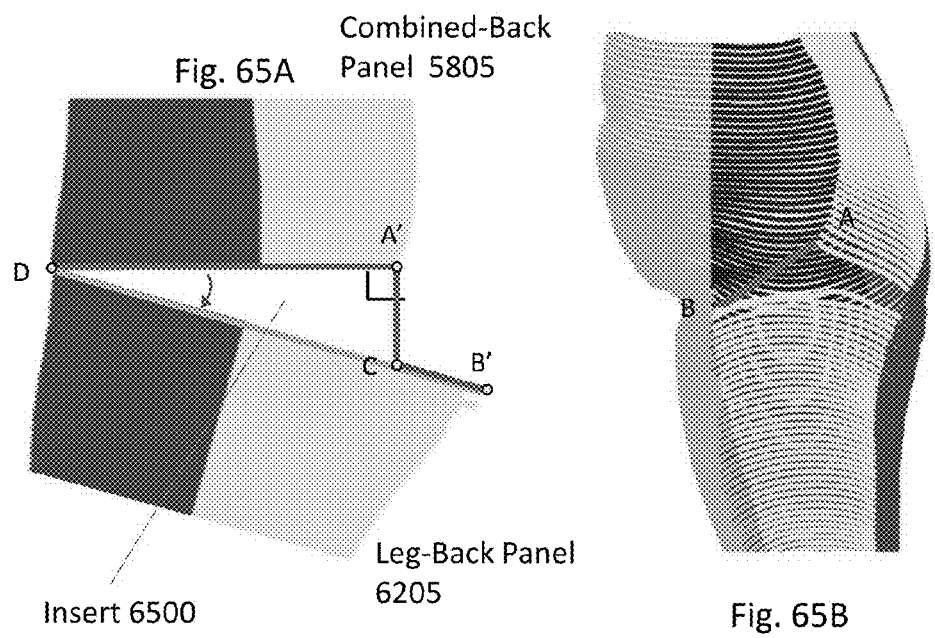
Fig. 65A
Combined-Back Panel 5805
Insert 6500
Leg-Back Panel 6205
Fig. 65B
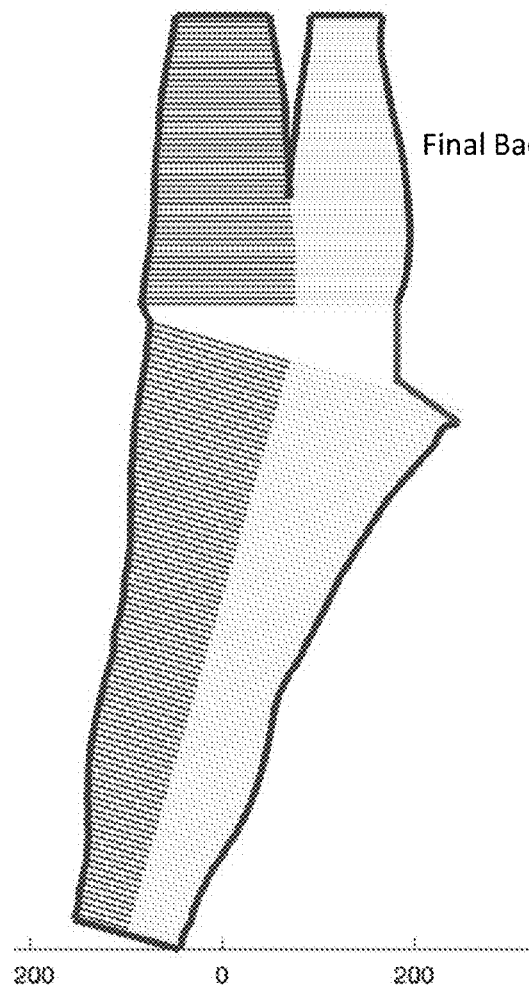
Fig. 66
Final Back Panel 6600

RAPID GENERATION OF CUSTOM-FIT GARMENT PATTERNS FROM 3D BODY SCANS

CROSS-REFERENCE TO RELATED APPLICATION

This application claims the benefit of and priority to U.S. Provisional Application Ser. No. 63/196,409 filed on Jun. 3, 2021, the entirety of which is incorporated by reference.

FIELD OF THE DISCLOSURE

This disclosure relates to systems and methods for generating garment patterns from three-dimensional body scans.

BACKGROUND

Truly custom-made clothing for an individual is difficult to practically make because it is costly and time consuming. Tailors and dressmakers usually take manual measurement, create the patterns and construct the garment. Different garments may require different manual measurements and may require the person to repeatedly come to a shop for the measurements and subsequent fittings. For example, for a suit jacket or shirt, measurements of neck size, arm length, sleeve width, chest and shoulders, etc. may need to be manually measured. For pants, the waist, inseam, length, etc. also may need to be measured. Taking manual measurements is costly and relies on the expertise of experienced tailors.

Other methods use a library of patterns of various styles and sizes. Within the library, an individual customer's measurements are compared with the measurements of the garment patterns and matched to the patterns that have the closest measurements. However, the patterns in the library may not perfectly match the individual's measurements and body shape.

Other methods still have preset master patterns which will be modified according to individual customer's measurements. This method still requires customers to correctly measure themselves and report their measurement truthy which can be difficult to achieve. Additionally, the preset master patterns do not reflect a full range of body, therefore, modifying these master patterns may sometimes result in weird pattern shapes that cause fit issues.

SUMMARY

Accordingly, disclosed is a method for generating custom-fit garment patterns. In an aspect of the disclosure, the custom-fit garment pattern may be a bodice pattern. The method may comprise receiving, by a processor, a three-dimensional image, identifying a target region in the three-dimensional image and dividing along a dividing plane the target region into at least a first target portion and a second target portion. The three-dimensional image includes one or more body parts of a body. The first target portion and the second target portion may be processed separately. For the first target portion, the method may comprise identifying, by the processor, a number of datapoints on a surface of the first target portion and dividing half of the first target portion into a plurality of subregions. The datapoints may be arranged in a plurality of horizontal slices where each horizontal slice contains datapoints in the same plane. The plurality of subregion may be based on angular position with respect to a central axis. The central axis may be parallel to a longitudinal axis of the body. For each subregion, the method may comprise unwrapping, by the processor, the three-dimensional image by determining at least one arc length associated with each horizontal slice in the subregion using the identified datapoints for the respective slice and generating, by the processor, a first portion based on the at least one arc length for each slice and the respective slice. For the second target portion, the method may comprise identifying, by the processor, a number of second datapoints and dividing half of the second target portion into a plurality of second subregions, respectively corresponding to the plurality of subregions in the first target portion. The second datapoints may be arranged in a plurality of vertical slices where each vertical slice contains second datapoints in the same plane. The second datapoints may include interpolated points. For each second subregion, the method may comprise assigning vertical slices to a respective second subregion, determining, by the processor, a length of a curve orthogonal to the vertical slices, the curve connecting a respective second datapoint in each vertical slice in the respective second subregion, determining, by the processor, an arc length associated with each vertical slice in the respective second subregion using the second datapoints for the respective vertical slice with respect to the reference point for each vertical slice, including the interpolated points, determining, by the processor, a length of an accumulative curve connecting tops of lines representing the arc lengths of the vertical slices, determining a ratio of the length of the curve and the length of the accumulative curve, adjusting, by the processor, the position of the top portion of each line representing the arc length of vertical slices, respectively, based on the ratio, recalculating, by the processor, the arc length associated with each vertical slice in the respective subregion using the second datapoints for the respective vertical slice without the interpolated points; and generating, by the processor, a second portion based on the recalculated arc length for each vertical slice and the adjusted position. The lines representing the arc length extend orthogonally from a base. The base intersects the dividing plane. The second datapoint is at a preset angle with respect to a reference point for each vertical slice. Each reference point is on the dividing plane.

In an aspect of the disclosure, the method may further comprise determining the central axis for the first target region by the processor. The central axis may be determined by determining a first average value of surface points in first target region in a first direction and determining a second average value of surface points in the first target region in a second direction orthogonal to the first direction and orthogonal to the longitudinal axis of the body. The first direction may be orthogonal to the longitudinal axis of the body. The central axis may be defined by the intersection of the first average value and the second average and the central axis may be orthogonal to the first and second directions, In an aspect of the disclosure, the method may further comprise by the processor, the first target region to align the central axis with a zero coordinate in the first direction and a zero coordinate in the second direction.

When the custom-fit garment pattern is a bodice pattern, the target region may comprise a torso and shoulder area. The first target portion may comprise the torso and the second target portion may comprise the shoulder area.

In an aspect of the disclosure, the identification of the target region may comprise the processor removing areas outside the torso and the shoulder area included in the three-dimensional image including limbs and a head.

In an aspect of the disclosure, the method may further comprise defining a neckline in the three-dimensional image. The neckline may be defined by rotating the three-dimensional image, selecting points in the three-dimensional image and deleting the selected points.

In an aspect of the disclosure, dividing the target area into the first target portion and the second target portion may comprise using a ratio and dividing the three-dimensional image into the torso and the shoulder area based on the ratio using a dividing plane. The dividing plane may be orthogonal to the central axis.

In an aspect of the disclosure, the method may further comprise determining another central axis for the second target portion.

In an aspect of the disclosure, identifying, by the processor, the number of datapoints on the surface of the first target portion may comprise partitioning, by the processor, each horizontal slice into a plurality of portions based on a fixed angular interval. Each portion corresponds to an angle value, and each portion includes a set of points. For each portion on each horizontal slice, the method may comprise determining, by the processor, an average distance among distances of the set of points with respect to the central axis; and setting, by the processor, a point associated with the average distance as a datapoint represented by the angle value corresponding to the portion. The datapoint is one of the number of datapoints identified.

In an aspect of the disclosure, the identifying, by the processor, the number of second datapoints of the second target portion may comprise partitioning, by the processor, each vertical slice into a plurality of portions based on a fixed angular interval. Each portion corresponds to an angle value, and each portion includes a set of points. For each portion on each vertical slice, the method may comprise determining, by the processor, an average distance among distances of the set of points with respect to the reference point for each slice; and setting, by the processor, a point associated with the average distance as a datapoint represented by the angle value corresponding to the portion. The datapoint is one of the number of second datapoints identified, Certain portions corresponding to an angle value, respectively, may contain points which have been interpolated from other points.

In an aspect of the disclosure, the subregions for the first target portion may include a side-front panel, a central-front panel, a central-back panel and a side-back panel.

In an aspect of the disclosure, the side-front panel and the side-back panel may be further divided into two sections such that two arc lengths are calculated for the side-front panel and the side-back panel for each horizontal slice corresponding to angular regions associated with the respective panel.

In an aspect of the disclosure, generating the first portion of the panel for the pattern may comprise plotting a two-dimensional plot using the at least one arc length for a respective horizontal slice, for each horizontal slice. The lines representing arc lengths extend orthogonally from a vertical axis. Lines representing the arc lengths for different horizontal slices are offset from each other. When there are two arc lengths per slice for a subregion, the lines representing the arc lengths for the same horizontal slice extend in opposite directions with respect to the vertical axis.

In an aspect of the disclosure, the method may further comprise determining, by the processor, which horizontal slices correspond to an armhole. The generating of the first portion by the processor may comprise adjusting the lines representing the arc lengths from extending from the vertical axis to extending from a preset position toward the vertical axis.

In an aspect of the disclosure, the assigning vertical slices to a respective second subregion may comprise determining a ratio of arc lengths of top horizontal slice of adjacent subregions, and assigning the number of slices based on the ratio. The ratio is for adjacent subregions in the first direction. Lines representing the at least one arc length of the top horizontal slice of a corresponding subregion is the base for the lines representing the arc length for the corresponding second subregion.

In an aspect of the disclosure, the second subregions for the second target portion may include a central-front shoulder, a side-back shoulder, a side-front shoulder, and a central-back shoulder. The central-front panel may be combined with the central-front shoulder to form a first combined panel for the pattern. The side-front panel may be combined with the side-front shoulder to form a second combined panel for the pattern. The central-back panel may be combined with the central-back shoulder to form a third combined panel for the pattern. The side-back panel may be combined with the side-back shoulder to form a fourth combined panel for the pattern.

In an aspect of the disclosure, the method may further comprise modifying coordinates of points or datapoints on a surface of the target portion prior to determining arc lengths.

In an aspect of the disclosure, the modification may account for a representation of a fabric drape. The modification may comprise converting surface points or datapoints in the first target portion into polar coordinates with a reference point for each horizontal slice as the origin, the reference point for each horizontal slice intersecting the central axis and the respective horizontal slice and identifying the horizontal slice with a maximum coordinate in a direction of the central axis. The horizontal slice with the maximum coordinate is closest to the second target portion. The polar coordinates contain an angle and a corresponding radius associated with a surface point or datapoint at the angle and a coordinate in a direction of the central axis. For each angle, the method may comprise starting from the horizontal slice with the maximum coordinate, comparing the corresponding radius for the horizontal slice with the corresponding radius of the adjacent horizontal slice, when the corresponding radius of the adjacent horizontal slice is less than the corresponding radius for the same angle, changing the corresponding radius to a new radius value for the adjacent slice; and repeating comparing of the corresponding radius for the same angle for adjacent horizontal slices moving downward in the direction of the central axis, wherein when the corresponding radius for the same angle increases for the subsequent adjacent horizontal slice from the corresponding radius in a larger coordinate in the direction of the central axis, changing the corresponding radius to the new radius value for the same surface point or datapoint for each subsequent horizontal adjacent slice until the corresponding radius value for the same angle is greater than the new radius value. The modification further comprises converting coordinates to a cartesian coordinate system using the new radius values.

In an aspect of the disclosure, the modifying may be based on a fabric type such as a stretchy material or a garment type such as a bathing suit. The modifying may comprise adjusting the surface points or datapoints using a scaling factor.

In an aspect of the disclosure, the modifying may be based on the body part. The modifying may comprise determining a location of a landmark, determining a length parameter of the landmark, adding a value to the length parameter and generating a scaling factor based on a ratio of the length parameter and the added value and the length parameter and adjusting datapoints or surface points based on the ratio with an area of the target region. The body part may be the bust region. The modifying may further comprise horizontally slicing the second target region and determining surface points or datapoints and adjusting the surface points or datapoint on the lowest slice of the second target region based on the ratio and gradually adjusting surface points or datapoints on the other horizontal slices in the second target region by a reduced scaling factor.

In an aspect of the disclosure, the modifying may comprise adjusting a coordinate associated with a second direction for surface points or datapoints in a horizontal slice between two datapoints or surface points having the maximum absolute value coordinate associated with the second direction for the horizontal slice in the front and adjusting a coordinate associated with a second direction for datapoints or surface points in a horizontal slice between two datapoints or surface points having the maximum absolute value coordinate associated with the second direction for the horizontal slice in the back, for each horizontal slice.

In an aspect of the disclosure, the modifying may comprise determining a location of a landmark, determining a length parameter of the landmark, subtracting a value from the length parameter and generating a scaling factor based on a ratio of the length parameter and the length parameter after subtraction and adjusting datapoints or surface points based on the ratio within an area of the target region.

In an aspect of the disclosure, each of the plurality of subregions in the first target region is 45°. In other aspects, different horizontal slices in the first target region may be divided into the plurality of subregions at different angles.

In an aspect of the disclosure, the method may further comprise combining the first combined panel and the second combined panel and combining the third combined panel and the fourth combined panel.

In an aspect of the disclosure, the first combined panel and the second combined panels may be combined using a seamline pattern and the third combined panel and the fourth combined panels may be combined using the seamline pattern. In an aspect of the disclosure, the seamline pattern is able to be modified.

In an aspect of the disclosure, the method may further comprise modifying the seamline pattern. The modifying may comprise receiving a selection of a seamline pattern and adjusting the width of certain lines in the first combined panel, the second combined panel, the third combined panel and the fourth combined panel based on the selection.

In an aspect of the disclosure, the modifying may further comprise displaying the combination of the first combined panel and the second combined panels with the modified seamline pattern and displaying the combination of the third combined panel and the fourth combined panel with the modified seamline pattern.

In an aspect of the disclosure, the modifying may further comprise displaying available seamline patterns. The selection may be received via an input device which adjusts an initial seamline pattern. The initial seamline pattern may be a basic pattern determined in accordance with aspects of the disclosure. The input may be to drag a panel.

In an aspect of the disclosure, the seamline patterns correspond to customized dart patterns.

In an aspect of the disclosure, the method may further comprise modifying at least one of the first combined panel, the second combined panel, the third combined panel or the fourth combined panel based on a predefined design path.

In an aspect of the disclosure, the method may further comprise displaying a plurality of predefined designed paths and receiving a selection of one or more of the predefined design paths.

In an aspect of the disclosure, the method may further comprise defining points in the first combined panel, the second combined panel, the third combined panel and the fourth combined panel.

In an aspect of the disclosure, the method may further comprise defining each predetermined design path.

Also disclosed is a method for generating custom-fit sleeve patterns. The method may comprise receiving, by a processor, a three-dimensional image, identifying a target region in the three-dimensional image, determining a central axis in the target region and dividing along a dividing plane the target region into at least a first target portion and a second target portion. The three-dimensional image includes one or more body parts of a body. The first target portion and the second target portion may be processed separately. For the first target portion, the method may comprise identifying, by the processor, a number of datapoints on a surface of the first target portion and dividing the first target portion into a plurality of subregions. The datapoints are arranged in a plurality of slices and each slice contains datapoints in the same plane. For each subregion, the method may comprise unwrapping, by the processor, the three-dimensional image by determining an arc length associated each slice in the subregion using the identified data points for the respective slice; and generating, by the processor, a first portion of the pattern based on the arc length for each slice and the respective slice. The method may further comprise combining the first portion of each subregion to obtain a combined first portion. For the second target portion, the method may comprise identifying, by the processor, a number of second datapoints on a surface of the second target portion, determining, by the processor, a length of a curve connecting a respective second datapoint in each second slice, the second datapoint being at a preset angle with respect to the central axis, repeating for each preset angle around the central axis and generating, by the processor, a second portion of the pattern based on the length of the curve at each preset angle. The second datapoints are arranged in a plurality of second slices. Each second slice contains second datapoints in the same plane. The method may further comprise combining, by the processor, the combined first portion and the second portion of the pattern.

In an aspect of the disclosure, the generating of the combined first portion of the pattern may comprise plotting a two-dimensional plot having lines representing the determined arc lengths associated with each slice for the subregions. Lines for each slice extend orthogonally from a vertical axis, lines for the same slice from different subregions extend in the opposite direction and lines representing arc lengths for different slices are offset.

In an aspect of the disclosure, lines representing the length of the curve at each preset angle extend from a base. The base is aligned with the arc lengths of a top slice from the first target portion. An intersection point with the base for each line representing the length of the curve is determined based on a spacing between adjacent data points on the top slice of the first target portion, respectively.

In an aspect of the disclosure, the target region may comprise an arm. The identification may comprise dividing the three-dimensional image into identification slices; identifying a center point in each identification slice and determining a breakpoint based on a maximum coordinate value in a specific direction. The breakpoint is a center point in a boundary slice.

In an aspect of the disclosure, the method may comprise rotating the target region such that the central axis is vertical.

In an aspect of the disclosure, the determining of the central axis may comprise determining a best fit line using a subset of center points.

In an aspect of the disclosure, the dividing may comprise determining a separation slice and dividing the target region at the separation slice.

In an aspect of the disclosure, the method may further comprise modifying coordinates of surface points on a surface of the target portion or datapoints and second datapoints prior to determining arc lengths.

In an aspect of the disclosure, the target regions may include an elbow region and an upper arm region and lower arm region.

Also disclosed is a method for generating custom-fit patterns for pants. The method may comprise receiving, by a processor, a three-dimensional image, identifying a target region in the three-dimensional image and dividing along a dividing plane the target region into a leg portion and a hip portion. The leg portion may have image data for one leg. The three-dimensional image includes one or more body parts of a body. For the hip portion, the method may comprise identifying, by the processor, a number of datapoints on a surface of the hip portion and dividing half of the hip portion into a plurality of subregions based on angular position with respect to a central axis. The datapoints may be arranged in a plurality of horizontal slices, Each horizontal slice contains datapoints in the same plane. The datapoints are with respect to a central axis, the central axis being parallel to a longitudinal axis of the body. For each subregion, the method may comprise unwrapping, by the processor, the three-dimensional image by determining two arc lengths associated each horizontal slice in the subregion using the identified datapoints for the respective horizontal slice; and generating, by the processor, a first portion based on the two arc lengths for each horizontal slice in the subregion and the respective slice. The method may further comprise combining the first portion for adjacent subregions in the front and adjacent subregions in the back to obtain combined first portions. For the leg portion, the method may comprise identifying, by the processor, a number of leg datapoints on a surface of the leg portion, dividing each leg slice into a plurality of sub-slices based on angular position with respect to the respective central point to generate a plurality of leg subregions, the leg subregions having corresponding sub-slices with the same angular position with respect to the respective central point, calculate an arc length of each sub-slice for each leg slice and for each leg subregion, generating, by the processor, a second portion based on the calculated arc length for each sub-slice in the subregion and slice. The leg datapoints are arranged in a plurality of leg slices. Each leg slice contains leg datapoints in the same plane. The leg datapoints are with respect to a respective central point for each leg slice. The method may further comprise combining the second portion for adjacent subregions in the front and adjacent subregions in the back to obtain combined second portions. The method may further comprise combining one of the combined first portions with a corresponding one of the combined second portions and combining another of the combined first portions with another corresponding one of the combined section portions.

In an aspect of the disclosure, the dividing the target region into a leg portion and a hip portion may comprise slicing the target region into a plurality of vertical slices, calculating a central point in each vertical slice and determining the vertical slice associated with a maximum coordinate of the determined central point for each vertical slice in the longitudinal axis direction. The target region may be divided such that the boundary between the hip portion and the leg portion intersects a minimum coordinate in the longitudinal axis direction for the determined vertical slice.

In an aspect of the disclosure, one of the coordinates of the central axis may intersect the corresponding coordinate of the determined vertical slice associated with the maximum coordinate of the determined central point in the longitudinal axis direction.

In an aspect of the disclosure, datapoints in the determined vertical slice may be adjusted as necessary for smoothness and correction of noise.

In an aspect of the disclosure, the subregions of the hip portion may comprise a central-front panel, a side-front panel, a side-back panel and a central-back panel. The combining the first portion for adjacent subregions may comprise combining the central-front panel and the side-front panel and combining the side-back panel and the central-back panel.

In an aspect of the disclosure, the generating the first portion may comprise plotting a two-dimensional plot using the two arc lengths for a respective horizontal slice, for each horizontal slice. Lines representing arc lengths extend orthogonally from a vertical axis, lines representing the arc lengths for different horizontal slices are offset from each other, and the lines representing the arc lengths for the same horizontal slice extend in opposite directions with respect to the vertical axis.

In an aspect of the disclosure, combining comprises adding the side-front panel to the two-dimensional plot for the central-front panel to create a front hip portion. Lines representing arc lengths for the side-front panel do not overlap with lines representing arc lengths for the central-front panel. At least a subset of the lines for the side-front panel are continuous with corresponding at least a subset of the lines for the central-front panel In an aspect of the disclosure, the combining may further comprise adding the side-back panel to the two-dimensional plot for the central-back panel to create a back hip portion. Lines representing arc lengths for the side-back panel do not overlap with lines representing arc lengths for the central-back panel. At least a subset of the lines for the side-back panel are continuous with corresponding at least a subset of the lines for the central-back panel.

In an aspect of the disclosure, the leg regions may include a leg side-front panel, a leg central-front panel, a leg side-back panel and a leg central-back panel. The combining of the second portion for adjacent leg subregions may comprise combining the leg central-front panel and the leg side-front panel and combining the leg side-back panel and the leg central-back panel.

The generating of the second portion may comprise plotting a two-dimensional plot using the arc length for a sub-slice, for the leg subregion. Lines representing the arc length extend orthogonally from a vertical axis and lines representing the arc lengths for sub-slice of different leg slices are offset from each other.

In an aspect of the disclosure, the combining of the leg central-front panel and the leg side-front panel may comprise adding the leg side-front panel to the two-dimensional plot for the leg central-front panel to form a front leg panel, or vice versa. Lines representing arc lengths of the sub-slices for the leg side-front panel and the leg central-front panel extend in opposite directions from the vertical axis.

In an aspect of the disclosure, the combining of the leg central-back panel and the leg side-back panel may comprise adding the leg side-back panel to the two-dimensional pattern for the leg central-back panel to form a back leg panel or vice versa. Lines representing arc lengths of the sub-slices for the leg side-back panel and the leg central-back panel extend in opposite directions from the vertical axis.

In an aspect of the disclosure, the combining one of the combined first portions with a corresponding one of the combined second portions and combining another of the combined first portions with another corresponding one of the combined section portions may comprise combining the front hip pattern with the front leg panel to create a front panel and combining the back hip panel and an adjusted back leg panel to create a back panel.

In an aspect of the disclosure, the back leg panel may be adjusted by rotating the back leg panel with respect to the back hip portion and where number of lines representing the arc lengths of top slices of the back leg panel are removed for at least a top two leg slices.

In an aspect of the disclosure, the adjustment may comprise determining an angle of rotation of the back leg pattern. The determining of the angle may be based on a distance between a first datapoint on a bottom slice of the hip portion and a second datapoint on a top leg slice of the leg portion after the number of slices have been removed. The first data point may be the datapoint in the central-back panel adjacent to where the hip portion is divided in half. The second datapoint may be the leg data point at a boundary between the central-back panel and the central-front panel.

In an aspect of the disclosure, the adjustment may comprise inserting an insert between the rotated back leg panel and the back hip portion to create the back pattern Also disclosed is a device for performing one or more aspects described herein.

Also disclosed is a system for performing one or more aspects described herein.

Also disclosed is one or more computer readable mediums having instructions for performing one or more aspects described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6 illustrates an example of a method of defining a central axis in accordance with aspects of the disclosure;

FIG. 7A illustrates an example of a central axis in the first processing portion and FIG. 7B illustrates an example of a central axis in the second processing portion in accordance with aspects of the disclosure;

FIG. 11A illustrates an example of adjusting the y-coordinates for two horizontal slices in accordance with aspects of the disclosure;

FIGS. 11B and 11C, respective illustrate examples of the adjustment of the y-coordinates for different slices in accordance with aspects of the disclosure;

FIG. 11D illustrates a representation of a garment due to the adjustment of the y-coordinate in accordance with aspects of the disclosure;

FIG. 12A illustrates an example of the separation angles for dividing half of the first processing portion into subregions in accordance with aspects of the disclosure, FIG. 12B illustrates an example of the sub-division of side-front panel into two sub-panels in accordance with aspects of the disclosure and FIG. 12C illustrates an example of the sub-division of the side-back panels into two sub-panels in accordance with aspects of the disclosure;

FIG. 15A illustrates an example of a side-front panel in accordance with aspects of the disclosure, FIG. 15B illustrates an example of a side-back panel prior to arm-hole modification in accordance with aspects of the disclosure and FIG. 15C illustrates an example of a side-back panel after the arm-hole modification in accordance with aspects of the disclosure;

FIG. 31B illustrates different views of a representation of an example of datapoint panel assignment where the separation angles are varied and FIG. 31A illustrates an example of the corresponding panels which can be combined to form a bodice pattern in accordance with aspects of the disclosure;

FIG. 34 illustrates an example of the modification in accordance with the method of FIG. 33;

FIG. 35A illustrates an example of panel combinations generated using the modified datapoints and FIG. 35B illustrates different views of a representation of examples of adjusted datapoints showing the drape and panel assignment in accordance with aspects of the disclosure;

FIG. 45A illustrates an example of the sleeve pattern for the second processing portion in accordance with aspects of the disclosure;

FIG. 45B illustrates another view of an example of the second processing portion showing an example of an arc length for the datapoints at a specific angle;

FIG. 47A illustrates an example of additional processing portions for generating custom-fit sleeve patterns in accordance with aspects of the disclosure, FIG. 47B illustrates an example of the third processing portion in accordance with aspects of the disclosure; and FIG. 47C illustrates another example of a custom-fit sleeve pattern in accordance with aspects of the disclosure;

FIG. 50A illustrates an example of a target region in accordance with aspects of the disclosure; FIG. 50B illustrates an example of vertical slicing the target region in FIG. 50A in accordance with aspects of the disclosure; FIG. 50C illustrates an example of determined center points for the vertical slices in FIG. 50B in accordance with aspects of the disclosure; and FIG. 50D illustrates an example of the determined crotch slice from center points in FIG. 50C in accordance with aspects of the disclosure;

FIG. 51 illustrates an example of a crotch slice showing original surface points and interpolated surface points in accordance with aspects of the disclosure;

FIG. 52 illustrates an example of processing portions in accordance with aspects of the disclosure to generate custom-fit patterns in accordance with aspects of the disclosure;

FIG. 55 illustrates an example of a division of panels in the first processing portion in accordance with aspects of the disclosure;

FIG. 56 illustrates an example of the central axis for the first processing portion;

FIG. 57 illustrates an example of a method for unwrapping the first processing portion to generate pattern(s) in accordance with aspects of the disclosure;

FIGS. 58A, 58B, 58D and 58E illustrate examples of panels for the first processing portion for a pattern in accordance with aspects of the disclosure and FIGS. 58C and 58F illustrate examples of combinations of panels for the first processing portion for a pattern in accordance with aspects of the disclosure;

FIG. 60A illustrates an example of panels for the first and second processing portion and 60B illustrate an example of panels for the second processing portion in accordance with aspects of the disclosure;

FIG. 61 illustrates an example of subregions of a horizontal slice in the second processing portion in accordance with aspects of the disclosure for generating custom-fit pattern(s);

FIG. 62A illustrates an example of a leg-front panel in accordance with aspects of the disclosure and FIG. 62B illustrates an example of a leg-back panel in accordance with aspects of the disclosure;

FIG. 65A illustrates an example of the insert between the two parts of the panel in accordance with aspects of the disclosure;

FIG. 65B illustrates an example of two datapoints used for adjustment of the back of the pants panel in accordance with aspects of the disclosure;

FIG. 66 illustrates an example of a final back panel in accordance with aspects of the disclosure;

DETAILED DESCRIPTION

In accordance with aspects of the disclosure, a device 10 or system 30 captures a three-dimensional image (3D) of an individual. A custom-fit garment pattern is directly created from the 3D image without a need for manual measurements. Additionally, there is no need for preset patterns (such as a master pattern). custom-fit garment patterns can be created across a population with many different body shapes by using the methods described herein.

Different custom-fit garment patterns may be created such as bodice patterns, sleeve patterns and pant patterns, etc. . . . . The patterns are generated by unwrapping 3D surfaces of the body to 2D pattern plots.

Figure 1A:
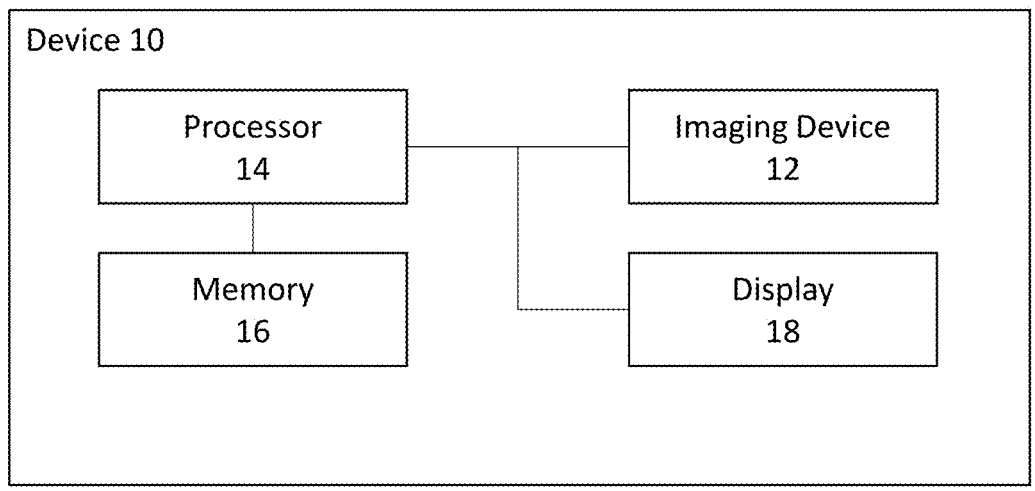
FIG. 1A illustrates an example of a device in accordance with aspects of the disclosure.

FIG. 1A illustrates a device 10 in accordance with aspects of the disclosure. The device 10 may comprise an imaging device 12, a processor 14, a memory 16 and a display 18. The imaging device 12 may be a 3D scanner. The 3D scanner may be a temporal 3d full body scanner such as 3dMDbody18.t System Model available from 3dMD, LLC. In an aspect of the disclosure, the 3D image is a combination of images obtained from multiple different cameras located at different views. In other aspects, the imaging device 12 may be any array of cameras linked together and synchronized to generate the 3D image(s). The cameras may be in respective mobile phones or other devices such as, but not limited to a tablet or laptop with a camera, where each device is positioned in a stationary position. The stationary positions may be such that the 3D image covers 360 degrees of an individual. These devices may be linked via BLUETOOTH or other wireless connection to transmit the images to one of the devices for reconstruction or generating of the 3D image from the multiple images from the multiple cameras taken at the same time. In other aspects, the imaging device 12 may be multiple web cameras or desktop cameras for a computer. These cameras are available from Logitech.

The processor 14 may be, for example, a central processing unit (CPU) or graphic processing unit (GPU) of the device 10, a microprocessor, a system on chip, and/or other types of hardware processing unit. The memory 16 may be configured to store a set of instructions, where the instructions may include code such as source code and/or executable code. The processor 14 may be configured to execute the set of instructions stored in the memory 16 to implement the methods and functions described herein. In some examples, the set of instructions may include code relating to various image processing techniques, encryption and decryption algorithms, slicing (vertical and/or horizontal), separation of the image into processing portions, unwrapping and plotting and/or other types of techniques and algorithms that can be applied to implement the methods and functions described herein.

The display 18 may be a touchscreen such as on a mobile phone or tablet. The display 18 may also be a screen of a point of sales terminal at a store such a tailor, dress maker or fabric store or garment shop. In other aspects, the display 18 may be a computer screen or television screen. In accordance with aspects of the disclosure, the display 18 may be configured to display the generated custom-fit body patterns and available design customization as described herein. The display may also include additional options for the customization such as ease.

In some aspects of the disclosure, the device 10 may be connected to a cutting machine and sewing machine to fabricate a garment based on the generated custom-fit patterns.

Figure 1B:
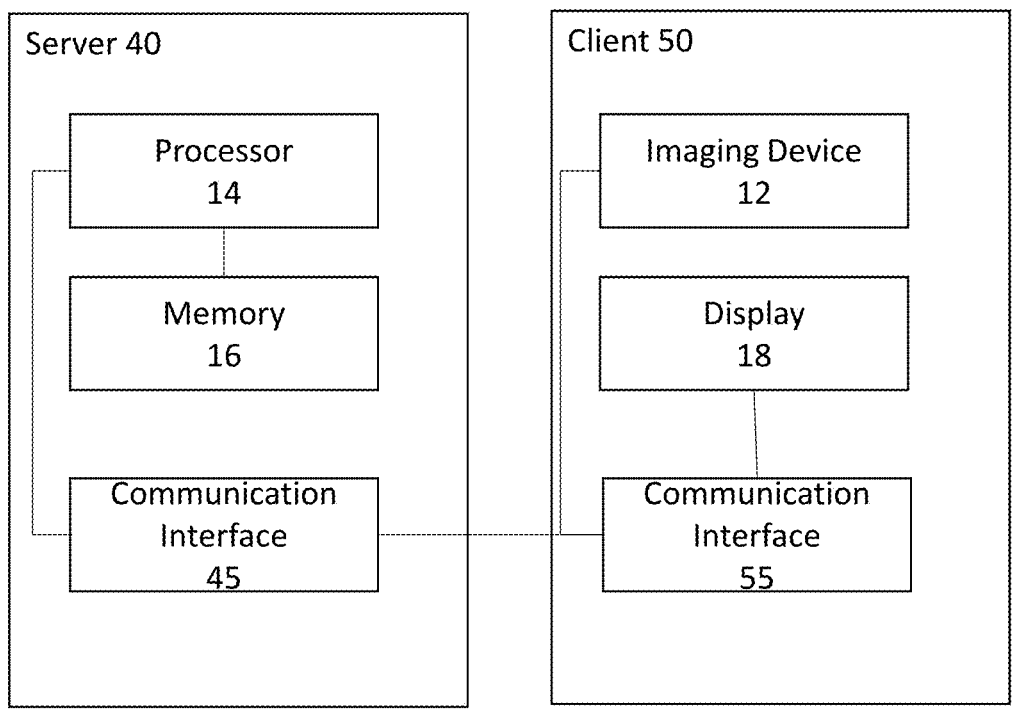
FIG. 1B illustrates an example of system in accordance with aspects of the disclosure.

In some aspects of the disclosure, the device 10 may perform all the functionality described herein. However, in other aspects, a system 30 comprising multiple devices may collectively perform the functionality. As shown in FIG. 1B, the system 30 may comprise a server 40 and a client 50

(terminal). The client 50 may be configured to obtain the 3D image and transmit the same to the server 40 for processing. The client 50 may comprise the imaging device 12 and the display 18 described above. The client 50 may communicate with the server 40 via a communication interface 55. Although not shown in FIG. 1B, the client device may also comprise a processor and memory. The memory may be for temporarily storing the image data prior to transmission to the server 40. The processor may control the imaging device 12 to acquire the 3D images and construct the 3D images from the multiple images from the cameras. This communication interface 55 may be a wireless interface such as a WI-FI® interface. In other aspects, the wireless interface may be BLUETOOTH®. In other aspects, the communication interface 55 may be for wired communication such as Ethernet. The server 40 may comprise the processor 14 and memory 16 described above. Similarly, the server 40 may comprise a communication interface 45 for communicating with the client 50 (terminal).

In some aspects, the server 40 may also have a display. The display may display the generated custom-fit patterns, and available design customization as described herein.

In other aspects, instead of the client 50 transmitting the image data to the server 40, the client 50 may have a memory card and the 3D image may be stored on the memory card and transferred to the server 40 via removal of the memory card from the client 50 and inserted into the server 40. In some aspects, the client 50 may include multiple DSLRs.

In some aspects, the client 50 may be installed in a fitting room of a store. For example, the client 50 may comprise the multiple cameras which may be installed on a railing system on a wall or door of an individual fitting room. The cameras may be mounted to different portions of the fitting room to have complete coverage, e.g., enable 360 degrees acquisition. The person may be able to raise or lower the client 50 such that the imaging device 12 is aligned with the height of the person (as needed) (via the railing system). The server 40 may also be located within the same store such as a point of sales terminal. In this manner, the individual may be able to be imaged (3D image constructed) in privacy.

In other aspects, the client 50 may be used at home such that the individual may be imaged in the privacy of the home and the server 40 may be located at a manufacturer of the garment. The individual may position the multiple cameras around a room such that the 3D image may be constructed from the images from each camera.

In other aspects, the device 10/system 30 may be located at the manufacturer. In an aspect of the disclosure, the methods described herein may be performed using an application installed in the device 10 or downloaded from a server to the device 10. In an aspect of the disclosure, the application may be a plug-in to another program or set of programs such as a computer automated design (CAD) program. For example, the CAD program may be, but is not limited to OPTITEX and CLO3D.

Figure 2:
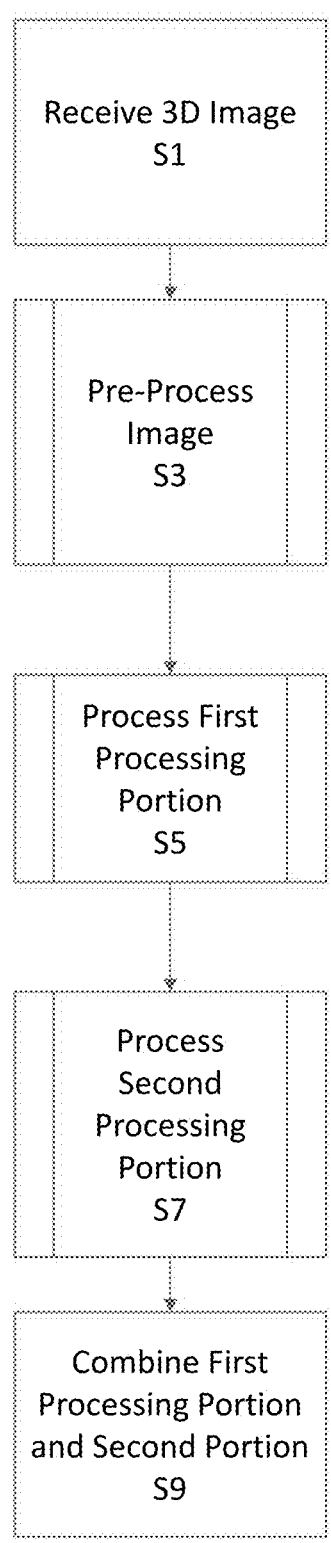
FIG. 2 illustrates an example of a method for generating custom-fit patterns in accordance with aspects of the disclosure.

FIG. 2 illustrates an example of a method in accordance with aspects of the disclosure.

In accordance with aspects of the disclosure, the imaging device 12 acquires a 3D image. In some aspects of the disclosure, the 3D image may be of the entire body of an individual. In other aspects, an operator or user of the system may input a specific pattern to be created such as bodice or sleeve or pants (another pattern) and a 3D image only of a relevant body part for the specific pattern may be acquired. For example, if the operator selects "pants", the 3D image may be acquired for the lower portion of the body and include the waist and legs. In an aspect of the disclosure, the device 10 may display on the display 18 specific image acquisition instructions for a specified custom-fit pattern such as a preferred posture for the 3D image acquisition.

At S1, the processor 14 may receive the 3D image of the individual. In other aspects, the 3D image may be prestored and retrieved from memory 16. At S3, the processor 14 performs pre-processing of the 3D image, e.g., series of image pre-processing steps to prepare the 3D image for portion processing (e.g., unwrapping of the portions). Different pre-processing may occur depending on the selected custom-fit pattern(s).

Figure 3:
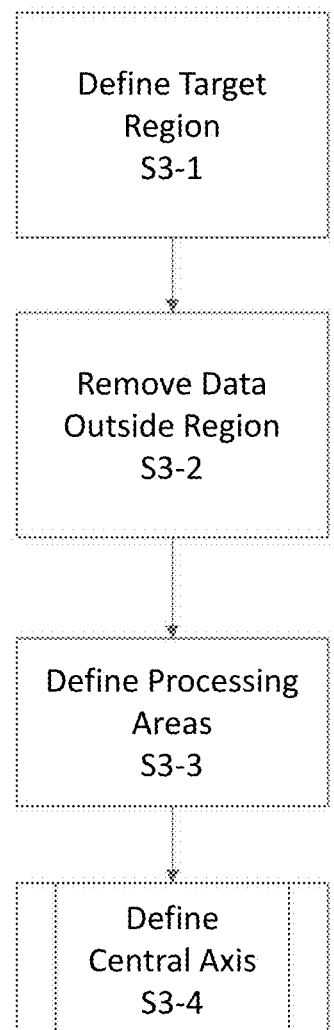
FIG. 3 illustrates an example of pre-processing of a 3D image in accordance with aspects of the disclosure when the selected pattern is bodice.

FIG. 3 illustrates an example of a pre-processing of a 3D image in accordance with aspects of the disclosure when the selected pattern is bodice. In an aspect of the disclosure, the operator may select a custom-fit pattern to be created via a graphic using interface (GUI) which may include a drop-down window with available patterns to be created including bodice, sleeve, pants, etc. . . . . . At S3-1, a target region within the 3D image is defined (identified). In an aspect of the disclosure, the processor 14 may identify the predetermined section of the 3D image. For example, when the pattern is a bodice, the target region includes the torso and shoulder section. The torso may include the chest and the stomach. In some aspects, the torso may include the waist. In the identification, the processor 14 may perform data cleaning, such as removing noisy surface points (surface points are image points on the surface of the body). In other aspects, an operator may manually identify the target region(s) when selecting one or more patterns using a selection window. In an aspect of the disclosure, the target region generation including separation may be based on machine learning or deep learning of the body parts. For example, the processor 14 may identify landmarks on the body such as the shoulder, head, neck and waist and obtain the target region based on the landmark identification. In other aspects, the target region may be discovered by slicing the 3D image into horizontal slicing and determining a local minimum in the head/neck area.

At S3-2, the processor 14 may remove the limbs and head, e.g., image data for the limbs and head. Further, in an aspect of the disclosure, the processor 14 may remove the neck, e.g., image data of the neck. In an aspect of the disclosure, this is done to create a natural neckline for the garment. In some aspects, the operator may identify the neckline. For example, for a loose neck fitting garment, a larger portion in the neck area may be removed. However, for a tight neck fitting garment, a smaller portion of the neck area may be removed.

Figures 4A, 4B:
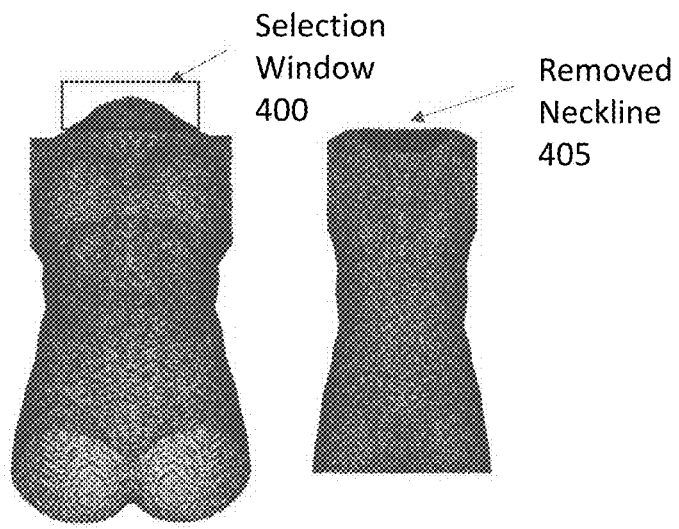
FIGS. 4A and 4B illustrate an example of removing a neckline during the pre-processing of the 3D image in accordance with aspects of the disclosure.

In some aspects, the processor 14 may tilt the 3D image by a preset angle to identify the neck region. For example, the angle may be about 40°. The processor 14 may apply a frame or window (selection window 400) around a set of points within the tilted image. FIG. 4A illustrates an example of the target region with the head and limbs removed (tilted). FIG. 4A also shows the selection window 400. FIG. 4B illustrates an example of the target region with the removed neckline 405. FIG. 4B is a front view whereas FIG. 4A is a tilted front view.

Figures 5A, 5B, 5C:
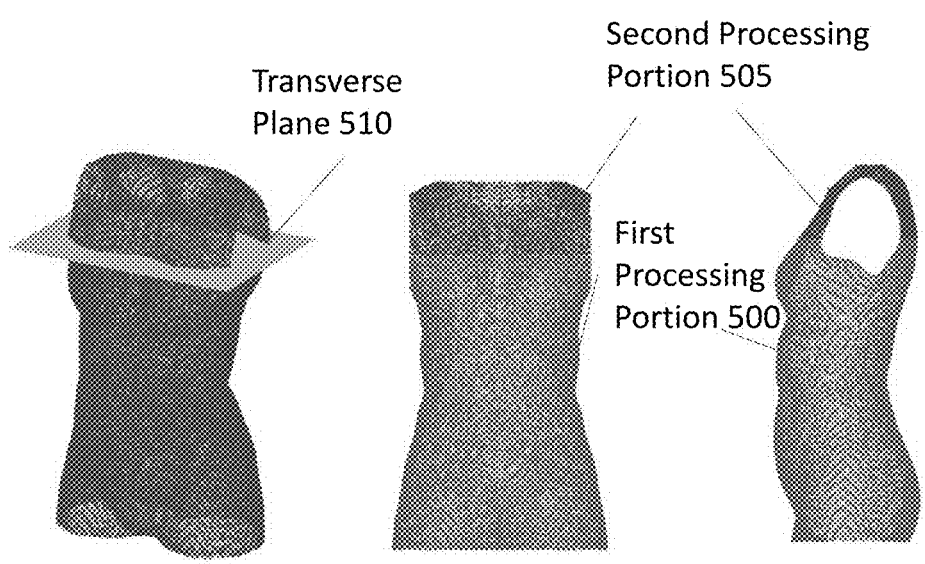
FIGS. 5A-5C illustrate an example of dividing the target region into a first processing portion and a second processing portion using a transverse plane in accordance with aspects of the disclosure.

At S3-3, the processor 14 defines the processing areas, e.g., first processing portion (an example of a first target portion) and second processing portion (an example of a second target portion). In an aspect of the disclosure, when the pattern is the bodice, the first processing portion 500 is the torso region and the second processing portion 505 is the shoulder region. In an aspect of the disclosure, the processor 14 divides the target region into the first processing portion 500 and the second processing portion 505 using a transverse plane 510. The transverse plane 510 is positioned at a predetermined relative height. In an aspect of the disclosure, the transverse plane 510 is positioned to divide the target region into a set ratio by height. For example, the set ratio may be 5:1, where the first processing portion 500 is 5 times the height of the second processing portion 505. However, the ratio is not limited to 5:1. In an aspect of the disclosure, the ratio may be set such that both portions include part of the area where the limbs were removed. FIG. 5A illustrates an example of the transverse plane 510 dividing the target region. FIGS. 5B and 5C show different views of an example of the first processing portion 500 and the second processing portion 505.

At S3-4, the processor 14 defines a central axis for each of the first processing portion 500 and the second processing portion 505. In an aspect of the disclosure, there may be a different central axis for each processing portion. FIG. 6 illustrates an example of a method for defining a central axis in accordance with aspects of the disclosure. In an aspect of the disclosure, the central axis is parallel to the longitudinal axis (orthogonal to the x-y plane). The processor 14 may determine an average with respect to a first direction (e.g., the x-direction).

For example, the processor 14 may average the x-components of all the surface points of the respective first processing portion 500 to determine a first average value at S600 (same process for the second processing portion 505. At S602, the processor 14 may determine an average with respect to a second direction (e.g., the y-direction). For example, the processor 14 may average the y-components of all the surface points of the respective first processing portion 500 to determine a second average value (same process for the second processing portion 505. The central axis 700, 700' can be defined as an axis intersecting the first average value and the second average value in each portion at S604. In some aspects, the image data may be shifted such that the central axis 700, 700' passes through a three-dimensional reference point. For example, the three-dimensional reference point may be (0,0,0). FIG. 7A illustrates an example of the central axis (Z) 700 for the first processing portion 500. FIG. 7B illustrates an example of the central axis (Z) 700' for the second processing portion 505. The x-axis and y-axis are also shown in FIGS. 7A/7B. It is noted that in FIG. 7A, the 3D reference point is near the middle of the first processing portion 500. However, the reference point is not required to be there. For example, the reference point may be located at the bottom of the first processing portion 500.

Figure 8:
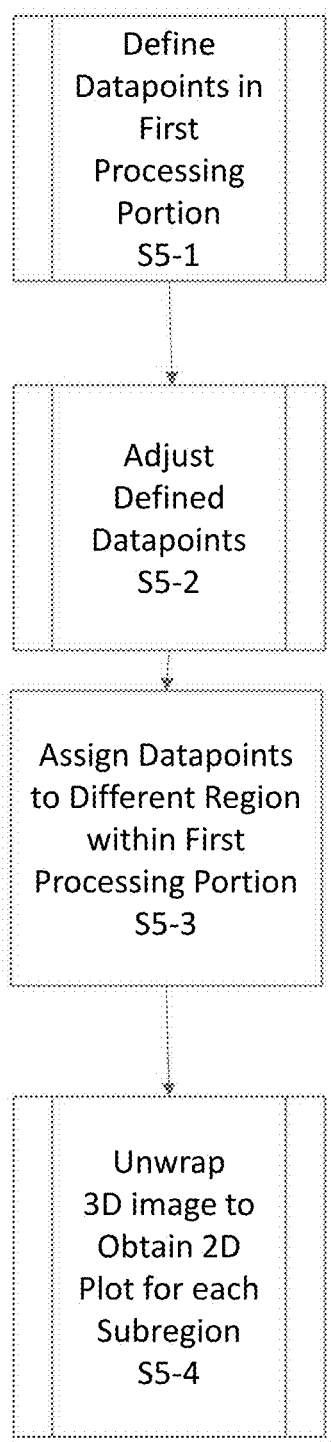
FIG. 8 illustrates an example of a method for processing the first processing portion in accordance with aspects of the disclosure.

At S5, the processor 14 processes the first processing portion 500 (e.g., torso region) to unwrap the portion of the 3D image to create a part of the bodice pattern in 2D (2D plot). FIG. 8 illustrates an example of a method for processing the first processing portion 500 in accordance with aspects of the disclosure.

At S5-1, the processor 14 defines the datapoints in the first processing portion 500. The datapoints are points on the surface of the body of the 3D image in the first processing portion 500. The datapoints may be a fixed number of datapoints P. The datapoints may be defined by horizontal slicing.

Figure 9:
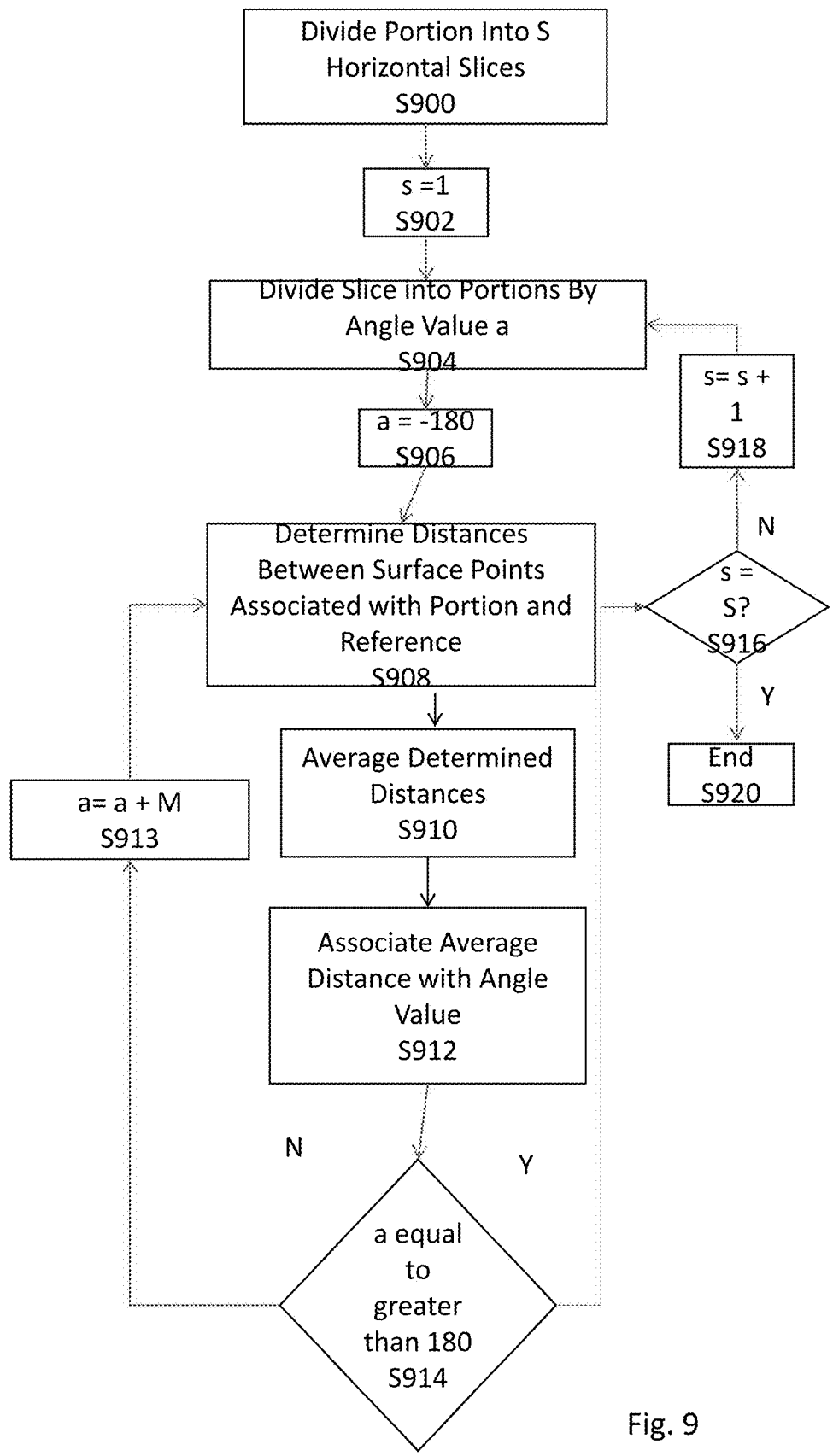
FIG. 9 illustrates an example of a method of defining surface datapoints in the first processing portion in accordance with aspects of the disclosure using horizontal slicing.

FIG. 9 illustrates an example of a method of determining the values for the datapoints in the processing portion in accordance with aspects of the disclosure using horizontal slicing. The processor 14 may partition the processing portion into S equally distributed horizontal slices at S900. In some examples, the horizontal slices can be orthogonal to the longitudinal axis of the body. The S horizontal slice can be arranged by their z-coordinates, such as from bottom to top or from s=1 to s=S (or vice versa). For example, S may equal 200. However, the number of horizontal slices is not limited to 200 and 200 is for descriptive purposes only. Further, a fixed number of datapoints, such as 360 datapoints, can be identified on each horizontal slice in each image, e.g., 1 datapoint per 1 degree. However, in other aspects of the disclosure, there may be more datapoints or less datapoints. In other aspects, there may be one datapoint per 5 degrees or 10 degrees. The number of horizontal slices and datapoints are merely one example and the other numbers (and angles) may be used.

Figure 10:
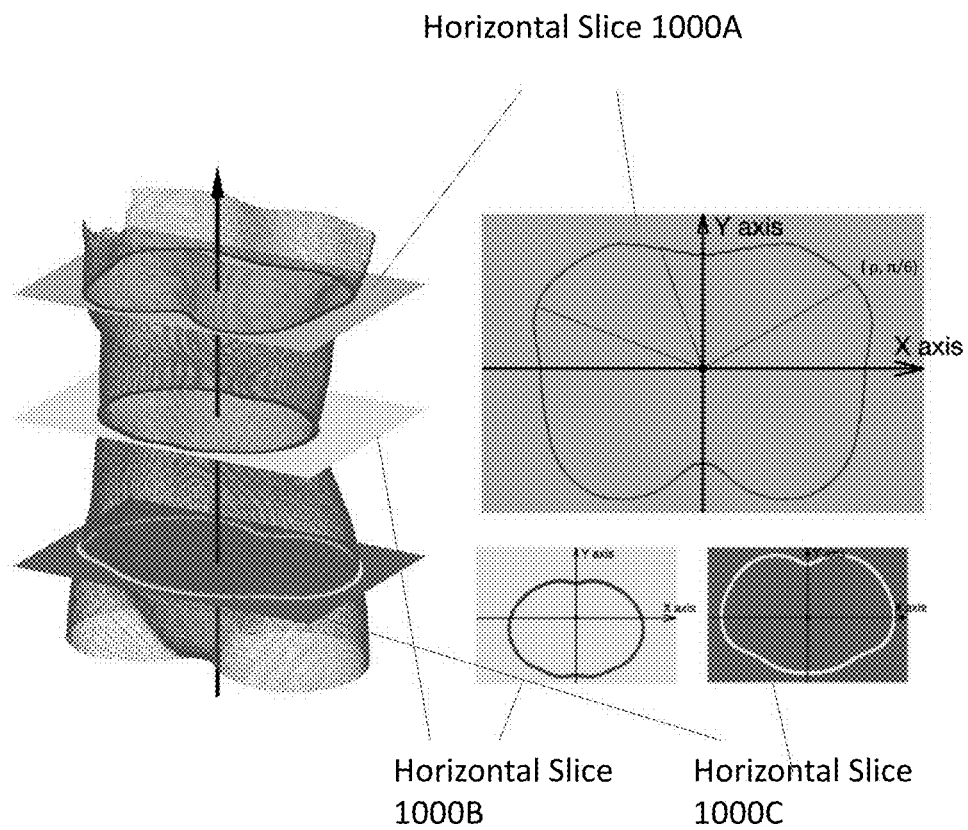
FIG. 10 illustrates three example horizontal slices in accordance with aspects of the disclosure.
Figures 13A, 13B:
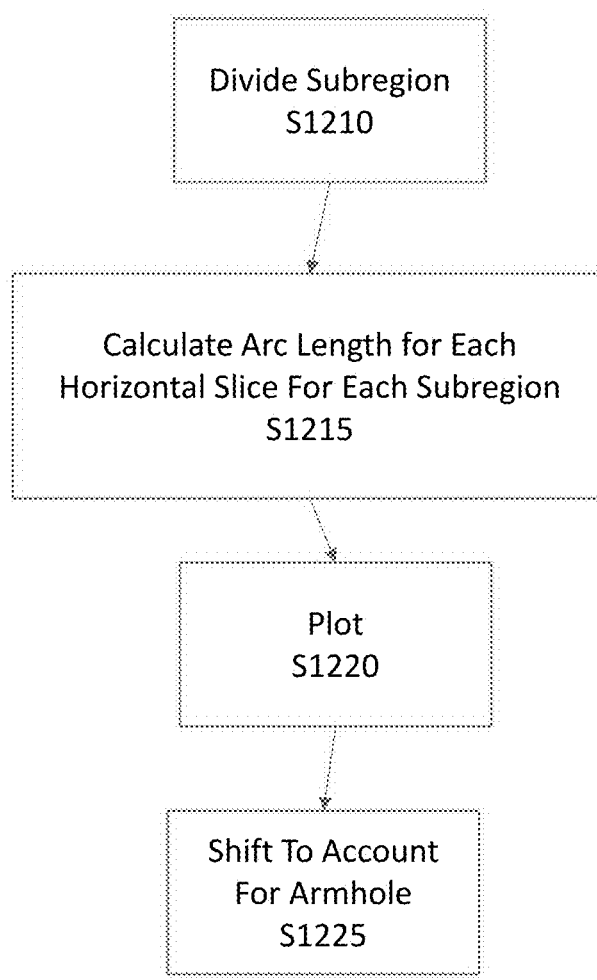
FIGS. 13A and 13B illustrate examples of methods for unwrapping the first processing portion in accordance with aspects of the disclosure for different subregions.

For example, to identify Y datapoints on each horizontal slice, the processor 14 may identify the points on a horizontal slice at angle increments of a°, as shown in a FIG. 10. In other words, starting from −180°, there may be one datapoint identified at every 5 degrees or every degree. For example, the 1st datapoint can be a datapoint i=1 located at the bottommost slice s=1, at the angle of −180°. The 360th datapoint is the datapoint i=360 located on the bottommost slice s=1, at the angle of 179°. The x-, y-, z-coordinates of the datapoints i can be determined by the processor 14 and recorded in sequence ranging from i=1 to i=P, and the recorded locations or coordinates can be stored in the memory 16. The terms bottommost slice, bottom slice, lowermost slice and lowest slice used herein means the same.

If a certain image point is missing in the processing portion, its coordinates can be defined or replaced by undefined values, such as not-a-number (NaN) values, to hold the space for the datapoint, and to maintain the sequence and indexing of other datapoints among i=1 to i=P. The missing surface points can be a result of the removal of limbs (e.g., arms) during pre-processing. Missing points that are not caused by the removal of body parts (e.g., due to bad scan quality) may be filled through interpolation based on existing surrounding points. At S902, the processor 14 may initialize a value of s to 1 to begin a sequence to identify the datapoints from the bottommost horizontal slice (s=1). The processor 14 may include a counter to count the processed sliced. In other aspects, the processor may use a pointer or flag to identify the horizontal slice.

At S904, the processor 14 may partition or divide the horizontal slice s into a plurality of portions represented by an angle value a (the angle is described above). To improve an accuracy of the x-, y-, z-coordinates of the location of the datapoints, the instructions may define a threshold t corresponding to an angle tolerance of each datapoint within the horizontal slice. In some aspects, the tolerance may be based on the number of datapoints. For example, for an angle value a=40° (and datapoints every 1°), the threshold may be t=0.5.

The processor 14 may partition each horizontal slice s into a plurality of portions based on a fixed angular interval defined by the angle value a and the threshold t. For example, each portion may range from an angle a−t to a+t. For example, the portion represented by the angle a=40° may range from 39.5° to 40.5°, and the portion may include multiple surface points. In other aspects, there may be a threshold to average points between horizontal slices to include in the value for the datapoints. For example, if there is a horizontal slice every z=5, then the z-tolerance may be +−2.5.

At S906, the processor 14 may initialize the angle value a to a=−180° (or another angle). At S908, the processor 14 may determine distances between surface points along the horizontal slice s (at the surface) and a reference point for the horizontal slice (all surface points at the angle and within the tolerance(s)). In an aspect of the disclosure, the reference point may be (x=0 and y=0 and the z value may change based on the horizontal slice). The reference point, per slice, may be the projection of the central axis 700 on the slice. However, since the horizontal slice is two dimensional, the z value does not matter. At S910, the processor 14 may determine an average of all the distances determined at S908, e.g., the processor 14 may determine the distances of the multiple surface points from the reference point for the horizontal slice and determine an average among these determined distances. At S912, the processor 14 may associate the datapoint to have the average distance determined at S910 for the angle value a. The value and associated angle (and horizontal slice) may be stored in the memory 16 as the datapoint. For example, for the datapoint associated with a=40°, the processor 14 obtains the distances from surface points between 39.5° to 40.5° (and values off-slice within the z-tolerance) and averages the same.

At S914, the processor 14 may determine whether the angle value a is equal to or greater than 180° (i.e., has all of the angles been processed and the angle has returned to the start?). In other aspects, instead of starting at −180 and moving up to 180° (counterclockwise), the process may start at 180 degrees and may decrement to −180. If the angle value a is smaller than 180° (e.g., all of the angles for datapoints for the slice have not been processed) ("N" at S914), the processor 14 may increment the value of a by M, where M is the angular difference between the datapoints (e.g., 0°+1°=1°) at S913 and the processor 14 may perform subsequently perform S908, S910, S912 and S914 for a next portion in the same horizontal slice. If the angle value a is equal to 180° or greater ("Y" at S914), the processor 14 may determine whether the horizontal slice s is the fixed number S (e.g., 200) at S916. If the horizontal slice s is not equal to S ("N" at S916), then the processor 14 may increment s by one to at S918 and returns to S904 where the processor 14 may subsequently perform S906, S908, S910, S912, and S914 for a next horizontal slice (after S904). If the value of s is S (e.g., 200) at S916, that means all horizontal slices are processed and the processing may end at S920. In other aspects of the disclosure, the processing may begin with the highest number horizontal slice and work downward instead of beginning with horizontal slice s=1 and working upward.

FIG. 10 illustrates an example of three different horizontal slices 1000A-1000C, one horizontal slice 1000A through the breast region, one horizontal slice 1000B through the upper stomach region and a horizontal slice through the lower stomach/butt region.

In an aspect of the disclosure, the defined datapoints may be adjusted at S5-2. The adjustment may be for one or more reasons. For example, the datapoints may be adjusted to make the patterns more realistic for fabric conditions. In one example, fabric does not stick to the skin, e.g., at a cleavage site or between the shoulder blades or butt cheeks. Therefore, the datapoints, and more specifically, the y-coordinates of the datapoints may be adjusted. The processor 14 may process each horizontal slice in order to adjust the y-coordinates. In an aspect of the disclosure, the processor 14 may identify the maximum y-coordinate in each quadrant of the body, e.g., maximum +y in the +x and −x and the maximum −y (absolute value) in the +x and −x. The processor 14 may draw a line connecting the two identified points (back side) and two identified points (front side). The processor 14 may change the y-coordinate of any point(s) between the two identified points (back side) and two identified points (front side) to equal the y-coordinate of the connecting line.

FIG. 11A illustrates an example of adjusting the y-coordinates for two horizontal slices 1100A and 1100B. Slice 1100A goes through the breast region. As illustrated in FIGS. 11A and 11B, the y-coordinates are adjusted to account for the cleavage and the shoulder blades. For example, the y-coordinates for points between the breasts are adjusted. Similarly, the y-coordinates between the shoulder blades are adjusted. The adjustment is shown in FIG. 11A with a different color. Slice 1100B goes through the butt region. As illustrated in FIG. 11C, the adjustment accounts for the space between the butt cheeks. The amount of the adjustment for different slices may be different based on the location of the horizontal slice within the first processing region 500. In fact, certain horizontal slices may not need to be adjusted.

FIG. 11D illustrates a representation of a garment 1150 having the realistic shape due to the adjustment, e.g., the give can be especially seen in the breast region and lower front region.

As will be described later, the datapoints may also be adjusted to allow for drape in the fabric and/or provide ease (either positive or negative), such as to the bust/breast region and other body parts. In some aspects, the surface points or datapoints may be scaled because of a fabric type such as spandex or a garment type such as a swimsuit or bodysuit. In an aspect of the disclosure, the operator may input via a GUI the garment type or fabric type or a desired scaling factor to generate snug-fit or loose fit patterns (which may be generated from the same 3D body scan). Snug-fit patterns may be used for garments intended to cling to the body such as bathing suits and stretchy bodysuits.

At S5-3, the processor 14 assigns datapoints to different regions within the first processing portion 500. These regions may correspond to panels of the bodice pattern. For example, the panels may include a side-front panel 1205, a central front panel 1200, a central-back panel 1215 and a side-back panel 1210.

In an aspect of the disclosure, the assignment may be based on a separation angle. The separation angle may be with respect to the axis. For example, the x-axis for the 2D plot may be 0° and 360° and the y-axis for the 2D plot may be 90° and 270°, where −x is 0° and −y is 90°. The definition of the angles is not limited to the above.

In an aspect of the disclosure, the unwrapping as described herein may be executed on only half of the first processing portion 500 and a mirror unwrapping applied to the other half. However, if the individual does not have a mirror image, the unwrapping may be executed on the entire first processing portion 500.

FIG. 12A illustrates an example of a division of panels in accordance with aspects of the disclosure. In an aspect of the disclosure, the central-front panel 1200 is between 45° and 90°. The side-front panel 1205 is between 0° and 45°. The side-back panel 1210 is between 0° and 315°. The central-back panel 1215 is between 270° and 315°. The definition of the angles is not limited to above. For example, 0° may also be −180° depending on the definition of the axis.

The unwrapping of the different panels may depend on the panel location. For example, side panels may be further divided, whereas the central panels may be determined without additional divisions.

For example, the central panels 1200, 1215 may be determined by calculating the arc length of the corresponding portion of each horizontal slice and stacking the arc lengths based on the z-coordinate. The arc length is determined from the datapoints between the respective angles. For example, the arc length for the central-front panel 1200, may be determined from the datapoints between 45° and 90° (for each horizontal slice) and the arc length for the central-back-panel 1215 may be determined from the datapoints between 270° and 315° (for each horizontal slice) at S1200. The arc length of each slice may be plotted in a 2D plot at S1205.

Figure 14A:
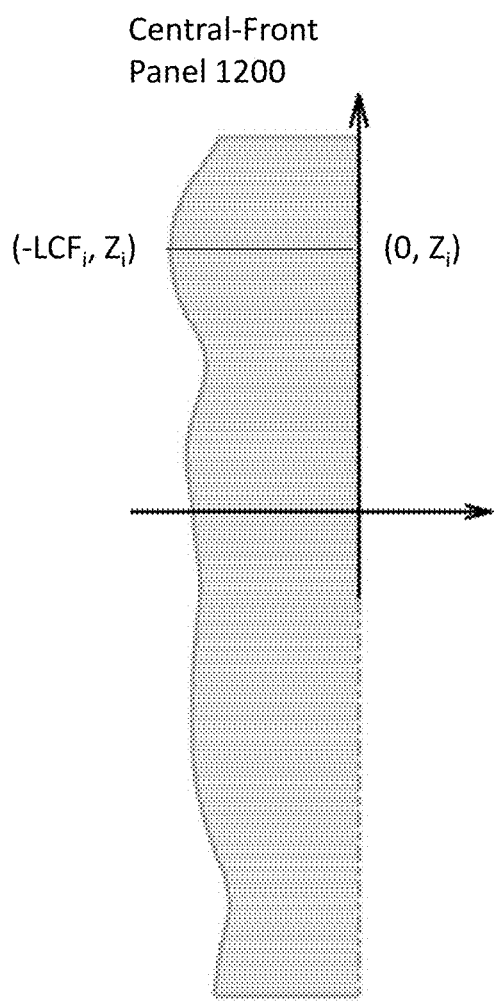
FIG. 14A illustrates an example of a central-front panel in accordance with aspects of the disclosure and FIG. 14B illustrates an example of a central-back panel in accordance with aspects of the disclosure.
Figure 14B:
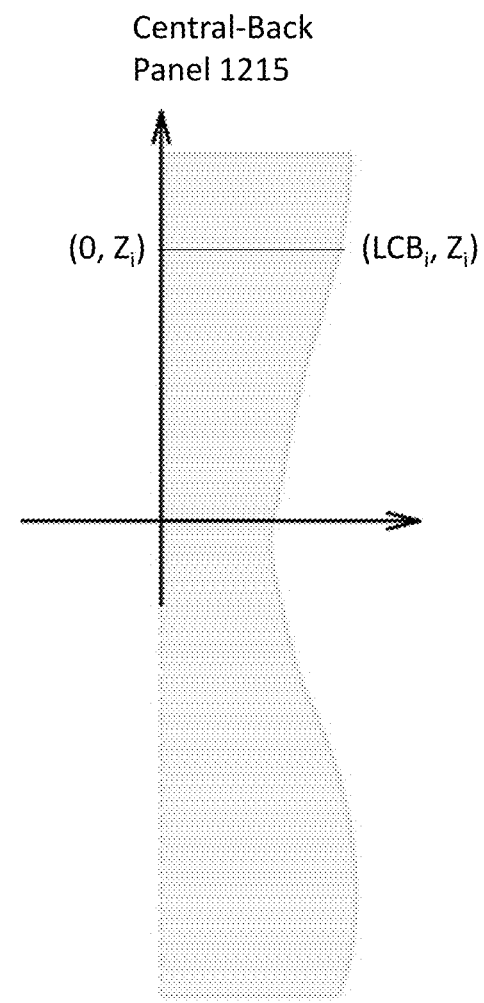

FIGS. 14A and 14B illustrate an example of a stacked arc length profile for the central-front panel 1200 and central-back panel 1215, respectively. The vertical axis is the z-axis (stacking axis) where z is the height of the horizontal slice. The distance from the vertical axis is the arc length. The number of lines in the panel is equal to the number of horizontal slices in the first processing portion 500 (e.g., 200). Each line in FIGS. 14A/14B is the arc length of the corresponding portion of the horizontal slice. The direction the line extends from the vertical axis depends on the panel. For example, in the central-front panel 1200, the horizontal lines extend in the negative axis direction. The arc length for the central-front panel 1200 may be identified by $-LCF_i$ where i is the ith slice between ($1 \leq i \leq max$). The arc length for the corresponding portion the one of the horizontal slices in the central-front panel is highlighted in FIG. 14A and identified by the coordinates ($-LCF_i$, $Z_i$) and (0, $Z_i$). In the central-back panel 1215, the horizontal lines extend in the positive axis direction. The arc length for the central-back panel 1215 may be identified by $LCB_i$ where i is the ith slice between ($1 \leq i \leq max$). The arc length for a corresponding portion of the one of the horizontal slices in the central-back panel 1215 is highlighted in FIG. 14B and identified by the coordinates (0, $Z_i$) and ($LCB_i$, $Z_i$).

The side panels (side-front panel 1205 and side-back panel 1210) may be further divided at S1210. In some aspects, the side panels may be divided in half such as shown in FIGS. 12B and 12C. At S1215, the processor 14 may calculate the arc length of each divided portion of the panels (per each horizontal slice in the first processing portion 500). For example, the angle used for the division of the side-front-panel 1205 may be 22.5° (side-front first sub-panel 1250₁ has an arc length between 22.5° and 45°, and side-front first sub-panel 1250₂ has an arc length between 0° and 22.5°). The arc length for each panel may be determined for each horizontal slice. Since there are two sections of the horizontal slice in the side-front panel 1205, two arc lengths may be determined for the same slice (same z). Once the arc lengths for each section of the horizontal slices are determined, the processor 14 may plot at S1220 the arc lengths (stacked by the z-coordinate). The horizontal lines in the side-front panel 1205 extend in both directions from the vertical axis (negative axis direction and the positive axis direction) and are centered by the sub-division. In other words, the 0 on the plot corresponds to e.g., 22.5°. Arc lengths for the side-front first sub-panel 1250₁ extend in the positive axis direction (positive numbers) and arc lengths for the side-front second sub-panel 1250₂ extend in the negative axis direction (negative numbers). Once again, the number of lines stacked equals the number of horizontal slices in the first processing portion 500 (in the side-front panel region). The arc length for the sections of the slice may be identified as $-LSF$ and $LSF$. Each horizontal slice (section or portion thereof) may have a different arc length. A section of a horizontal slice may have coordinates ($-LSF_i$, $Z_i$) and (0, $Z_i$) and the other section of the same horizontal slice may have coordinates (0, $Z_i$) and ($LSF_i$, $Z_i$) such as shown in FIG. 15A, where i is the horizontal slice. The vertical axis is the division between sub-panels of the panel. FIG. 15B illustrates an example of a side-back panel 1210. The arc lengths for the sections of the horizontal slice(s) may be identified as $-LSB$ and $LSB$. A section of a horizontal slice may have coordinates ($-LSB_i$, $Z_i$) and (0, $Z_i$) and the other section of the same horizontal slice may have coordinates (0, $Z_i$) and ($LSB_i$, $Z_i$) such as shown in FIG. 15B, where i is the horizontal slice. Similar to the side-front panel 1205, the side-back panel 1210 is divided into two sub-panels, side-back first sub-panel 1260₁ has an arc length between 315° and 337.5°, and side-back first sub-panel 1260₂ has an arc length between 337.5° and 360° (0°). In the 2D plot, the panel is centered at the division.

In certain aspects of the disclosure, the side-panels may be adjusted to account for arm-holes. In an aspect of the disclosure, the adjustment may define the bottom of the arm-hole. For example, the processor 14 may determine the lowest horizontal slice as having at least a NaN value, which indicates that data was removed for the limbs.

Horizontal slices above this horizontal slice may be adjusted to create a seam. In an aspect of the disclosure, the arc length is shifted to align the seam at the length of the slice corresponding to the opening, e.g., first slice with NaN. At S1225, the processor 14 shifts the plotted arc lengths. FIG. 15C illustrates an adjusted side-back panel 1210'. FIG. 15C versus FIG. 15B shows the difference in the panel for the armhole. The shifted portion 1500 is shown in FIG. 15C and aligned with the seam. Depending on the individual, the side-front panel 1205 may also need to be adjusted if the NaN datapoints extend closer to the axis.

At S7, the processor 14 executes processing of the second processing portion 505.

Figure 16:
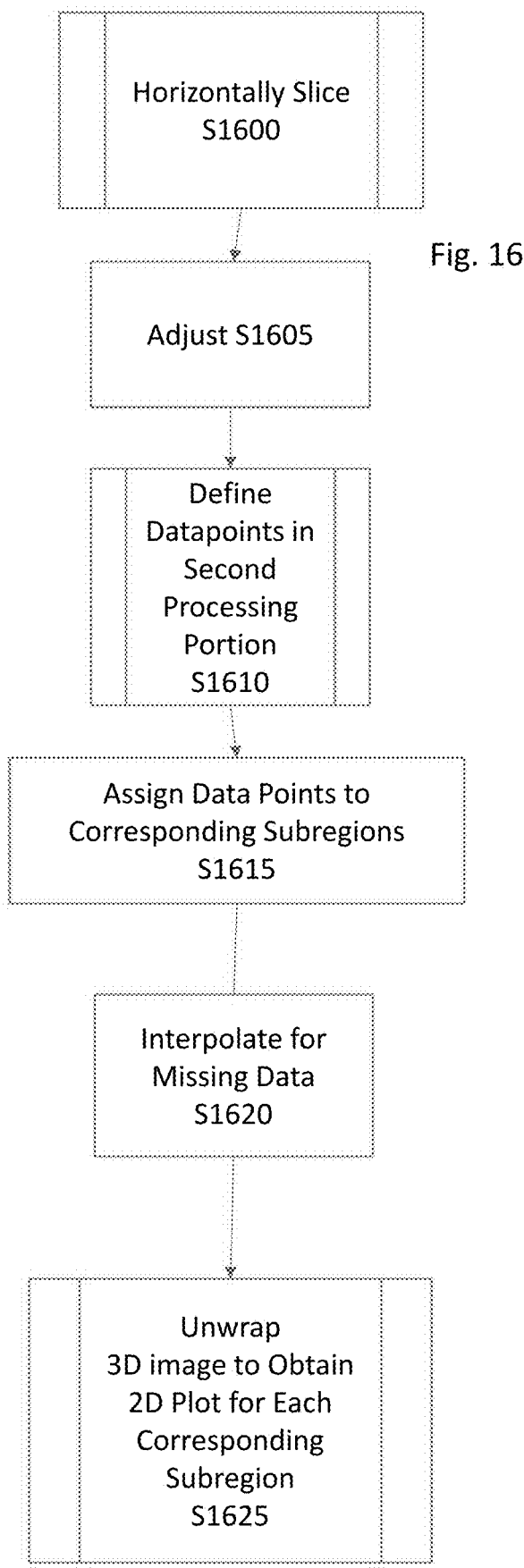
FIG. 16 illustrates an example of a method of processing the second processing portion in accordance with aspects of the disclosure.

FIG. 16 illustrates an example of a method for processing the second processing portion 505 in accordance with aspects of the disclosure. Initially, the processor 14 may divide the second processing portion 505 into horizontal slices in a similar manner as described above. However, since the second processing portion 505 is smaller than the first processing portion 500, the number of horizontal slices may be less than the first processing portion 500. For example, the second processing portion 505 may be divided into 40 slices at S1600.

At S1605, the image data of the 3D image for the second processing portion 505 may be adjusted. As described above, the image data may be adjusted based on realistic behavior of the fabric such as between the shoulder blades. In an aspect of the disclosure, the y-coordinate(s) of the second processing portion 505 in the horizontal slices may be adjusted to account for the fabric not being skintight as discussed above for certain datapoints such as between the shoulder blades.

Figure 17A:
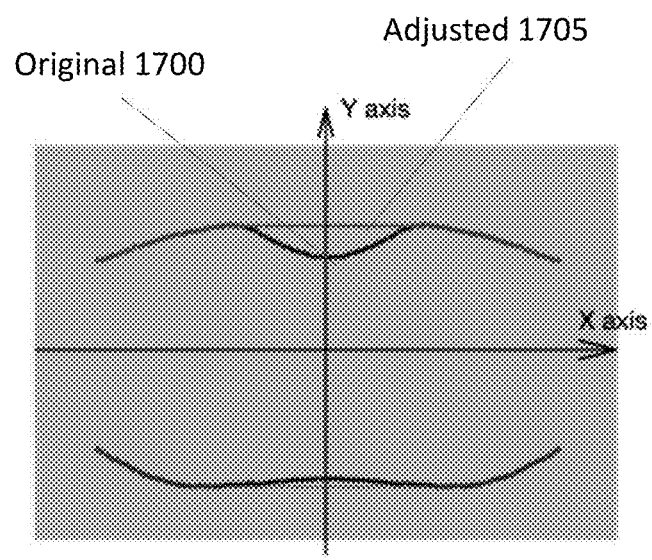
FIGS. 17A and 17B illustrate an example of original 3D image data and the adjusted image data in the second processing portion in accordance with aspects of the disclosure.
Figure 17B:
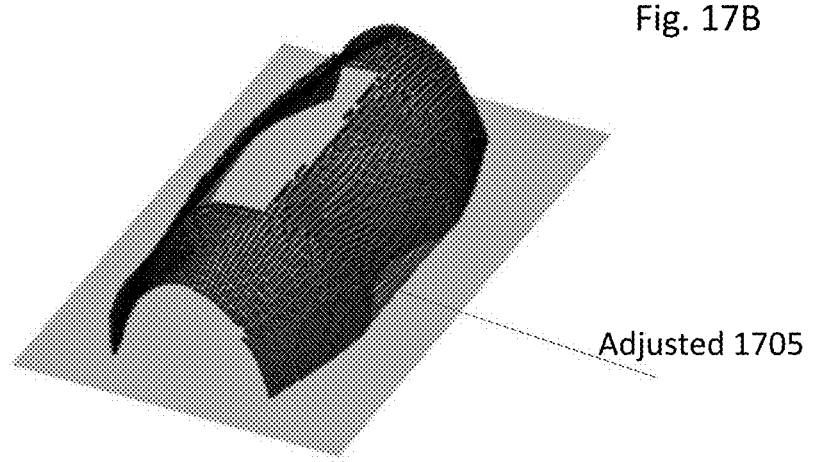

FIGS. 17A and 17B illustrate an example of the original 3D image data 1700 and the adjusted data 1705 to account for the shoulder blades. As it can be seen, the y-coordinate (absolute value is increased between the ends of the shoulder blades).

Figure 18:
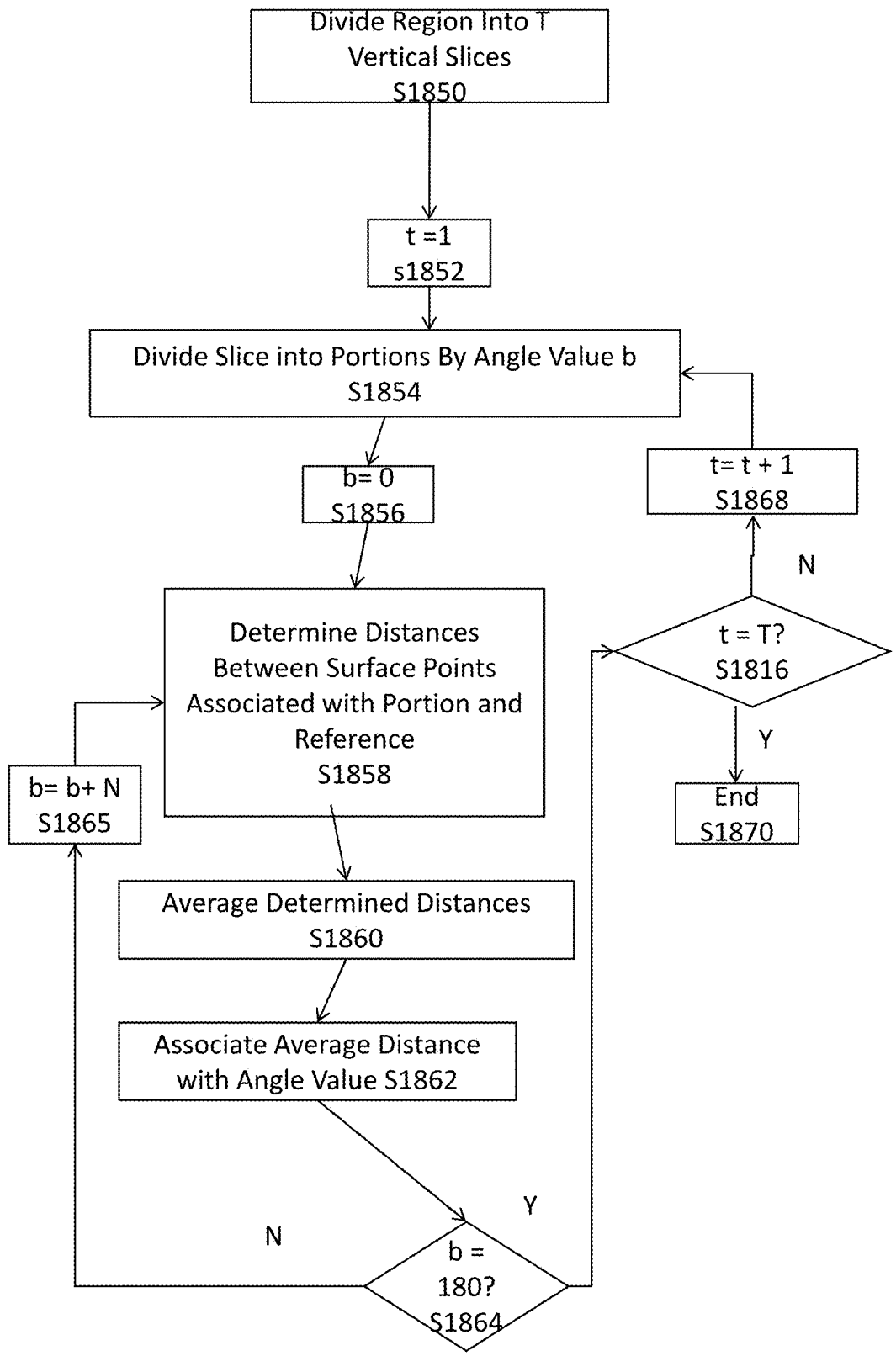
FIG. 18 illustrates an example of a method of defining surface datapoints in the second processing portion in accordance with aspects of the disclosure using vertical slicing.

At S1610, the processor 14 defines the datapoint P' in the second processing portion 505. FIG. 18 illustrates an example of a method of defining the datapoints P' in the second processing portion 505 in accordance with aspects of the disclosure. In an aspect of the disclosure, the second processing portion 505 may be vertically sliced. In some aspects, only one half of the second processing portion 505 may be sliced (corresponding to the half of the first processing portion 500 and the remaining portion mirrored). However, this disclosure is not limited to mirroring. For example, an individual may be asymmetric.

At S1850, the processor 14 may divide the second processing portion 505 into T vertical slices (e.g., half the portion). The vertical slices may be equidistance based on the x-value. In some aspects of the disclosure, there may be 50 vertical slices. However, the number of vertical slices is not limited to 50 and 50 is for descriptive purposes only.

At S1852, the processor 14 may initialize a value of t to 1 to begin a sequence to identify the datapoints from the vertical slice (t=1). The processor 14 may include a counter to count the processed vertical slice. In other aspects, the processor 14 may use a pointer or flag to identify the vertical slice.

At S1854, the processor 14 may partition or divide the vertical slice t into a plurality of portions represented by y/z values. Each portion may be associated with a range of y/z-values. To improve an accuracy of the x-, y-, z-coordinates of the location of the datapoints, the instructions may define a threshold t''' corresponding to an y/z-value tolerance of each datapoint within the vertical slice. In some aspects, the tolerance may be based on the number of datapoints for the vertical slice. The more datapoints per vertical slice, the smaller the threshold t''' may be. Additionally, the portion may include image data off-slice (image data between the vertical slices). For example, if there is a vertical slice every x=5, then the x-tolerance may be +−2.5 versus 0.5 when the vertical slice is every x=1.

At S1856, the processor 14 may initialize an angle value to a minimum value (absolute value). For example, the minimum value may be b=0 (where b is the angle value, and b equal zero may be the back. In other aspects, b=0 may be defined as the front depending on the definition of the axis. At S1858, the processor 14 may determine the y and z-coordinate for all surface points associated with the portion.

At S1860, the processor 14 may determine an average of all the y and z-coordinates determined at S1858 (distance). For each portion, the processor 14 may determine the average distance. At S1862, the processor 14 may associate the datapoint to have the average distance.

If a certain image point is missing on the vertical slice, its coordinates can be defined or replaced by undefined values, such as not-a-number (NaN) values, to hold the space for the datapoint, and to maintain the sequence and indexing of other points among i=1 to i=P'. The missing points can be a result of the removal of the head and neck. In other aspects, the missing points may be interpolated by the adjacent points using linear approximation. However, the missing points related to the armhole are not interpolated. The interpolation may be applied after the datapoints P' are defined via the horizontal slicing. However, definition of the datapoints is not required. For example, the second processing portion may be the horizontal slices. Where there are missing points because of the removal of the head neck, the points of the horizontal slice may be filled in to maintain the trajectory of the curve(s). In this matter, the coordinates for the points of the surface may be assigned (missing points). Then while the second processing portion is sliced, the coordinates for points that were initially missing, are now known.

At S1864, the processor 14 may determine whether the angle value b being processed is the angle (e.g., 180°). This indicates that all portions of the divided vertical slice have been processed. In other aspects, instead of starting at b=minimum, the process may start at b=maximum. If the b value is not the maximum ("N" at S1864), the processor 14 may increment the value of b by a preset angle "N" at S1865, where N is the b increment between the datapoints and the processor 14 can perform the S1858, S1860, S1862 and S1864 for a next portion in the same vertical slice. If the b a is the maximum ("Y" at S1864), the processor 14 may determine whether the vertical slice t is the fixed number T' (e.g., 50) at S1816. If the vertical slice t is not equal to T' (NO at S1816), then the processor 14 may increment t by one at S1868 and return to S1854. where the processor 14 may subsequently perform S1856, S1858, S1860, S1862, and S1864 for a next vertical slice. If the value of t is T' (e.g., 50) at S1816, that means all vertical slices are processed and the processing may end.

Figure 19:
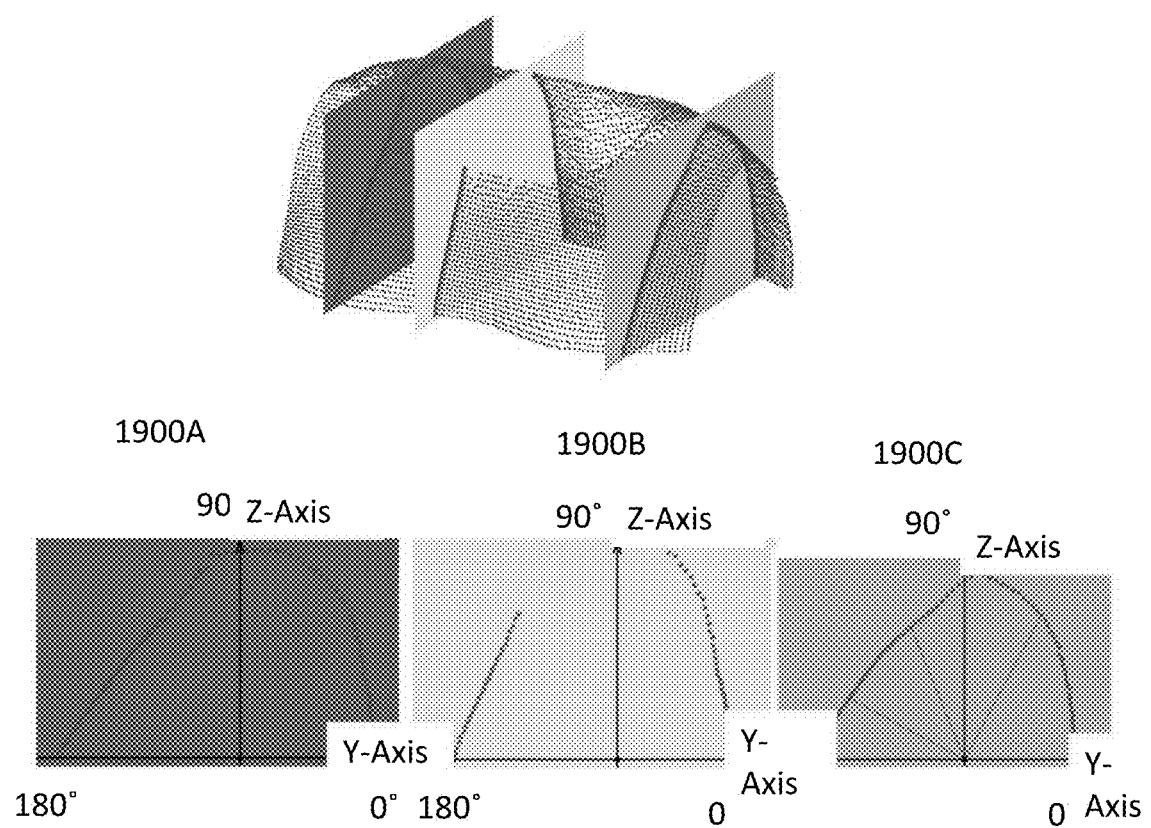
FIG. 19 illustrates three example vertical slices in accordance with aspects of the disclosure.

FIG. 19 illustrates an example of three vertical slices 1900A-1900C in accordance with aspects of the disclosure. Vertical Slice 1900B includes NaN datapoints. Vertical Slice 1900C shows an example of three processing angle (represented by three lines)

At S1615, the processor 14 assigns the datapoints P' for the second processing portion 505 to panels, e.g., which correspond to the central-front panel 1200, central-back panel 1215, side-front panel 1205 and side-back panel 1210. For example, the side-front shoulder corresponds to the side-front panel 1205, the central-front shoulder corresponds to the central-front panel 1200, the side-back shoulder corresponds to the side-back panel 1210 and the central-back shoulder corresponds to the central-back panel 1215.

Figure 20A:
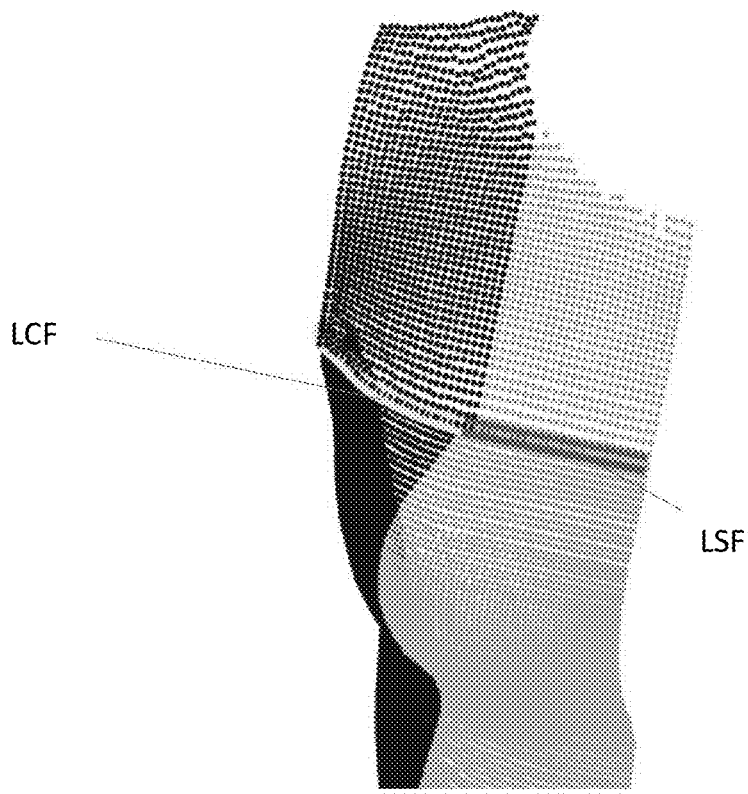
FIGS. 20A and 20B illustrate examples of the arc lengths for the topmost horizontal slices in panels in the first processing portion where the corresponding subregion in the second processing portion is also illustrated.
Figure 20B:
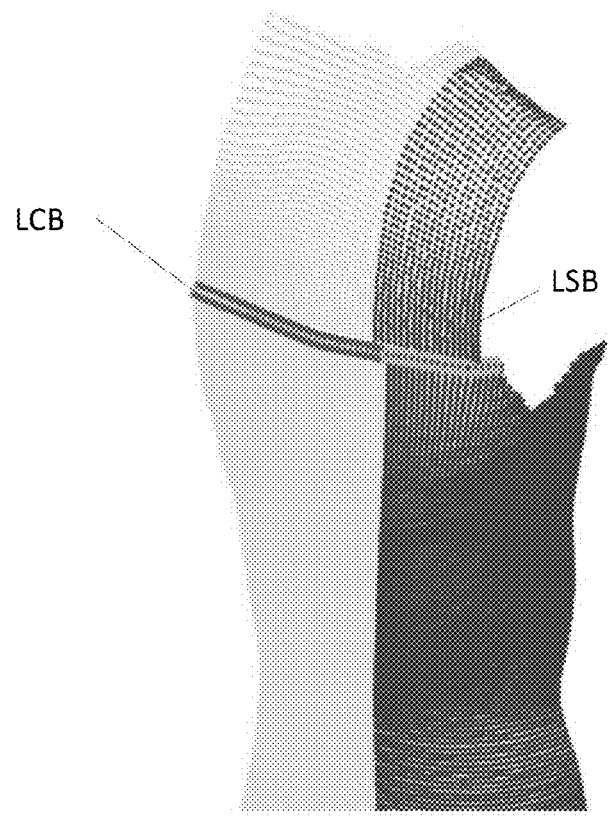

Vertical slices are assigned to the subregions based on a ratio. For example, a ratio of the arc length for the topmost slice for the central-front panel and the side-front panel is determined, e.g., LCF/(LSF+LCF) (the arc length as shown in FIG. 20A). This ratio may be rounded to the nearest integer. Similarly, the ratio of the arc lengths for the central-back panel and the side-back panel is determined LCB/(LSB+LCB) (the arc length as shown in FIG. 20B). In FIG. 20B, the arc length of the topmost slice for the central-front panel is LCB and the arc length of the topmost slice for the side-front panel is LSB. The ratio (e.g., LCF/(LSF+LCF)) is multiplied by half of the total number of vertical slices (since only unwrapping half of the second processing portion) to assign the vertical slices to the central-front shoulder. The side-front shoulder is assigned the remaining vertical slices (from the half). This process is repeated for the back.

Figure 21:
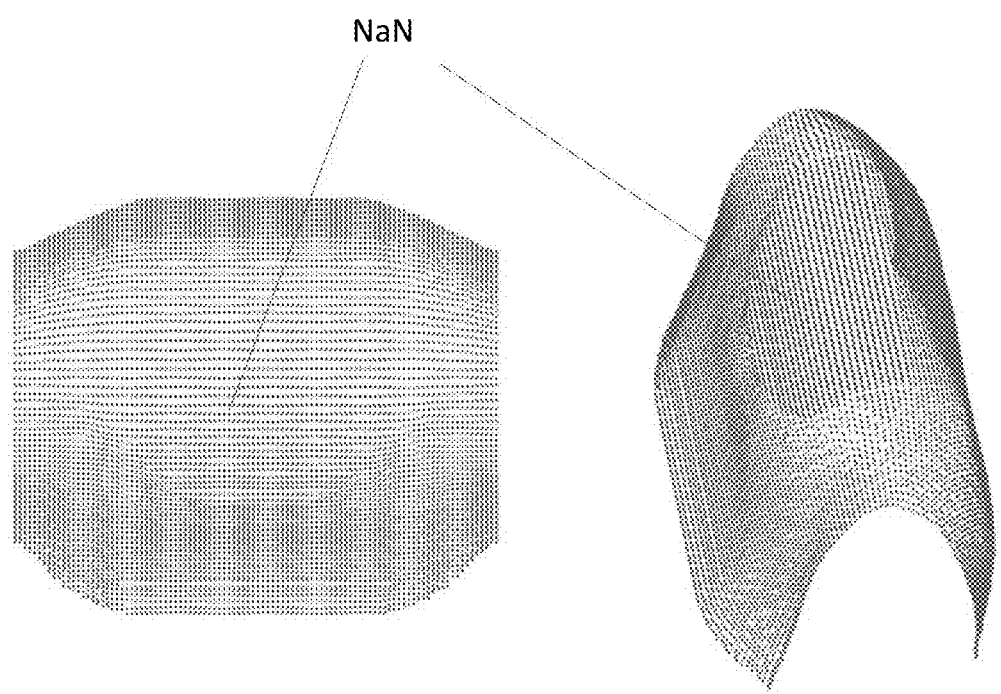
FIG. 21 illustrates datapoints which are removed for creating the neckline in accordance with aspects of the disclosure which are interpolated for part of the processing of the second processing portion in accordance with aspects of the disclosure.

At S1620, the missing data (NaN) are interpolated based on the datapoints from the horizontal slicing and adjusting S1605. The missing data is data that was intentionally removed for the neckline (shown in FIG. 21 as NaN). The interpolation may be based on linear approximation or another approximation method.

At S1625, the processor 14 unwraps each subregion of the second processing portion 505. Once again, the processor 14 may only unwrap half of the second processing portion 505 and mirror for the other half. The subregions may include a side-front shoulder, a central-front shoulder, a side-back shoulder and a central-back shoulder.

Figure 22:
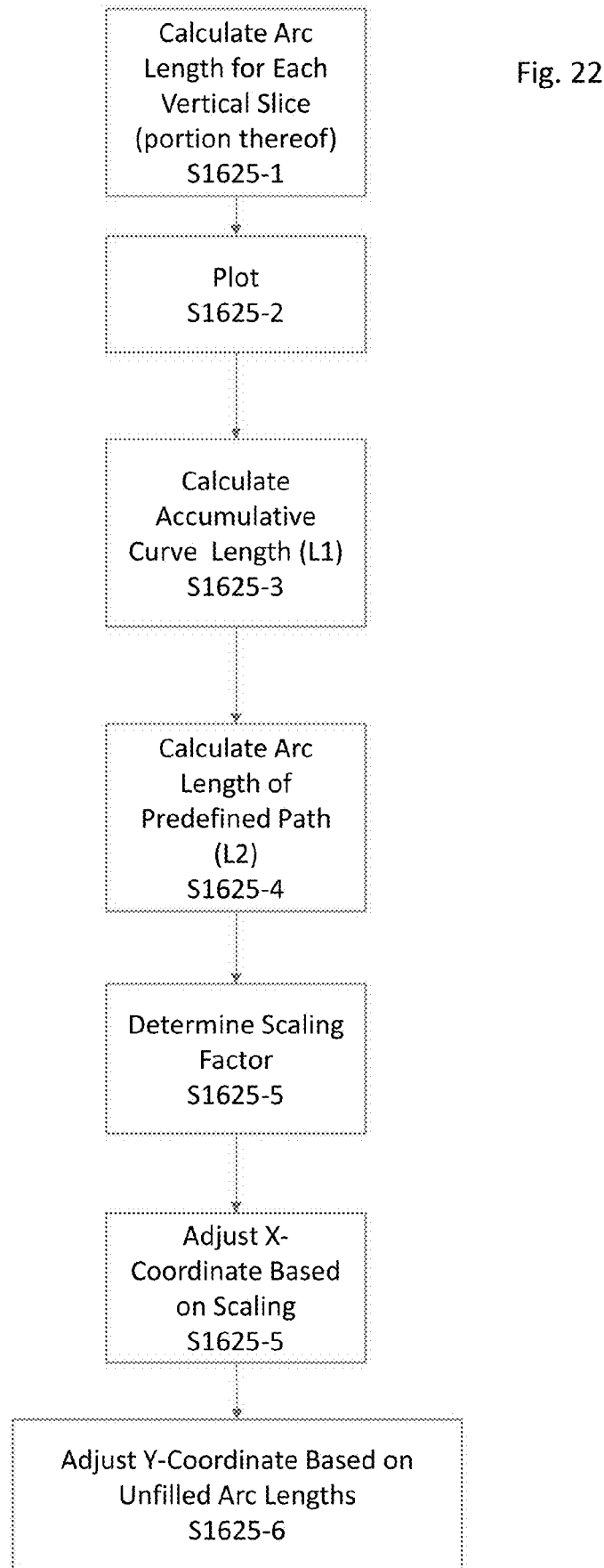
FIG. 22 illustrates an example of a method for unwrapping each subregion of the second processing portion in accordance with aspects of the disclosure.

FIG. 22 illustrates an example of a method for unwrapping each subregion of the second processing portion 505 in accordance with aspects of the disclosure. FIG. 22 will be explained with reference to the side-front shoulder subregion as an example. As noted above, a subset of the vertical slices was assigned to the side-front shoulder. At S1625-1, the processor 14 calculates the arc length for a portion of each of the vertical slices assigned to the side-front shoulder. In this aspect, since the side-front shoulder is in the front only 90° of the arc is relevant. In an aspect of the disclosure, the arc length from 90° to 180° may be determined. In this calculation, the interpolated points are included.

Figure 23:
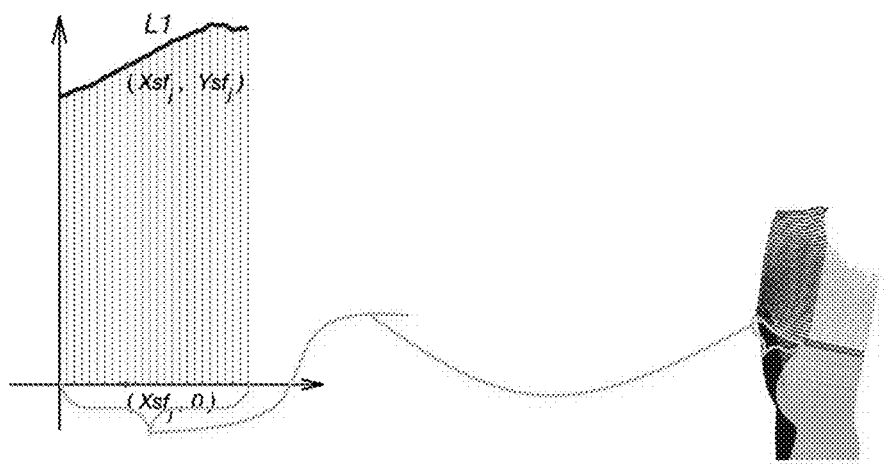
FIG. 23 illustrates an example of an initial plot created for a side-front shoulder in accordance with aspects of the disclosure generated using interpolated datapoints.

At S1625-2, the processor 14 plots the arc lengths for the vertical slices (respective portions) on a 2D plot. The arc lengths are represented by vertical lines extending from a horizontal axis. The height of the lines (length extended from the horizontal axis) is the arc length. In an aspect of the disclosure, the height may be referenced in y-coordinates and the horizontal axis may be referenced in x-coordinates. In this initial plot, the lines are orthogonal to the horizontal axis. The number of lines equals the number of vertical slices assigned to the subregion, e.g., side-front shoulder. In an aspect of the disclosure, the length of the baseline equals the arc length of the topmost horizontal slice for the side-front panel 1205. The length of the baseline and arc length of the topmost horizontal slice for the side-front panel 1205 are illustrated in FIG. 23. FIG. 23 also illustrates an example of the plot created at S1625-2.

Figure 24A:
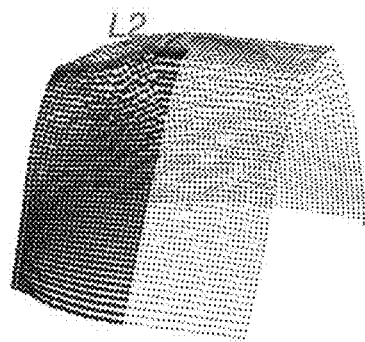
FIGS. 24A and 24B illustrate an example of an arc L2 used to determine a scaling factor in accordance with aspects of the disclosure.
Figure 24B:
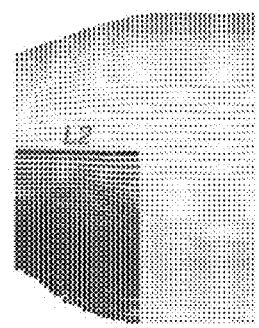

At S1625-3, the processor 14 calculates an accumulative curve of the tops of the boundary points (L1) on the 2D plot. This curve is shown in FIG. 23 as L1. The boundary points are $Xsf_j$, $Ysf_j$), and the origins of the lines are ($Xsf_j$, 0) where j is the slice. At S1625-4, the processor 14 calculates an arc length for a preset arc L2 from the 3D datapoints. This preset arc is a curve connecting datapoints on the slices at 90°. The arc L2 is orthogonal to the vertical slices. FIGS. 24A and 24B show an example of arc L2.

Figure 25A:
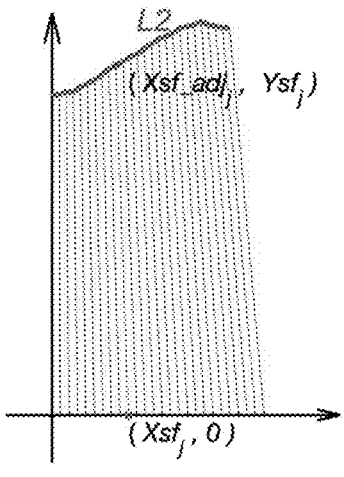
FIG. 25A illustrates an example of a work-in-progress plot created for the side-front shoulder in accordance with aspects of the disclosure after applying the scaling factor and FIG. 25B illustrates an example of the plot created for the side-front shoulder in accordance with aspects of the disclosure adjusted for the arc lengths without the interpolation.

At S1625-4, the processor 14 calculates a scaling factor. In an aspect of the disclosure, the scaling factor β is L2/L1 (ratio of the 3D arc lengths and the 2D accumulative curve length). The scaling factor β is used to adjust the value of the x-coordinate for the boundary points in the 2D plot. At S1625-5, the processor 14 adjusts the x-coordinate for the boundary points using the scaling factor β such that the length of the tops will equal the 3D arc length. In some aspects, the adjustment may be multiplication, e.g., $Xsf\_adj_j = β \cdot Xsf_j$. The coordinates of the origins of the lines in the plot are not adjusted, e.g., still at ($Xsf_j$, 0). The boundary points become ($Xsf\_adj_j$, $Ysf_j$), where j is the slice. After the adjustment, the lines in the plot may not be orthogonal to the x-axis. FIG. 25A illustrates an example of the plot after this adjustment. As shown in FIG. 25A, the lines are now angled inward toward the vertical axis.

At S1625-6, the processor 14 adjusts the y-coordinates for the boundary points. The arc lengths calculated in S1625-1 are determined using the filled in scan (interpolated point covering the neck hole). Before the interpolation, points in the neck region were intentionally removed for the neckline, creating the neck hole (FIGS. 4A, 4B). However, the neck hole and the neckline need to be reflected in the 2D plot. Therefore, in order to achieve the neckline, the y-coordinates for the boundary points need to be adjusted (for each vertical slice). At S1625-6, the processor 14 calculates the arc length for a portion of each of the vertical slices assigned to the side-front shoulder without the interpolation (L0). For slices where there was no interpolation, the arc length calculated in S1625-1 will be the same as the arc length calculated in S1625-6. However, for slices where there was interpolation (because of the neck hole), the arc length calculated in S1625-6 will be shorter than the arc length S1625-1. The y-coordinate for the boundary points may be scaled by a scaling factor to match the shorter arc lengths.

Figure 25B:
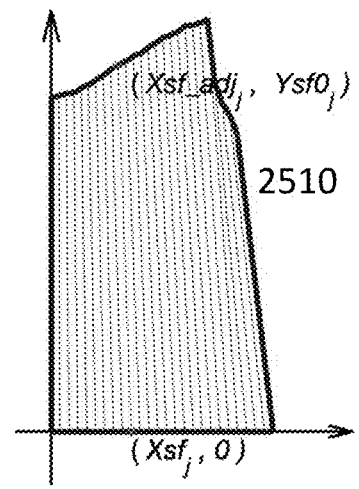

FIG. 25B illustrates an example of a plot of a side-front shoulder 2510 in accordance with aspects of the disclosure after the above adjustments.

The plots for the central-front shoulder 2600, the side-back shoulder 2605 and the central-back shoulder may be created in the same manner as described above, e.g., using method illustrated in FIG. 22. However, for the side-back shoulder and the central-back shoulder the plots are flipped after S1625-6.

Figure 26A:
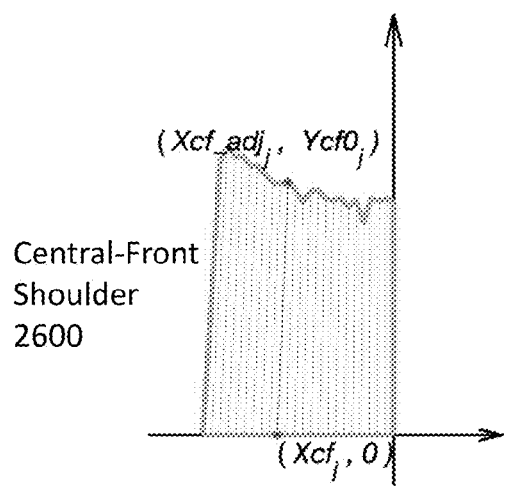
FIG. 26A illustrates an example of a plot for the central-front shoulder in accordance with aspects of the disclosure.
Figure 26B:
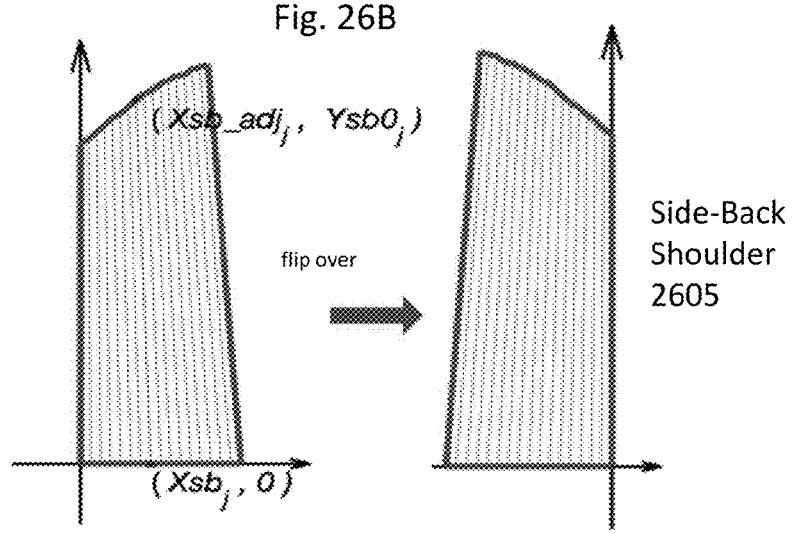
FIG. 26B illustrates an example of the side-back shoulder plot before and after flipping in accordance with aspects of the disclosure and FIG. 26C illustrates an example of the central-back shoulder plot before and after flipping in accordance with aspects of the disclosure.
Figure 26C:
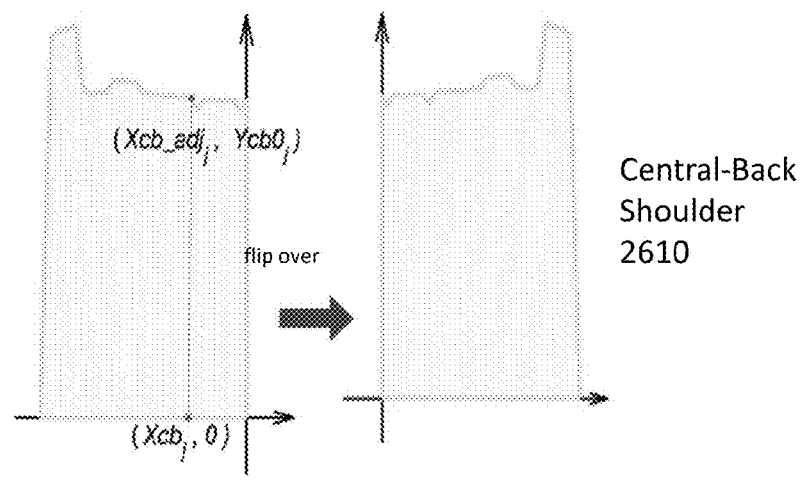

FIG. 26A illustrates an example of a plot for the central-front shoulder 2600 (after the above-described adjustments). FIG. 26B illustrates an example of the side-back shoulder plot before and after flipping. FIG. 26C illustrates an example of the central-back shoulder plot before and after flipping.

Figure 27:
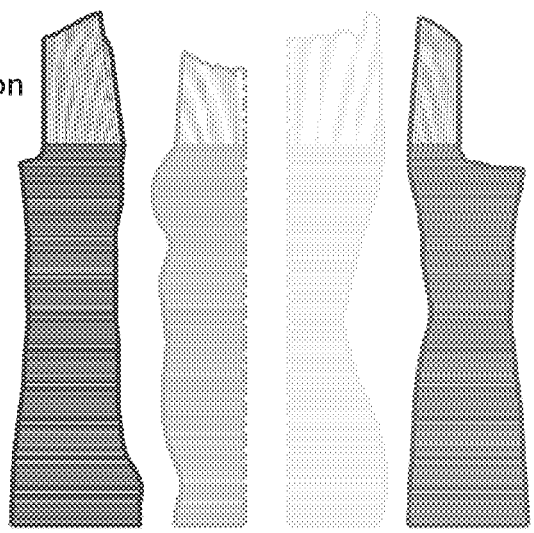
FIG. 27 illustrates an example of the combined panels in accordance with aspects of the disclosure (which can be further combined to form a bodice pattern), where subregions in the first processing portion and the second processing portion are combined.

At S9, the processor 14 combines the plot created for the first processing portion with the plot created for the second processing portion. For example, the plot for the side-front shoulder 2510 is combined with plot for the side-front panel 1205 (side-front combination 2700), the plot for the central-front shoulder 2600 is combined with the plot for the central-front panel 1200 (central-front combination 2705), the plot for the side-back shoulder 2605 is combined with the plot of the side-back panel 1210 (side-back combination 2710) and the plot for the central-back shoulder 2610 is combined with the plot for the central-back panel 1215 (central-back combination 2715). FIG. 27 illustrates an example of the four combinations panels.

Figure 28:
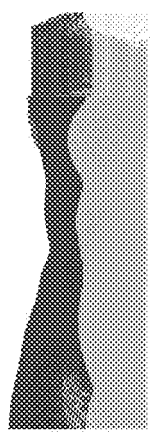
FIGS. 28 and 29 illustrate different views of a representation of an example of datapoints and panel assignment in accordance with aspects of the disclosure.
Figure 29:
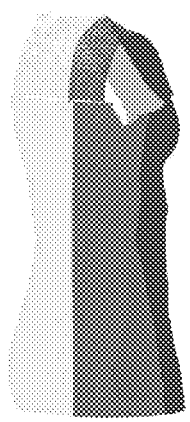

In some aspects of the disclosure, the combinations 2700, 2705, 2710, 2715 may be further combined to form the bodice pattern. For example, the side-front combination 2700 may be combined with the central-front combination 2705 and the side-back combination 2710. The central-back combination 2705 may be combined with the side-back combination 2710, etc . . . . FIGS. 28 and 29 illustrate different views of a representation of an example of data-points and panel assignment in accordance with aspects of the disclosure. The panels. pattern and combinations may be stored in memory 16.

In some aspects, the full bodice pattern may be generated by creating the mirror copies of the above patterns. In other aspects, if the individual is not symmetric, instead of only processing half of the target region, the above methods may be performed on the entire region.

Figures 30A, 30B, 30C:
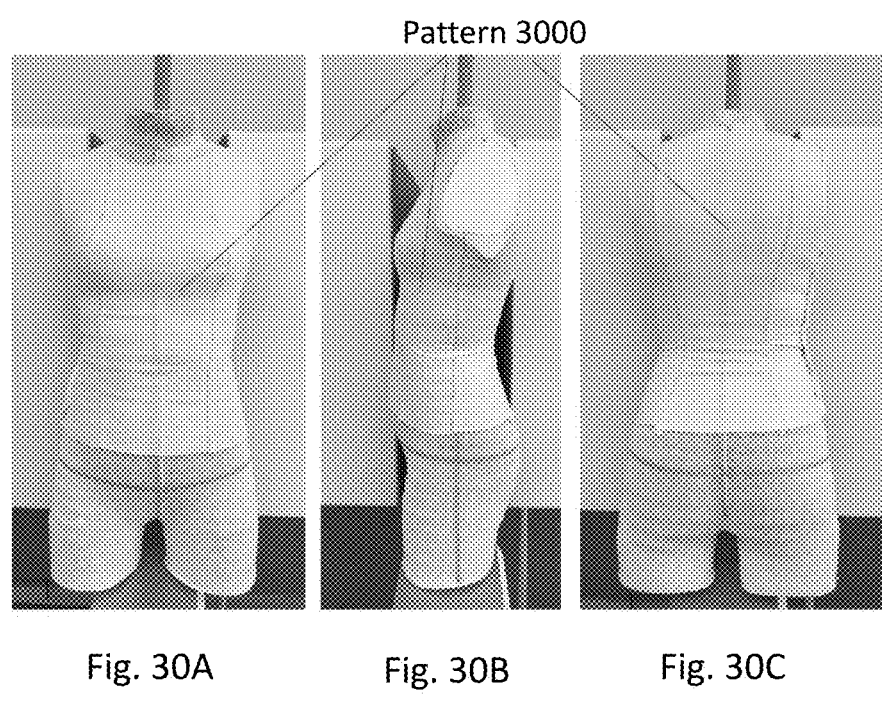
FIGS. 30A-30C illustrate an example of a custom fit bodice pattern fabricated in accordance with aspects of the disclosure.

FIGS. 30A-30C illustrate a custom fit bodice pattern 3000 fabricated in accordance with aspects of the disclosure. As shown, the combinations of the panels may be stitched together. In an aspect of the disclosure, the stitching pattern may also be customized. These different stitching patterns may be stored in the memory 16 for the same bodice pattern to create a collection of patterns.

As described above, the subregions (or regions) may be equally divided by separation angle (panel separation angles), where each subregion is 45°. However, in other aspects of the disclosure, the regions need not be divided equally. The panel separation angles may be customized by an operator to any angle to create stylized patterns as desired. FIG. 31A illustrates an example of the four panel combinations where the separation angle is varied, e.g., side-front combination 2700', central-front combination 2705', side-back combination 2710' and central-back combination 2715'.

FIG. 31B illustrates different views of a representation of an example of datapoint panel assignment where the separation angles are varied and FIG. 31A illustrates an example of the corresponding bodice pattern.

Figure 32A:
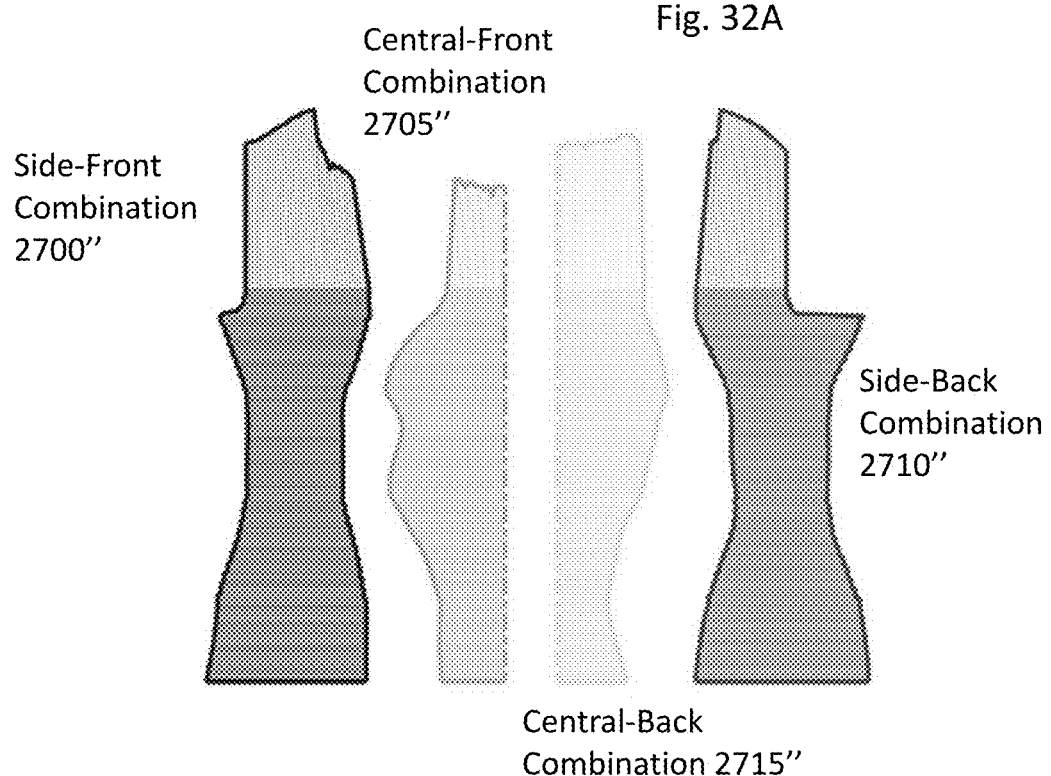
FIG. 32B illustrates different views of a representation of an example of datapoint panel assignment where the separation angles are varied across different horizontal slices and FIG. 32A illustrates an example of the corresponding panels which can be combined to form a bodice pattern in accordance with aspects of the disclosure.

Also as described above, the same separation angle is used for each horizontal slice (for the subregions) to divide the horizontal slice into the different subregions. However, in other aspects, the separate angle may be varied across different horizontal slices. For example, if the first processing portion 500 was divided into 150 horizontal slices (where slice 1 is the topmost slice), for slices 1-50, the separation angle for the central-front panel 1200 and the side-front panel 1205 may be reduced from 60° to 40°, gradually for slices 51-80, the separation angle for the central-front panel 1200 and the side-front panel 1205 may be 40°, for slices 81-130, the separation angles may increase gradually from 400 to 600 and slices 131-150 may have a separation angle of 60°. FIG. 32A illustrates an example of the four panel combinations where the separation angle is varied across the different horizontal slices, e.g., side-front combination 2700'', central-front combination 2705'', side-back combination 2710'' and central-back combination 2715''.

Figure 32B:
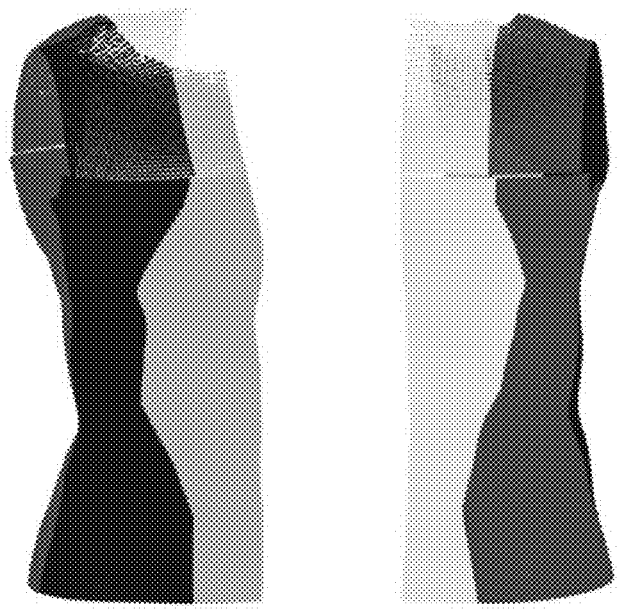

FIG. 32B illustrates different views of a representation of an example of datapoint panel assignment where the separation angles are varied across the different horizontal slices. FIG. 32A illustrates an example of a bodice pattern where the separation angles are varied across the different horizontal slices. The varying of the separation angle alters the shape of the seams and may be used to create different stylistic patterns.

Figure 33:
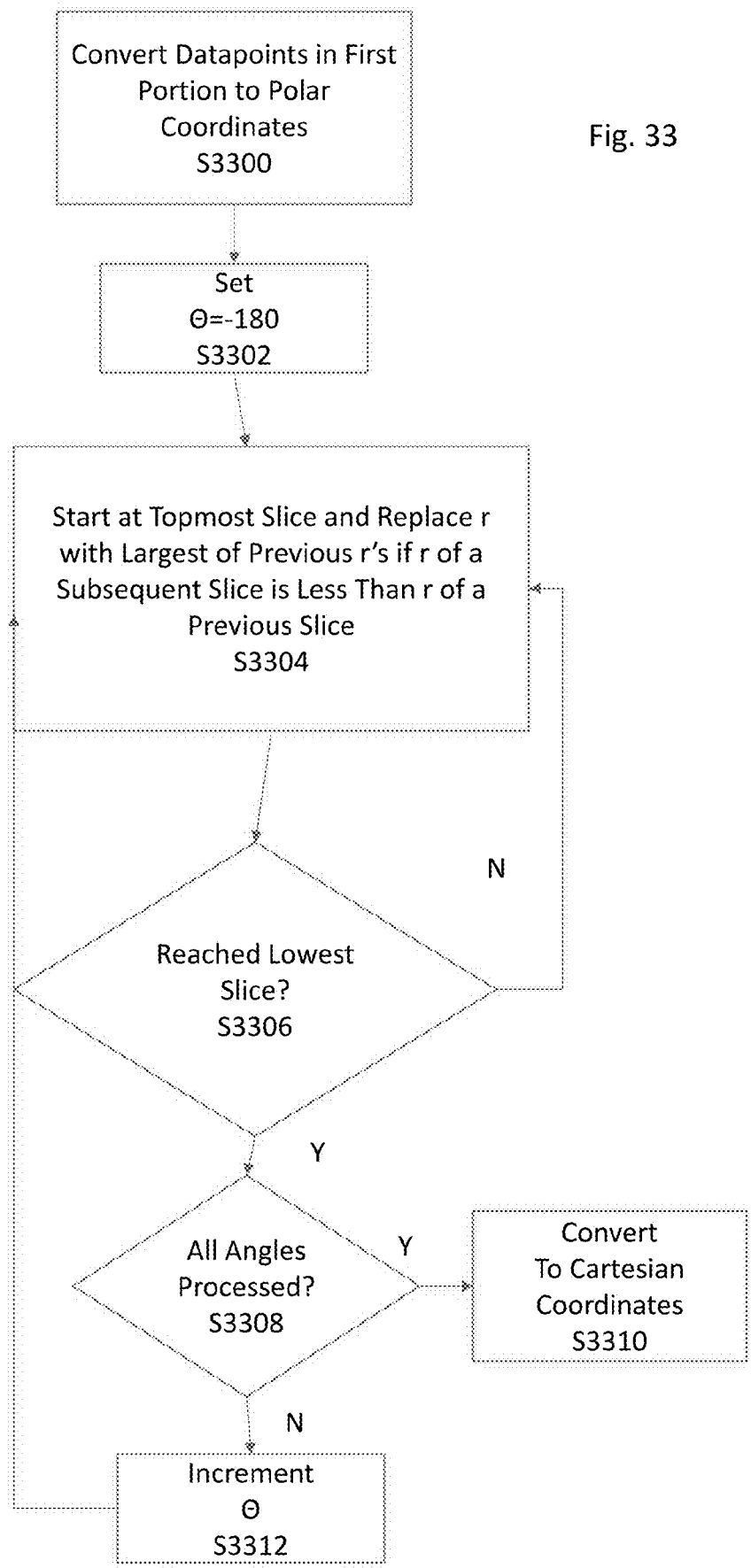
FIG. 33 illustrates an example of a method of modifying the datapoints in accordance with aspects of the disclosure to account for the fabric drape.

In other aspects of the disclosure, the defined datapoints in the horizontal slices may be modified to simulate (account for) fabric drape. FIG. 33 illustrates an example of a method of modifying the datapoints in accordance with aspects of the disclosure to account for the fabric drape. At S3300, the processor 14 converts the datapoints in the horizontal slices into polar coordinates (from cartesian coordinates (x, y, z)). $r=\sqrt{x^2+y^2}$; ø is the angle. (polar coordinates being r, ø, z).

At S3302, the processor 14 sets the initial processing angle. For example, the initial processing angle may be −180°. The initial processing angle may be randomly set. The initial processing angle may be any angle since the process will be executed for all angles with datapoints. As described above, there may be a datapoint every 1°. However, it is not limited to 1°.

At S3304, the processor 14 determines the r value for the topmost horizontal slice (slice with the maximum z value). Top slice, topmost slice or highest slice used herein means the same. The slice may be identified as S=1. In other aspects, the topmost horizontal slice may be the maximum slice number, e.g., 200. The processor 14 then moves to the next slice (e.g., slice 2) and determines the r value (at the same angle). The processor 14 compares the two r values. If the r value of slice 2 is less than the r value for slice 1, the processor 14 replaces the r value in slice 2 for the r value of slice 1, otherwise, the r value is maintained. The processor 14 then repeats this process comparing r values in slice 2 with slice 3 (for the same angle), etc. . . . . The process is repeated for all slices going down in z, until the lowest horizontal slice is reached. At S3306, the processor 14 determines whether the lowest horizontal slice is reaches, e.g., slice 200. When the lowest horizontal slice is not reached ("N" at S3306), the process returns to S3304. When the lowest horizontal slice is reached ("Y" at S3306), the processor 14 determines whether all of the datapoints have been examined (e.g., all processing angles). When all datapoints are processed ("Y" at S3308), the datapoints are converted back to cartesian coordinates at S3310.

When all datapoints are not processed, e.g., all angles have not been examined, the processor 14 increases the angle by a set amount at S3312, e.g., 1°. The increment amount may be based on the angle between datapoints. In other aspects, the angle may be decreased and S3304-3308 is repeated (counter-clockwise or clockwise processing).

FIG. 34 illustrates an example of the coordinate modification for a specific angle, e.g., 10°. In this example there are 200 horizontal slices. As shown, slice 4 has a r value of 21 and slice 5 has a r value of 16 (original). Since the r value of slice 5 is smaller than the r value of slice 4, the processor 14 changes the r value to 21 (the larger value). Slices 6-8 also have r values smaller than 21, the r values for these slices are also changed. Also as shown in FIG. 34, slice 11 has an r value of 28 but slice 12 has an r value of 21. Thus, in accordance with aspects of the disclosure, the processor 14 changes the r value of slice 12 to 28.

Once the datapoints are modified, the patterns may be determined using the modified datapoints. FIG. 35A illustrates an example of patterns generated based on the modified datapoints in accordance with aspects of the disclosure for accounting for drape, e.g., side-front combination 2700''', central-front combination 2705''', side-back combination 2710''' and central-back combination 2715'''.

FIG. 35B illustrates different views of a representation of examples of adjusted datapoints showing the drape. FIG. 35A illustrates the corresponding 2D bodice pattern.

In other aspects, the datapoints may be modified as desired to add or subtract ease. The modification may be locally or applied to different processing portions. For example, ease may be added at a target body part such as the bust. The bust region may be identified by evaluating the 3D image to determine bust points (bust slice) and underbust level (slice). Bust points may be determined as a local apex in the 3D image. The local apex may be defined as having a local maximum y-coordinate (absolute value). The local maximum may be identified by examining the y coordinates for different z-values. The processor 14 may use an immediate crease of a protruded region (with respect to the bust point/slice). The immediate crease may be identified by examining the y coordinates for the different z-values on the vertical slice parallel to the sagittal plane and passing through the x coordinate of the left bust point (or right bust point), respectively. The bust region may be defined between a fixed height above the underbust level and the underbust level. For example, the fixed height may be 6.5 inches. However, the fixed height is not limited to 6.5 inches.

Any amount of ease may be added to the region. For example, X inches may be added. In some aspects, X may be 4 inches. However, the additional is not limited to 4 or inches. In an aspect of the disclosure, the ease may be applied via a scaling factor $\beta_0$. The scaling factor $\beta_0$ may be determined as follows $\beta_0=(Bust_0+4)/Bust_0$, where $Bust_0$ is the bust circumference. The bust circumference is the 360° accumulative arc length of the bust slice. The x and y coordinates of the bust region may be multiplied by the scaling factor $\beta_0$ to create the ease.

When adding ease to the bust region as described above, the second processing portion 505 may also need to be adjusted to match. For example, the bottom horizontal slices of the second processing portion 505 may also need to be scaled by the scaling factor $\beta_0$, e.g., multiple the x and y coordinates of the bottom horizontal slice(s). The top horizontal slice does not need to be modified (equivalent to a scaling factor of 1). The top horizontal slice may also be scaled by a scaling factor $\beta 1$ smaller than $\beta$ but bigger than 1. Slices between the bottom and top slices may be scaled gradually (decreasing the scaling factor from $\beta_0$ to 1 or to $\beta 1$). The increments between the change in the scale factor between slices may be the same.

The device/system described herein may also be used to generate custom-fit sleeve patterns from a 3D image. The 3D image may be the same 3D image used for generating the custom-fit bodice pattern(s). In other aspects, another 3D image may be obtained. For example, another 3D image may be obtained with the individual having the arm bent or in a preset position. It is preferred that the arm is below the shoulder for processing. The patterns may be generated for a short-sleeve (such as for a short-sleeve shirt or a dress) or for a long-sleeve (such as for a suit, dress or long-sleeve shirt including a dress shirt). The patterns may be adjusted or customized at the elbow to account for bends.

The method for generating the custom-fit sleeve pattern is similar to the method depicted in FIG. 2 in that the pattern is formed in portions (at least two) which are combined and the 3D image is subject to pre-processing.

Figures 36, 37:
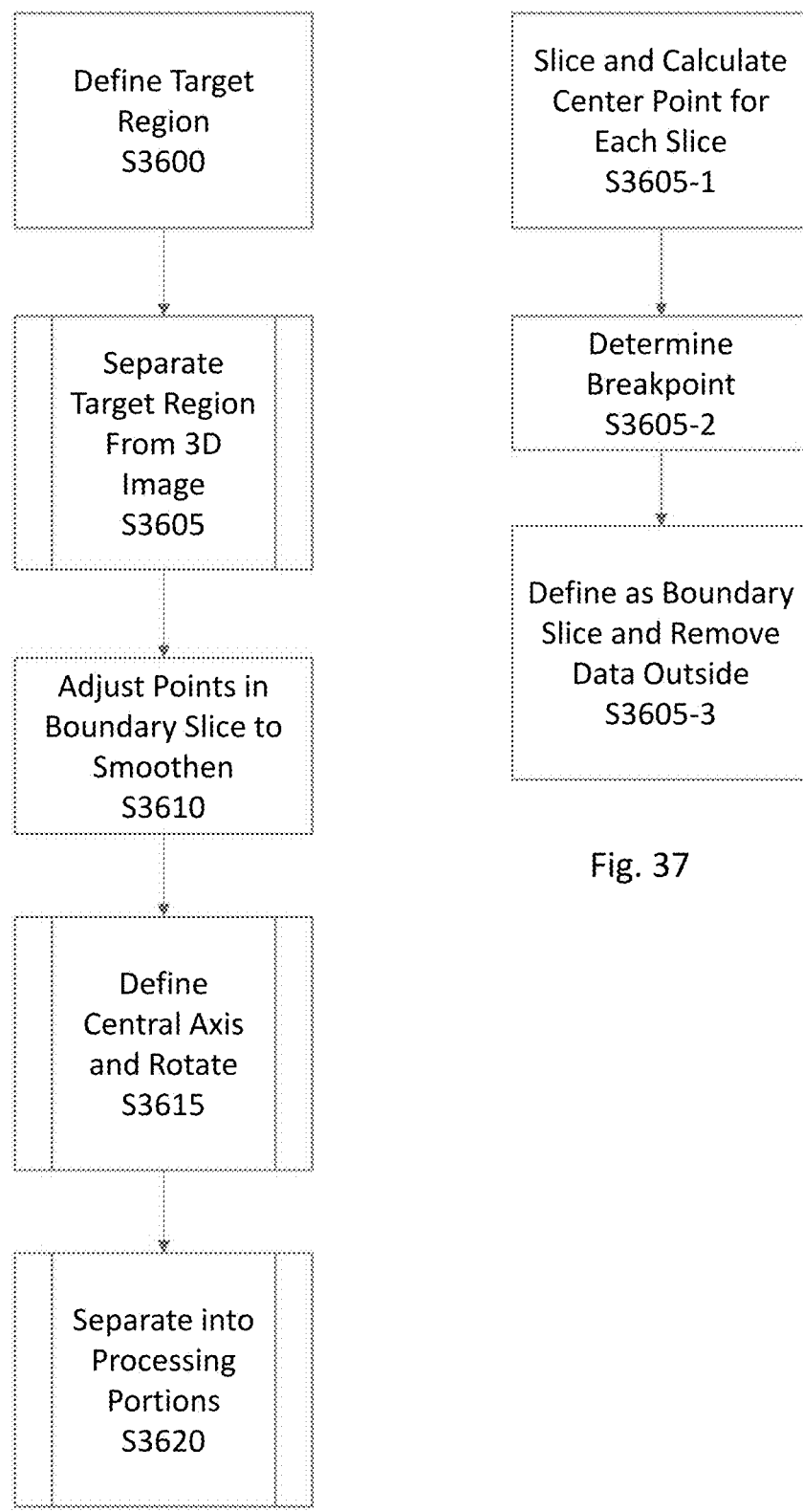
FIG. 36 illustrates an example of a method for pre-processing the 3D image for generating custom-fit sleeve patterns in accordance with aspects of the disclosure.
FIG. 37 illustrates an example of a method for separating the target region from the remaining portion of the 3D image in accordance with aspects of the disclosure to generate the custom-fit sleeve patterns.

FIG. 36 illustrates an example of a method for pre-processing the 3D image for generating custom-fit sleeve patterns in accordance with aspects of the disclosure. At S3600, the target region is identified (Defined). In an aspect of the disclosure, an operator may select a pattern(s) to be created via the GUI which may include a drop down window with available patterns to be created including bodice, sleeve, pants, etc. . . . . In some aspects, the sleeve pattern may further include a selection of short-sleeve or long-sleeve. In other aspects, the operator may use a selection window to select a target region. In an aspect of the disclosure, the target region may be different for short-sleeve versus long-sleeve as the forearm may not be relevant for short-sleeve.

Once the target region, e.g., at least a portion of the arm, is identified in S3600, the processor 14 separates the target region from the remaining portion of the 3D image. The separation may be achieved in any known matter. For example, in an aspect of the disclosure, the separation may be based on machine learning or deep learning of the body parts. For example, the processor 14 may identify landmarks on the body such as the shoulder and elbow and obtain the target region based on the landmark identification.

In other aspects, the target region may be separated based on image processing including slicing and center point analysis. FIG. 37 illustrates an example of a method for separating the target region from the remaining portion of the 3D image in accordance with aspects of the disclosure.

Figures 38A, 38B, 38C, 38D:
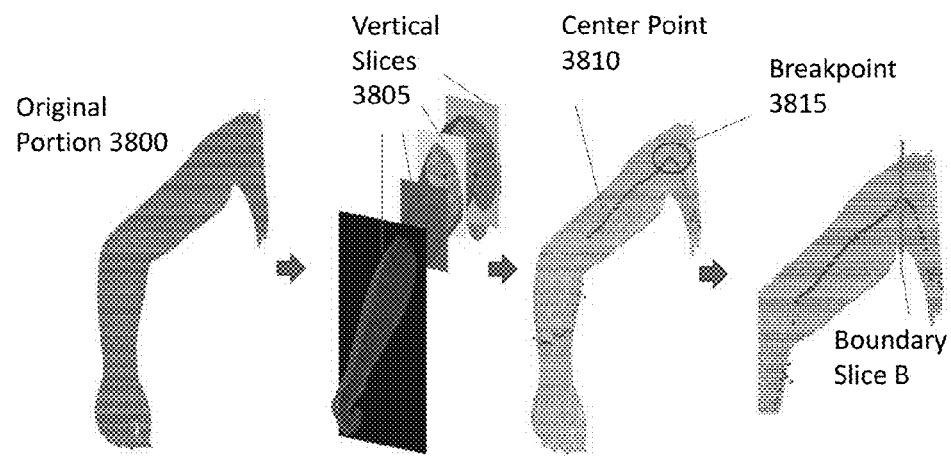
FIGS. 38A-38D illustrates representative examples of the vertical slices and a center point analysis to determine a boundary slice in accordance with aspects of the disclosure.

At S3605-1, the processor 14 slices the 3D image using vertical slices 3805. In an aspect of the disclosure, the slicing may include the arm and the shoulder region. A preset number of vertical slices 3805 may be used. For example, 100 vertical slices may be used. In other aspects, there may be a preset distance between each vertical slice such as 3 mm. The processor 14 determines the center point 3810 of each vertical slice. The center point 3810 of each vertical slice may be determined by calculating the average value of the coordinates in a first direction and the average value of coordinates in a second direction of surface points. In other aspects, the center point may only be identified using the average z-coordinate. FIGS. 38A-38D illustrates a representative example of the vertical slices and center point analysis in accordance with aspects of the disclosure to identify a boundary slice B. FIG. 38A illustrates an example of a portion of the 3D image 3800. FIG. 38B illustrates an example of four vertical slices 3805 in accordance with aspects of the disclosure. The dots in FIG. 38B are the center point 3810 in each vertical slice.

At S3605-2, the processor 14 determines a breakpoint 3815 based on the analysis of the determined center points 3810 in each vertical slice. The breakpoint 3815 may be based on an inflection point with respect to the center points 3810. For example, the center point 3810 having the maximum z value may be assigned as the breakpoint. The processor 14 may confirm the breakpoint 3815 by examining the center point 3810 for the adjacent vertical slices and confirm that both have a lower z-value. The breakpoint 3815 is shown in FIG. 38C with a circle around it.

At S3605-3, the processor 14 identifies the boundary slice B using the determined breakpoint 3815. FIG. 38D illustrates an example of the boundary slice B. This slice may also be called the "armpit slice". In an aspect of the disclosure, the processor 14 separates the target region from the remaining image at the boundary slice B. In other aspects, the processor 14 may also identify a lower portion of the target region based on the center point analysis, e.g., another inflection. The identification may also be where the rate of change in the z-coordinate is substantially greater in adjacent slices.

Figure 39:
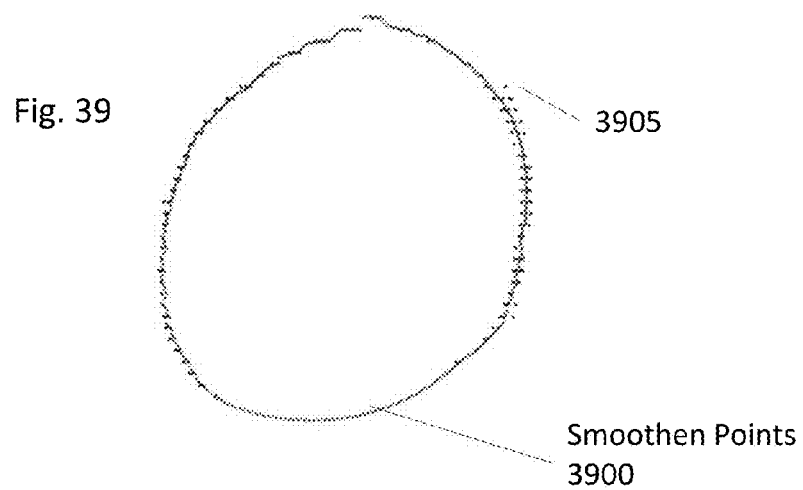
FIG. 39 illustrates a comparison showing both smoothened surface points and the original surface points for the boundary slice.

Certain surface points in the boundary slice B may need to be adjusted or created by interpolation. When the target region is separated at the boundary slice B, there may be a gap in the surface points. The processor 14 may fill in the gap by interpolating the arc using the adjacent surface points which exist. Thus, the processor 14 may determine the three-dimensional coordinates (x, y, z). for the surface points for the boundary slice B. In other aspects of the disclosure, the surface points may need to be smoothened because of the separation. FIG. 39 illustrates an example of smoothen of the surface points for the boundary slice B. The smooth curve 3900 (smoothen points) is the adjusted surface points and the dots 3905 represent the original points.

At S3615, the processor 14 may define a central axis 4000 based on at least a subset of the center points 3810. This central axis 4000 serves as the axis of rotation. In some aspects of the disclosure, only the center point 3810 for the upper arm may be used for determining the central axis 4000. The central axis 4000 may be determined by a best fit line through the center points 3810. The line may be determined using a linear regression of the center points 3810. In some aspects, a least squares regression line may be used. However, the method of determining the best fit line is not limited to least squares.

Figure 40:
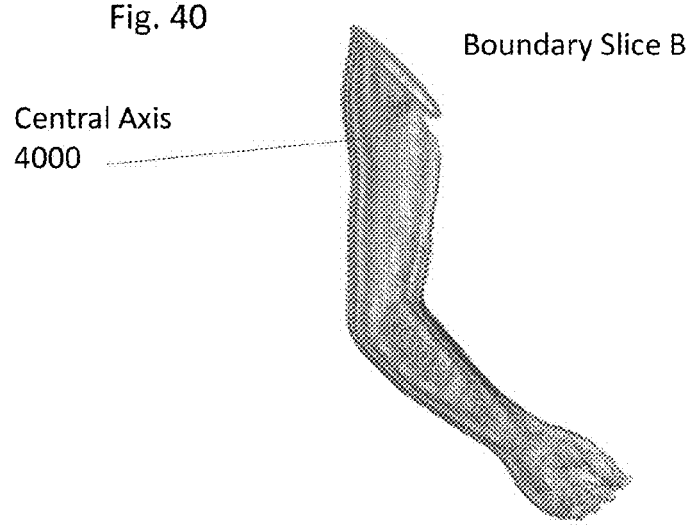
FIG. 40 illustrates an example of a rotated arm in accordance with aspects of the disclosure where the central axis is vertical.

Once the central axis 4000 is determined, the processor 14 rotates the target region until the center axis is vertical. FIG. 40 illustrates an example of a rotated arm with the central axis 4000 being vertical.

At S3620, the processor 14 defines the different processing portions for the patterns. In some aspects of the disclosure, there may be two processing portions. An upper arm region (first processing portion 4110) and a cap region (second processing portion 4105). These two processing portions may be used when the pattern is for a short-sleeve. Additionally, processing portions such as an elbow portion and a lower arm portion may be defined when the pattern is for a longer sleeve. In an aspect of the disclosure, the processor 14 divides the region into horizontal slices. For example, the region may be divided into 100 horizontal slices. However, the number of slices is not limited to 100 and a different number of slices may be used. The division of the processing portions may be based on a determination of "underarm line" or "bicep line". This determination may be made in a plurality of manners. For example, the determination may be made based on the z-coordinate. For example, a minimum z value of a point in the boundary slice B may be used as a threshold.

As described above, at S3610, the processor 14 determines the three-dimensional coordinates for the boundary slice and adjusted coordinates. The arm is subsequently rotated. The processor 14 may determine the rotational angle and translate the coordinates determined at S3610 to account for the rotation. Based on the translated coordinates, the processor 14 may determine the minimum z-coordinate for the surface points for the boundary slice B. The processor 14 may then identify the horizontal slice having the same z-coordinate as the minimum z-coordinate of the boundary slice B and set this horizontal slice as the separation slice 4100 (underarm slice). Horizontal slices having a z-coordinate greater than the separation slice 4100 is assigned to the cap (second processing portion 4105) and slices having the z-coordinate less than the separation slice 4100 is assigned to the upper arm portion (first processing portion 4110). In an aspect of the disclosure, the separation slice 4100 is assigned to the upper arm portion (first processing portion 4110) as well.

In other aspects of the disclosure, the separation slice 4100 may be identified as the horizontal slice having the maximum z-coordinate where the horizontal slice has a predetermined number of preliminary datapoints. In an aspect of the disclosure, the preliminary datapoints for the slices may be determined in a similar manner as described above in FIG. 9. In the preliminary datapoint determination, there may be PD preliminary datapoints per slice. For example, the preliminary datapoints may be every third degree (PD=120). However, the number of preliminary datapoint may be different such as every 1, 2 or 5 degrees. In the preliminary datapoint determination, not all of the horizontal slices need to be processed as the separation slice 4100 will be the first horizontal slice where the number of datapoint of which coordinates are in NaN is PD or all datapoints appear in a slice (e.g., no datapoint missing due to the arm hole opening). For example, the process may begin at the topmost horizontal slice (maximum z-coordinate). The processor 14 may determine the distance between the reference point (in this case a projection of the central axis 4000 on the horizontal slice) and the surface points associated with the section in a similar manner as described for S908 (where angular section length is based on the number of datapoint) and average the same at S910 and associated the distance with an angle value. S908, S910, S912 and S914 may be repeated until there is no surface point associated with the section other than NaN. Once a surface point with NaN is reached, the process moves to a lower horizontal slice (adjacent slice) and S904-914 may be repeated. Once again, the steps are repeated until a section has NaN. The separation slice 4100 will not have any section with NaN (and thus have datapoints equal to N).

Figure 41A:
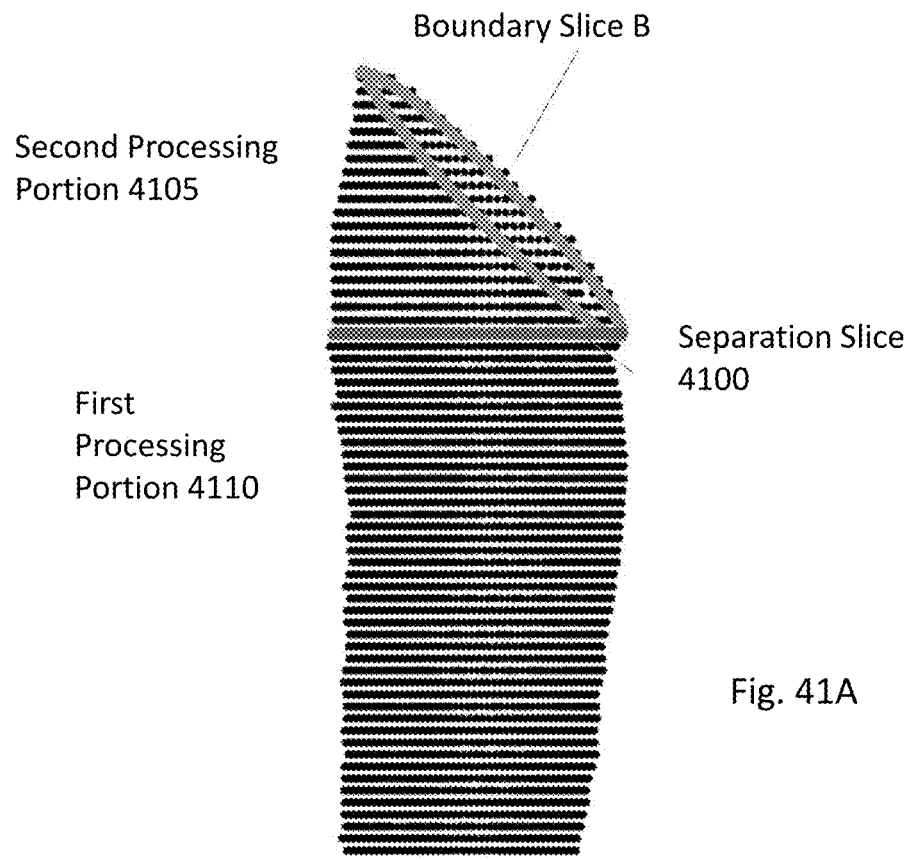
FIG. 41A illustrates an example of the first processing portion and the second processing portion which is divided by a separation slice in accordance with aspects of the disclosure to generate the custom-fit sleeve patterns.
Figure 41B:
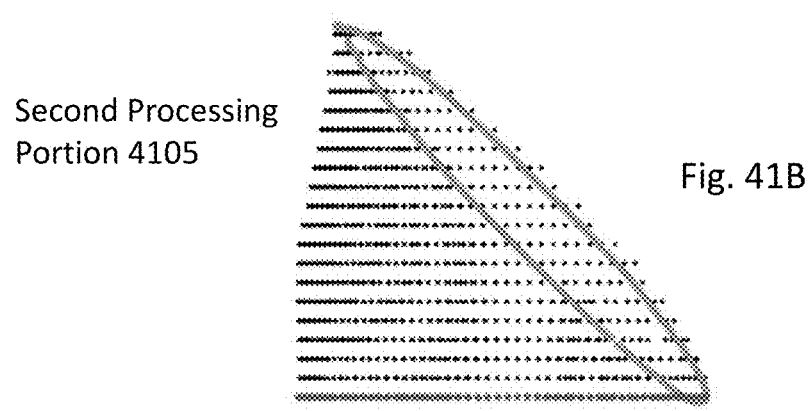
FIG. 41B illustrates an example of the second processing portion in accordance with aspects of the disclosure to generate the custom-fit sleeve patterns.

FIG. 41A illustrates an example of a separation slice 4100 and the first processing portion 4110 below the separation slice 4100 and the second processing portion 4105 above the separation slice 4100. The portions are shown with the horizontal slicing. FIG. 41B illustrates an example of the cap region (second processing portion 4105) separated from the first processing portion 4110 (however the separation slice 4100 is still shown for reference purposes.

Figure 42:
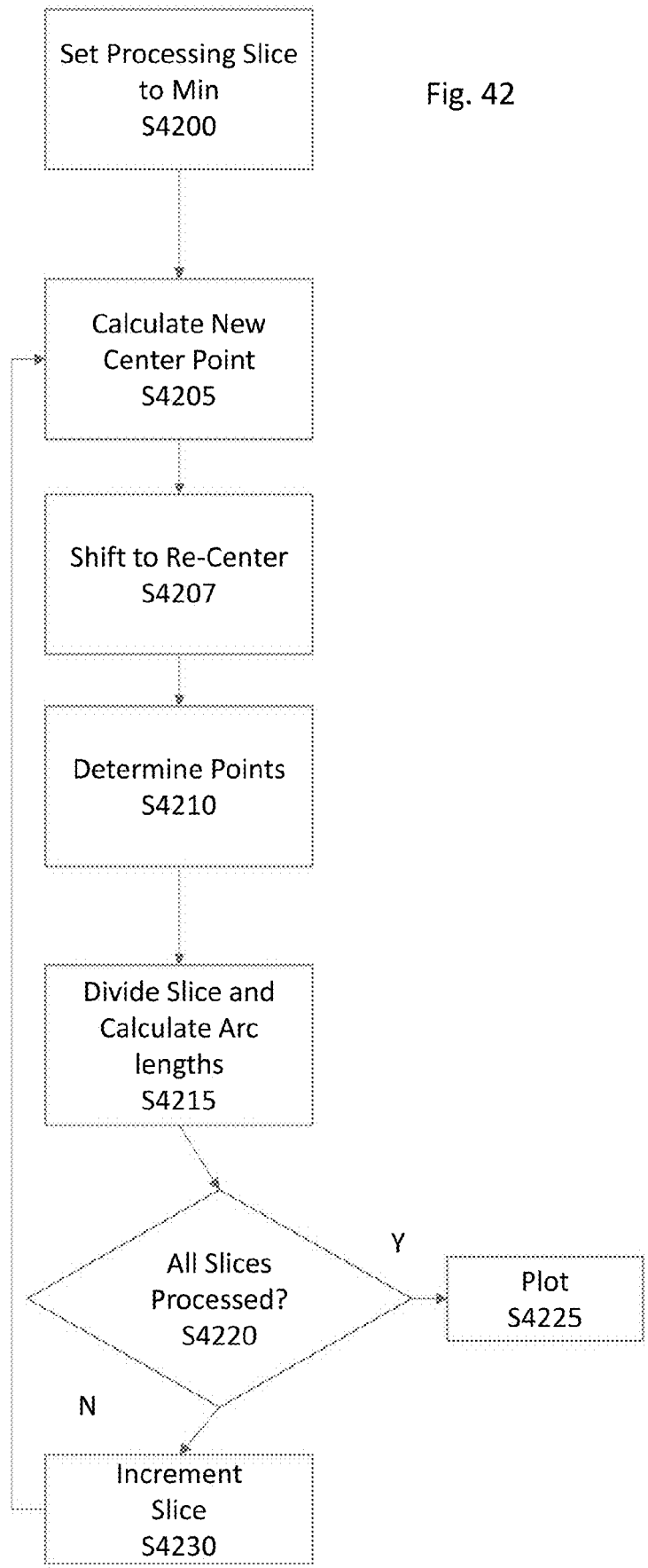
FIG. 42 illustrates an example of a method for processing the first processing portion in accordance with aspects of the disclosure to generate the custom-fit sleeve pattern.

FIG. 42 illustrates an example of a method for processing the first processing portion 4110 (upper arm) in accordance with aspects of the disclosure to generate the custom-fit sleeve pattern. At S4200, the processor 14 sets the processing slice to the first processing slice. In an aspect of the disclosure, the processing may start at the lowest horizontal slice and work upward. However, in other aspects, the processing may start at the uppermost horizontal slice and work downward. The setting of the processing slice to a minimum may be replaced with set to maximum.

At S4205, the processor 14 may calculate a new center point. While the center point 3810 was determined at S3605-1, this was prior to rotation. The rotation changes the center point coordinates. The center point may be determined by averaging the coordinates for the surface points in the x-direction and averaging the coordinates for the surface points in the y-direction for the horizontal slice. In other aspects, the processor 14 may use the projection of the central axis 4000 on the horizontal slice as the center point. However, since the central axis 400 was determined using best-fit, using the projection may not be as accurate as calculating the center point directly from the averages.

Preferably (but optional), at S4207 the processor 14 may shift the center point such that it intersects the origin (x=0, y=0) and subsequently shift all of the surface points by the same amount. The shift makes the calculation of the distance easier.

At S4210, the processor 14 determines the datapoints for the horizontal slice. The number of datapoints for the horizontal slice may be the same as the number of preliminary datapoints described above such as N'=120 (every 3). However, in other aspects, more or less datapoints may be determined for each horizontal slice. The value associated with the datapoint may be determined in a similar manner as described above in FIG. 9 (steps S908, S910, and S912). S908, S910, and S912 are repeated for each datapoint N' (changing the section and angle of processing).

Figure 43A:
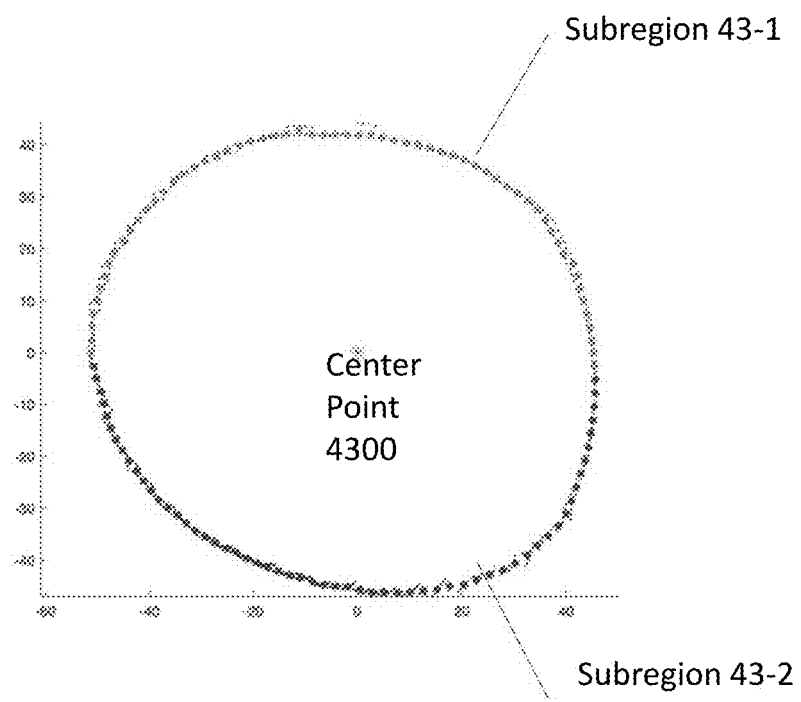
FIG. 43A illustrates an example of the subregions for a horizontal slice of the first processing portion in accordance with aspects of the disclosure.

Once all N' datapoints are determined, the processor 14 divides the horizontal slice into subregions at S4215. In some aspects, each horizontal slice is divided into two equal angular regions such as 0° to 180° and −180° to 0°. An example of the two subregions for a horizontal slice is shown in FIG. 43A (Subregion 43-1 and Subregion 43-2). The center point 4300 for the slice is also shown in FIG. 43A. In FIG. 43A, the horizontal slice is shifted to have the center point be (0,0).

Also, at S4215, the processor 14 calculates the arc lengths for subregion 43-1 and subregion 43-2, respectively. The arc lengths may be stored in the memory 16 associated with the horizontal slice. The datapoints may also be stored in the memory 16.

At S4220, the processor 14 determines whether all of the horizontal slices in the first processing portion 4110 have been processed. As noted above, the first slice may be a lowest slice and work upward or vice versa, therefore at S4220, the processor 14 may determine whether the processing slice is the maximum or minimum slice. When all slices have been processed ("Y" at S4220), the processor 14 creates the pattern for the first processing portion 4110 at S4225 by plotting the arc lengths for the horizontal slices (subregions).

When all horizontal slices have not been processed, the processor 14 increments (or decrements if started at the topmost slice and working downward) the slice to the adjacent slice and the process returns to S4205.

Figure 43B:
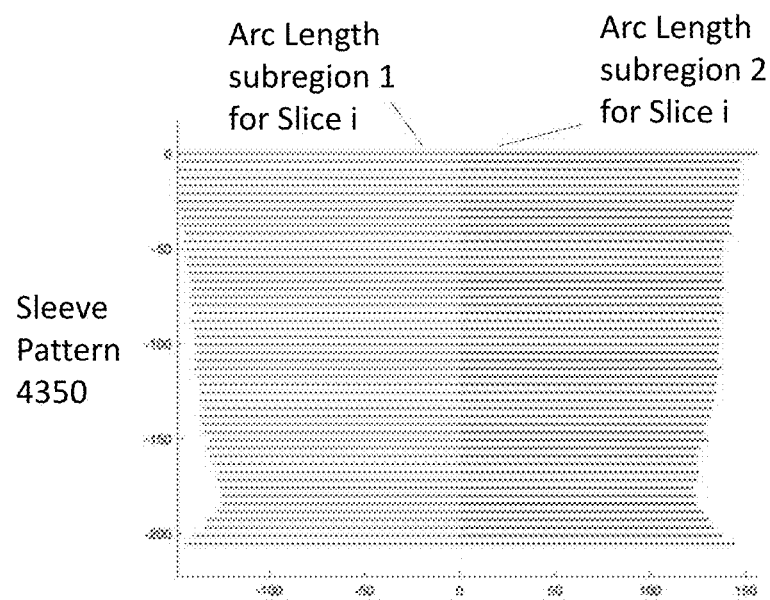
FIG. 43B illustrates an example of the sleeve pattern for the first processing portion in accordance with aspects of the disclosure.

At S4225, the processor 14 creates the sleeve pattern 4350 using the calculated arc lengths for the subregion 43-1 and subregion 43-2, respectively, for each horizontal slice in the first processing portion 4110. FIG. 43B illustrates an example of the sleeve pattern 4350 in accordance with aspects of the disclosure. The arc-lengths of the subregions determine the width of the sleeve pattern and the horizontal slice (z-coordinate defines the y-coordinate of the parallel line in the 2D plot). The lines for the same horizontal slice have the same y-coordinate in the 2D plot. In the example, since the center point is (0,0), the lines extend from an x value of 0 (in opposite directions).

Figure 44:
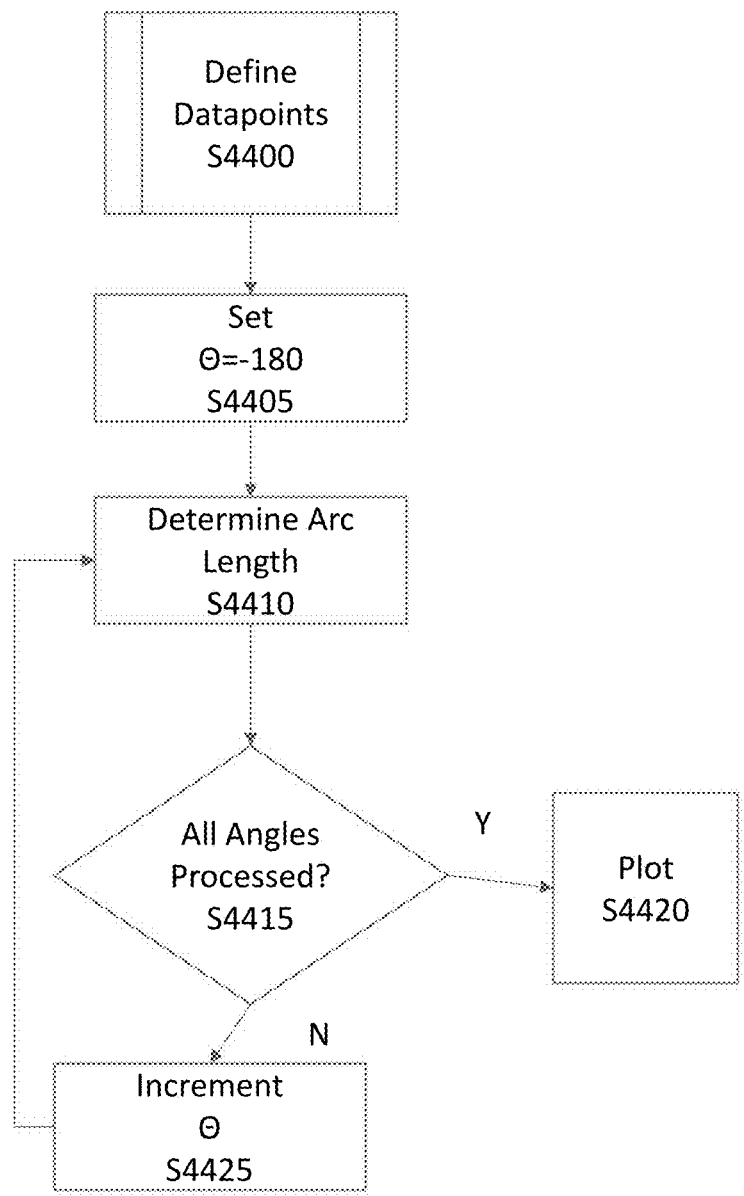
FIG. 44 illustrates an example of a method for processing the second processing portion in accordance with aspects of the disclosure to generate the custom-fit sleeve patterns.

FIG. 44 illustrates an example of a method for processing the second processing portion 4105 in accordance with aspects of the disclosure. At S4400, the processor 14 defines the datapoints on the surface of the second processing portion 4105 (cap region) using horizontal slicing. Defining datapoint using horizontal slicing has been described above and will not be described again in detail. For example, the value associated with the datapoint may be determined in a similar manner as described above in FIG. 9 (steps S908, S910, and S912). S908, S910, and S912 are repeated for each datapoint N' (changing the section and angle of processing). Given the shape of the second processing portion many of the datapoints may have a NaN value.

The processor 14 calculates N' arc lengths, e.g., one arc length for each of the N' datapoint for the slice(s). At S4405, the processor 14 set the processing angle to a first processing angle. For example, the first processing angle may be −180°. At S4410, the processor 14 determines the arc length for the angle. In an aspect of the disclosure, the processor 14 calculates the arc length using the values of the datapoints for the same angle where the value is not NaN. For example, the processor 14 calculates the arc length between the lowermost datapoint (lowest slice) and the uppermost non-NaN datapoint (topmost slice) for the same angle.

At S4415, the processor 14 determines whether all of the angles having datapoints are processed (e.g., calculated N' arc lengths). When all of the angles and arc lengths are calculated ("Y" at S4415), the process moves to S4420 to generate the pattern for the second processing portion 4105. The calculated arc lengths may be stored in memory 16.

When all of the angles and arc lengths are not calculated ("N" at S4415), the processor 14 changes the angle to another processing angle at S4425. For example, the processor 14 may increment the angle by a set value to the next datapoint for the slice (e.g., 3°) and S4410 and S4415 are repeated.

FIG. 45A illustrates an example of a cap pattern 4500 in accordance with aspects of the disclosure. The cap pattern 4500 is a 2D plot of the arc lengths. The arc lengths are vertical lines extending from a base. The length determines the y-coordinate of the sleeve cap. The distances between adjacent datapoints on the separation slice 4100 determine the width of the sleeve cap (x-coordinate). As shown in FIG. 45A, the spacing between vertical lines in the plot may not be uniform since the slices may not be perfectly circular. In FIG. 45A, one of the arc lengths is highlighted to show an example of an arc length for a specific angle a 4505. FIG. 45B shows an example of a cap region with the boundary slice B and separation slice 4100 highlighted. In FIG. 45B, the same processing angle (as the example arc length) is also highlighted as an example.

Figure 46A:
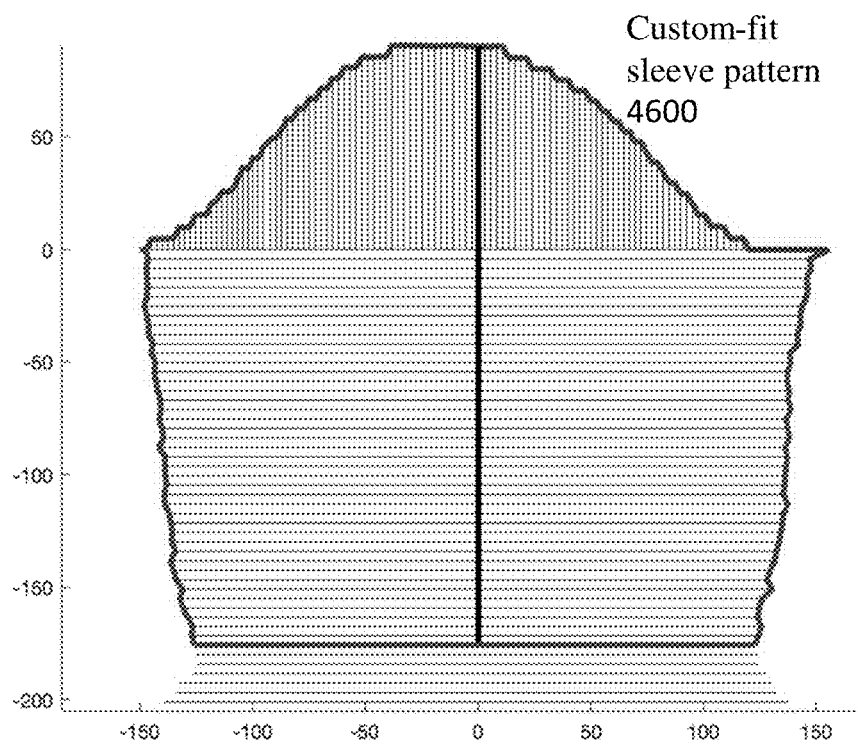
FIG. 46A illustrates an example of custom-fit sleeve pattern in accordance with aspects of the disclosure.

In an aspect of the disclosure, the custom-fit sleeve pattern 4600 may be formed by combining the cap pattern 4500 and sleeve pattern 4350. In an aspect of the disclosure, the cap pattern 4500 is placed on top of the sleeve pattern 4350 to generate the custom-fit sleeve pattern 4600. FIG. 46A illustrates an example of custom-fit sleeve pattern 4600 in accordance with aspects of the disclosure. If the pattern is for a short-sleeve, the pattern 4600 may be modified to only include a smaller portion of the upper arm depending on whether the first processing portion 4110 included horizontal slices associated with an elbow region. The elbow region may be detected by the size of the lines on the plot, e.g., local minimum. In FIG. 46A, a line outlines the pattern.

As noted above, additional processing portions may be used to create the patterns. For example, where the pattern includes an elbow region, the elbow region may be processed as a third processing portion 4705 (such as shown in FIG. 47A) in a similar manner as the cap region.

Further, the lower arm portion may be processed as a fourth processing portion 4710 (such as shown in FIG. 47A) in a similar manner as described above for the upper arm (first processing portion). In some aspects, the processing may include defining another central axis (rotation) (the rotated lower arm 4700 is shown in FIG. 47B and rotating the another central axis to make it vertical as described above. FIG. 47B illustrates an example of a sliced third processing portion 4705 (elbow region). Datapoints for one of the processing angles is highlighted to show an example arc length. FIG. 47C illustrates an example custom-fit sleeve pattern 4600' generated for both the upper arm portion and the lower arm portion with an elbow region in accordance with aspects of the disclosure. In FIG. 47C, the arc length generated for the same datapoints highlighted in FIG. 47B is also highlighted. In FIG. 47B, another separation slice is also highlighted. The plotted elbow region and the lower arm region can overlap by 2 or 3 horizontal slices to achieve the maximum contact area between the two regions so that the sewing on the sides will be easier. This also allows the two regions to be combined as one piece and the two openings on the sides to be treated as darts.

In an aspect of the disclosure, the datapoints in the horizontal slices may be adjusted to create ease in a similar manner as described above, e.g., scaling factor. Ease may be added toward the bottom of the sleeve pattern to allow the garment to hang loose. Other horizontal slices may be gradually increased toward the bottom to create a pattern which the width slowly changes.

The datapoints may be converted into polar coordinates and the radius r of the datapoint may be multiplied by a scaling factor. For example, in the first processing portion 4110, a scaling factor of 1.25 may be used. The scaling factor is not limited to 1.25 and other scaling factors may be used as desired to increase or decrease the radial distance from the center of the slice, thus increasing or decreasing width of the 2D pattern. The scaling in the first processing portion 4110 may be the same, e.g., uniform across the different horizontal slices. The scaled polar coordinates may be subsequently converted back to cartesian coordinates for further processing. Similarly, the datapoints in the second processing portion 4105 (cap region) may be scaled. These datapoints may be converted into polar coordinates and the radius multiplied by a varying scaling factor. The scaling factor may vary depending on the horizontal slice and its relative location to the separation slice 4100. The bottom slice of the second processing portion (adjacent to the separation slice) may have the same scaling as the first processing portion 4110; however, as the horizontal slice is farther from the separation slice 4100, the scaling factor may be gradually reduced. The top slice (slice distal from the separation slice 4100 may not be scaled or be scaled by a factor close to 1, e.g., 1.1 or less but greater than 1.

Figure 46B:
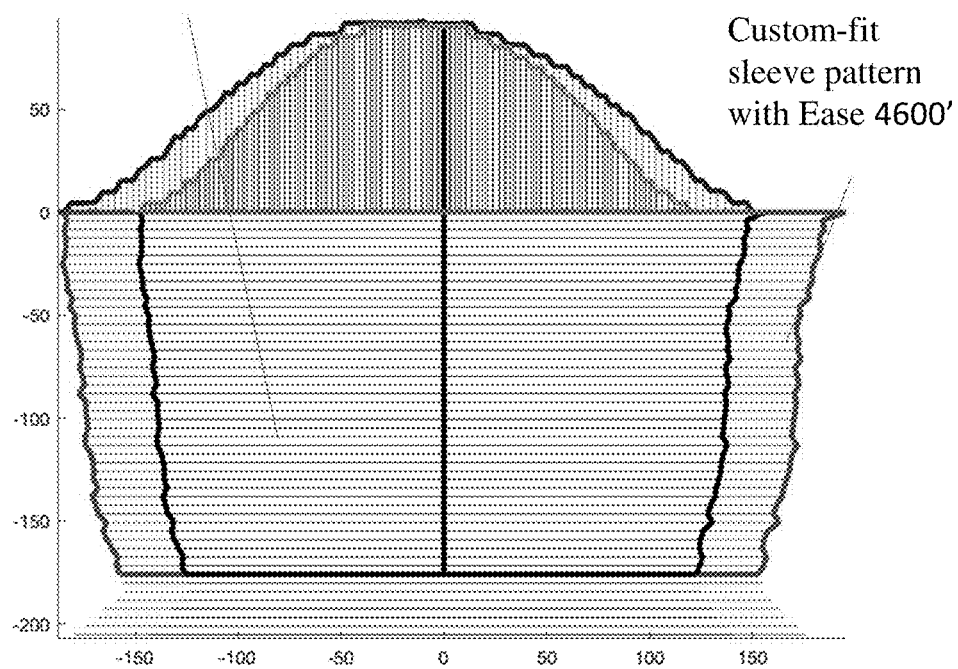
FIG. 46B illustrates a comparison of examples of a custom-fit sleeve pattern with and without ease in accordance with aspects of the disclosure.
Figure 46C:
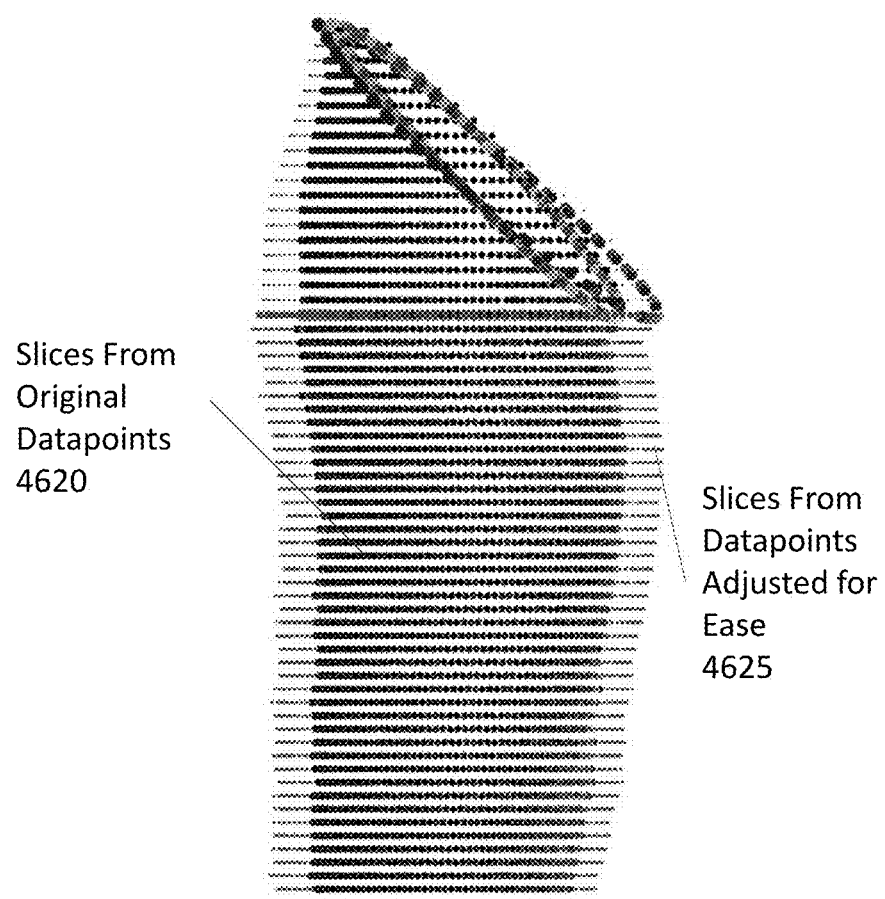
FIG. 46C illustrates a comparison of an example of the horizontal slices generated from datapoints that were and were not adjusted for ease in accordance with aspects of the disclosure.

FIG. 46B illustrates both a custom-fit sleeve pattern (without ease) 4600 and a custom-fit sleeve pattern (with ease) 4600'. The custom-fit sleeve pattern (with ease) 4600' is wider. FIG. 46B also shows the gradual reduction in the scaling as the distance from the separation slice increases. The separation slice 4100 is shown in the 2D plot at y="0", where y axis is the vertical axis. FIG. 46C illustrates the horizontal slices generated from original datapoints 4620 (unadjusted by the scaling factor) and horizontal slices generated from datapoints adjusted for ease (adjusted by the scaling factor). The boundary slice (both unadjusted and adjusted) is highlighted in FIG. 46C. Additionally, the separation slice 4100 is highlighted in FIG. 46C.

The device/system described herein may also be used to generate custom-fit pants, capris, shorts or skirt patterns from a 3D image. The 3D image may be the same 3D image used for generating the custom-fit bodice pattern(s) and sleeve pattern(s). In other aspects, another 3D image may be obtained. For example, another 3D image may be obtained with the individual standing in a preset position. It is preferred that the legs are spread out such that a crotch slice which will be discussed later may be properly identified.

The method for generating the custom-fit pants, capris, shorts or skirt patterns is similar to the method depicted in FIG. 2 in that the pattern is formed in portions (at least two) which are combined and the 3D image is subject to pre-processing.

Figures 48, 49:
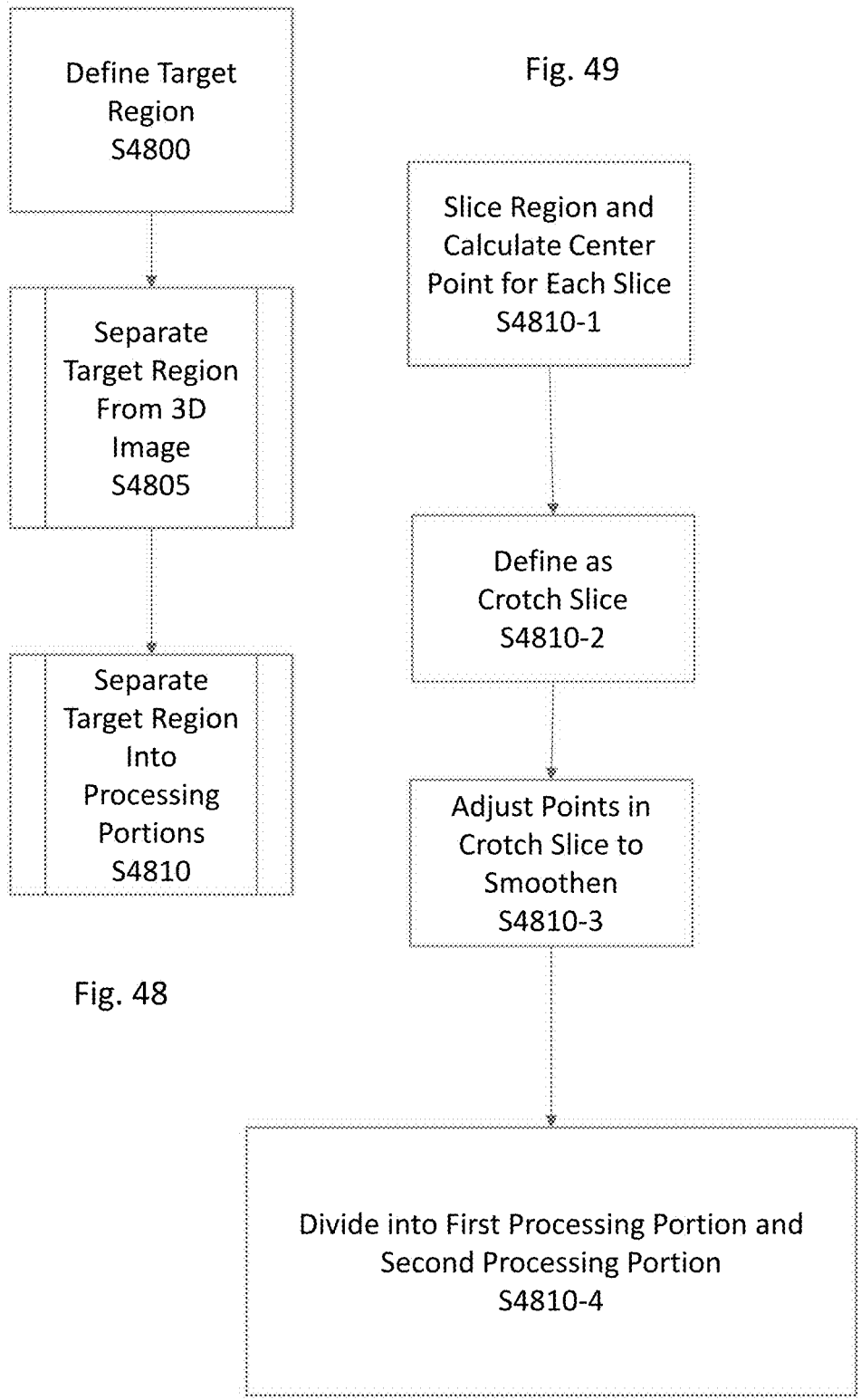
FIG. 48 illustrates an example of a method for pre-processing the 3D image for generating custom-fit pants, capris, shorts or skirt patterns in accordance with aspects of the disclosure.
FIG. 49 illustrates an example of a method for separating the target regions into the processing portions in accordance with aspects of the disclosure.

FIG. 48 illustrates an example of a method for pre-processing the 3D image for generating custom-fit pants, capris, shorts or skirt patterns in accordance with aspects of the disclosure. At S4800, the target region is identified (Defined). In an aspect of the disclosure, an operator may select a pattern(s) to be created via the GUI which may include a drop-down window with available patterns to be created including bodice, sleeve, pants, etc. . . . . In other aspects, the operator may use a selection window to select a target region. In an aspect of the disclosure, the target region may be different for pants, skirts, shorts and capris.

Once the target region is identified in S4800, the processor 14 separates the target region from the remaining portion of the 3D image at S4805. The separation may be achieved in any known matter. For example, in an aspect of the disclosure, the separation may be based on machine learning or deep learning of the body parts. For example, the processor 14 may identify landmarks on the body such as the ankle, foot, waist, knee (in case of shorts or skirt), crotch, etc. and obtain the target region based on the landmark identification.

In other aspects, the target region may be separated based on image processing including horizontally slicing the image. In an aspect of the disclosure, the processor 14 may identify the topmost slice of the target region based on a determination of a waist slice. In an aspect of the disclosure, the waist slice may be determined based on circumference. The waist slice may be a local minimum. In other aspects, the waist slice may be determined based on a ratio based on a distance between landmarks. For example, one landmark may be the bust slice. The bust slice may be determined as described above, e.g., a local y-coordinate maximum in the front. The other landmark may be the hip. The hip slice may be defined as a local y coordinate maximum in the back.

A set ratio may be used to define the topmost slice for the target region (where the topmost slice is above the hip slice and below the bust slice). For example, the topmost slice may be at the midway between the hip slice and the bust slice.

The bottom most slice may be determined by finding an ankle slice in one of the legs (for pants). The ankle slice may be defined by a local circumference minimum. For shorts, the bottom most slice may be defined by a knee slice or another specific height.

Data outside the target region may be removed from further processing.

At S4810, the processor 14 separates the target region into processing portions. For example, the processing portions may be a hip region and a leg region. FIG. 49 illustrates an example of a method for separating the target regions into the processing portions in accordance with aspects of the disclosure.

At S4810-1, the processor 14 slices the target region using vertical slices. In an aspect of the disclosure, the slicing may include both legs and the hip region. FIG. 50B illustrates an example of vertical slices 5005 of the target region 5000 (illustrated in FIG. 50A). Three example slices are shown. A preset number of vertical slices 5005 may be used. For example, 300 vertical slices may be used. In other aspects, there may be a preset distance between each vertical slices 5005 such as 3 mm. The processor 14 determines the center point 5010 of each vertical slice 5005. The center point 5010 of each vertical slice 5005 may be determined by calculating the average value of the coordinates in a first direction and the average value of coordinate in a second direction of surface points. In other aspects, the center point 5010 may only be identified using the average z-coordinate. In an aspect of the disclosure, the x-coordinate for the center point 5010 is the slice value (e.g., the location of the slice). FIG. 50C illustrates an example of the center points 5010 for each vertical slice 5005 (dots).

At S4810-2, the processor 14 determines a crotch slice 5015. The crotch slice 5015 may be based on an inflection point with respect to the center points 5010. For example, the center point 3810 having the maximum z value may define the crotch slice 5015. The processor 14 may confirm the crotch slice 5015 by examining the center point 5010 for the adjacent vertical slices and confirm that both have a lower z-value. The center point 5010 for the crotch slice 5015 is shown in FIG. 50C with a circle around it.

Certain surface points in the crotch slice 5015 may need to be adjusted or created by interpolation. This may be particularly needed near the bottom of the vertical slice and at the top, e.g., there may be a gap in the surface points. This may be particularly true where the individual had their legs too close to each other. The processor 14 may fill in the gap by interpolating the arc using the adjacent surface points which exist at S4810-3. In an aspect of the disclosure, the interpolation may use points on horizontal slices of the target region instead of the above vertical slices. Thus, the processor 14 may determine the three-dimensional coordinates (x, y, z). for the surface points in the target region. FIG. 51 illustrates an example of original surface points 5110, interpolated surface points 5105 for the crotch slice 5015. The red dots represent the interpolated surface points 5105. The darker dots/lines represent the original surface points 5110

At S4810-4, the processor 14 divides the target region 5000 into the processing portions based on the crotch slice 5015. Specifically, the processor 14 identifies the minimum z-coordinate of the crotch slice 5015. This minimum z-coordinate is the breakpoint for the division. Horizontal slices above this minimum z-coordinate will be assigned to the hip region (first processing portion 5200) and horizontal slices of one leg below the minimum z-coordinate will be assigned to the leg region (second processing portion 5205). FIG. 52 illustrates an example of the first processing portion 5200 and the second processing portion 5205 in accordance with this aspect of the disclosure.

Figures 53, 54:
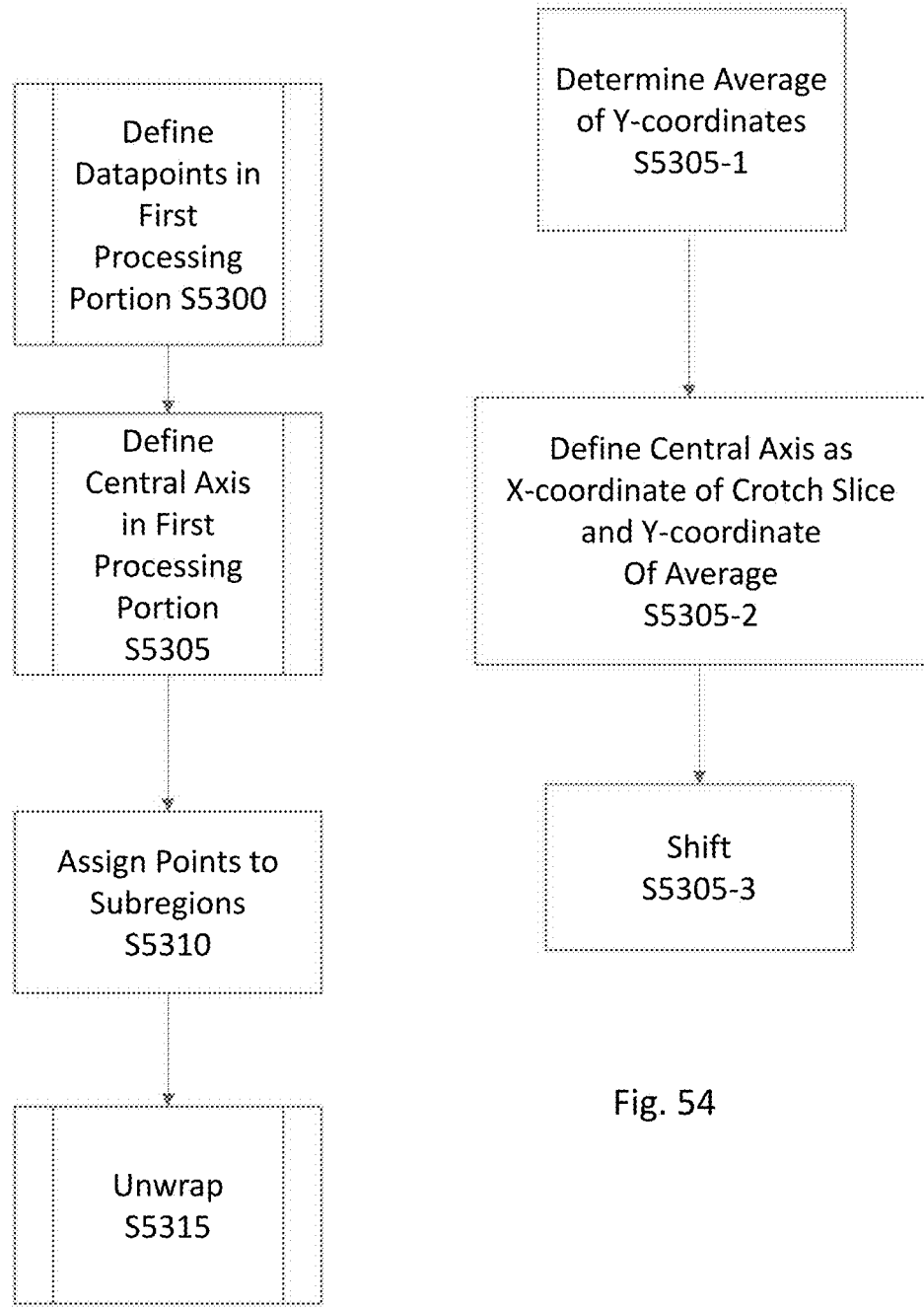
FIG. 53 illustrates an example of a method for processing the first processing portion in accordance with aspects of the disclosure to generate custom-fit pattern(s)
FIG. 54 illustrates an example of a method for defining the central axis for the first processing portion in accordance with aspects of the disclosure.

FIG. 53 illustrates an example of a method for processing the first processing portion 5200 in accordance with aspects of the disclosure. At S5300, the processor 14 defines the surface datapoints in the first processing portion 5200 using horizontal slicing. Defining surface datapoints using horizontal slicing has been described above with respect to FIG. 9 and will not be described again. The first processing portion 5200 may be divided into $S_H$ number of horizontal slices. For example, 50 horizontal slices may be used. Each horizontal slice may have a datapoint at every degree. However, the number of horizontal slices $S_H$ is not limited to 50 and the number of datapoints is not limited to every degree. For example, there may be a datapoint every 5°, 10° or 20°.

At S5305, the processor 14 defines a central axis 5600 for the first processing portion 5200 at S5305. FIG. 54 illustrates an example of a method for defining the central axis 5600 in accordance with aspects of the disclosure. At S5305-1, the processor 14 determines the average of the y-coordinates of the datapoints in the first processing portion 5200. At S5305-2, the processor 14 assigns a point on the central axis 5600 to be the x-coordinate of the crotch slice 5015 and the y-coordinate as the average of the y-coordinates in the first processing portion 5200. The central axis 5600 is defined to intersect this point and extend in the z-direction.

In some aspects, the processor 14 may shift the first processing portion 5100 such that the central axis 5600 intersects a reference point (e.g., origin) at S5305-3. The shifting correspondingly changes the values of the datapoints based on the translation.

At S5310, the processor 14 assigns datapoints to different regions within the first processing portion 510. These regions may correspond to panels (or sub-panels of the garment pattern) (such as pants, skirts, shorts, etc. . . . ). For example, the panels may include a side-front panel 5505, a central front-panel 5500, a central-back panel 5515 and a side-back panel 5510.

In an aspect of the disclosure, the assignment may be based on the angle. The angle may be with respect to the axes. For example, the x-axis may be 0°/360 and 180° and the y-axis may be 90° and 270°, where −x is 0° and −y is 90°. The definition of the angles is not limited to the above. The angle may be set such that each region has the same angular length, e.g., 45°.

FIG. 55 illustrates an example of a division of panels in accordance with aspects of the disclosure. In an aspect of the disclosure, the central-front-panel 5500 is between 45° and 90°. The side-front-panel 5505 is between 0° and 45°. The side-back-panel 5510 is between 3150° and 360° (0315°). The central-back-panel 5515 is between 270° and 315°. In an aspect of the side panels (e.g., central-front-panel 5500, central-back-panel 5515, side-front panel 5505 and side-back panel 5510 may be further divided into sub-panels) as described above with respect to the bodice pattern(s). For example, the panels may be divided into two equal sub-panels. For example, one of the side-front sub-panels may be from 0° to 22.5° and the other of the side-front sub-panels may be from 22.5° to 45°. However, the division into sub-panels for the side is not limited to being equal. The other panels may be similarly divided.

However, in other aspects, as described above with the bodice patterns, in other aspects, different angular lengths may be used to create a plurality of different style patterns for the same body size. In an aspect of the disclosure, as shown in FIG. 55, the same separation angles are used for all horizontal slices in the first processing portion 5200 (e.g., 45°). However, in other aspects, as described above with respect to the bodice patterns, different separation angles may be used for different slices to provide stylistic seam line patterns.

FIG. 56 illustrates an example of the assignment of portions of horizontal slices (datapoints) to the different panels for the first processing portion 5200 in accordance with aspects of the disclosure. The central axis 5600 is also illustrated in FIG. 56.

In an aspect of the disclosure, the unwrapping as described herein may be executed on only half of the first processing portion 5200 and a mirror unwrapping applied to the other half.

However, if the individual does not have a mirror image, the unwrapping may be executed on the entire first processing portion 5200.

Unwrapping of the hip region (first processing portion 5200) is similar to unwrapping the first processing portion 500 for the bodice pattern(s), e.g., the arc lengths are calculated and plotted on a 2D plot.

For example, the patterns for the panels may be determined by calculating the arc length of the portion of each horizontal slice assigned to the panel (S5700 as illustrated in FIG. 57), respectively and stacking the arc lengths based on the z-coordinate to plot the 2D pattern (S5705). The arc length is determined from the datapoints between the separation angles for the panel.

For each panel, two arc lengths may be calculated for each horizontal slice for the panel since there are two subregions within the panel. For example, the processor 14 may calculate the arc length for a portion of the horizontal slice between 22.5° and 45° for a side-front-first sub-panel and the arc length for a portion of the same horizontal slice between 0° and 22.5° for a side-front-second sub-panel (for each horizontal slice in the first processing portion 5200). Additionally, the processor 14 may calculate the arc length for a portion of the horizontal slice between 315° and 337.5° for a side-back-first sub-panel and the arc length for a portion of the same horizontal slice between 337.5° and 360° (0°) for a side-back-second sub-panel (for each horizontal slice in the first processing portion 5200). Similarly for central-front-panel 5500, the processor 14 may calculate the arc length for a portion of the horizontal slice between 45° and 67.5° for a first sub-panel, and the arc length for a portion of the same horizontal slice between 67.5° and 90° for a second-sub-panel. For central-back-panel 5515, the processor 14 may calculate the arc length for a portion of the horizontal slice between 270° and 292.5° for a first sub-panel, and the arc length for a portion of the same horizontal slice between 292.5° and 315° for a second-sub-panel.

After each sub-panel is plotted, the processor 14 combines the two panels (5510, 5515) from the back at S5710 and combines the two panels (5500, 5505) from the front at S5715. For example, the processor 14 combines the panels by connecting the lower portions of the panels. FIG. 58A illustrates an example of the plot of the side-front panel 5505 and FIG. 58B illustrates an example of the plot for the central-front panel 5500 (2D-plot). The horizontal line extends in both the positive axis direction and the negative axis direction. In FIG. 58A, FIG. 58B, FIG. 58D and FIG. 58E, the panels (e.g., 5505, 5500, 5510 and 5515) are centered with respect to the division of the sub-panels (e.g., 22.5°, 67.5°, 337.5°, 292.5°) In other words, 0 (on the horizontal axis) corresponds to the division of the sub-panels and the arc length of the portion of the horizontal slice for one of the subpanels extends in the negative axis direction and the arc length of the portion of the horizontal slice for the other of the subpanels extends in the positive axis direction. For example, the arc lengths of the portion of the horizontal slices between 22.5° and 45° for the side-front-first sub-panel extending in the positive axis direction and the arc lengths for the portion of the horizontal slices between 0° and 22.5° for the side-front-second sub-panel extend in the negative axis direction.

FIG. 58C illustrates an example of the plot of a combined front panel 5800. The combination is created by connecting the positive side of the side-front panel 5505 to the negative side of the central-front panel 5500 (positive side refers to the positive numbers on the axis and the negative side refers to the negative numbers of the axis).

FIG. 58F illustrates an example of the plot of a combined back panel 5805. The combination is created by connecting the positive side of the side-back panel 5510 to the negative side of the central-back panel 5515.

Figure 59:
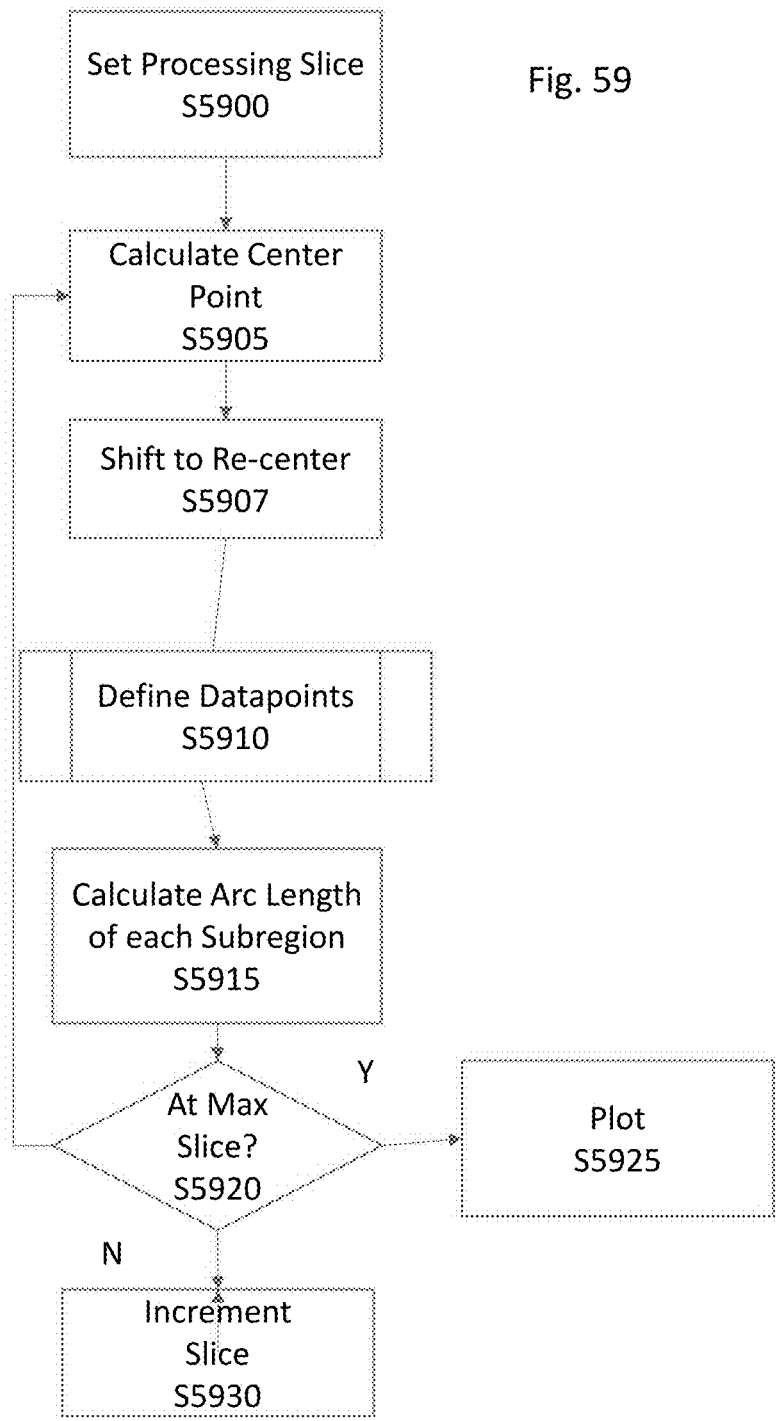
FIG. 59 illustrates an example of a method for processing the second processing portion in accordance with aspects of the disclosure to generate custom-fit pattern(s) in accordance with aspects of the disclosure.

FIG. 59 illustrates an example of a method for processing the second processing portion 5205 (e.g., one leg) in accordance with aspects of the disclosure. The second processing portion 5205 is also divided into horizontal slices $S_L$. In an aspect of the disclosure, 100 horizontal slices may be used. However, the division is not limited to 100 and more or less horizontal slices $S_L$ may be used.

At S5900, the processor 14 sets the processing slice to a first processing slice. In an aspect of the disclosure, the processing may start at the lowest horizontal slice and work upward. However, in other aspects, the processing may start at the uppermost horizontal slice and work downward. The setting of the processing slice to a minimum may be replaced with set to maximum.

At S5905, the processor 14 calculates a center point 6100 for the horizontal slice. The center point 6100 may be determined by averaging the coordinates for the surface points in the x-direction and averaging the coordinates for the surface points in the y-direction for the horizontal slice.

Preferably (but optional), at S5907 the processor 14 may shift the center point 6100 such that it intersects the origin (x=0, y=0) and subsequently shifts all of the surface points by the same amount. The shift makes the calculation of the distance easier.

At S5910, the processor 14 determines the datapoints for the horizontal slice. The number of datapoints for the slice (N") may be 360 (e.g., every 1°). However, in other aspects, less datapoints may be determined for each slice such as every 2°, 5°, 10°. The value associated with the datapoint may be determined in a similar manner as described above in FIG. 9 (steps S908, S910, and S912). S908, S910, and S912 are repeated for each datapoint N" (changing the section and angle of processing).

Once all N" datapoints are determined, the processor 14 divides the horizontal slice into subregions at S5915 (Subregion 61-1 through Subregion 6104). In some aspects, each slice is divided into four equal angular regions such as 0° to 90°, 91° to 180°, 181° to 270° and 271° to 360°. Each subregion 61-1, 61-2, 61-3, 61-4, is respectively assigned to a panel for the pattern. The leg has four panels: leg side-front panel 6000, leg central-front panel 6005, leg central-back-panel 6010 and leg side-back panel 6015 (an example of which are shown in FIG. 60A and FIG. 60B). These four panels correspond, respectively, to the four panels in the first processing portion 5200 (the relationship is shown in FIG. 60A

Also, at S5915, the processor 14 calculates the arc lengths for each of the four subregions 61-1, 61-2, 61-3, 61-4, respectively, for the processing slice. Thus, per slice, the processor 14 calculates 4 arc lengths. The arc lengths may be stored in the memory 16 associated with the horizontal slice. The datapoints may also be stored in the memory 16. FIG. 61 illustrates an example of the four subregions for a horizontal slice. FIG. 61 also illustrates an example of a center point 6100 for the horizontal slice. In FIG. 61, the center point 6100 is at the origin (0,0).

At S5920, the processor 14 determines whether all of the horizontal slices in the second processing portion 5205 have been processed. As noted above, the first processing slice may be a lowest slice and work upward or vice versa, therefore at S5920, the processor 14 may determine whether the processing slice is the maximum or minimum slice. When all horizontal slices have been processed ("Y" at S5920), the processor 14 created the pattern for the second processing portion 5205 at S5925 by plotting the arc lengths for the horizontal slices.

When all horizontal slices have not been processed, the processor 14 increments (or decrements if started at the topmost slice and working downward) the horizontal slice to the adjacent slice at S5930 and the process returns to S5905.

At S5925, the processor 14 creates the plot for the leg portion (second processing portion 5205) using the calculated arc lengths for the subregions 61-1-61-4, respectively, for each horizontal slice in the second processing portion 5205. In an aspect of the disclosure, the processor 14 may separately plot the front and back of the leg. For example, the leg side-front panel 6000 and leg central-front panel 6005 combine to form the leg-front panel 6200 (an example of which is illustrated in FIG. 62A) and the leg central-back panel 6010 and the leg side-back panel 6015 combine to form the leg-back panel 6205 (an example of which is illustrated in FIG. 62B). The combined arc lengths of subregions, 61-2 and 61-4 are the width of the leg-front panel 6200 and combined arc lengths of subregions 61-1 and 61-3 are the width of the leg-back panel 6205 (per slice) (x-direction). The horizontal slice (z-coordinate defines the y-coordinate of the parallel line in the 2D plot). The lines for the same horizontal slice have the same y-coordinate in the 2D plot. In the example, since the center point 6100 is (0,0), the lines extend from an x value of 0 (in opposite directions).

Lines for the leg side-front panel 6000 extend in the negative axis direction (negative x values) and lines for the leg central-front panel 6005 extend in the positive axis direction (positive x values) in the plot. Similarly, lines for the leg side-panel panel 6015 extend in the negative axis direction (negative x values) and lines for the leg central-back panel 6010 extend in the positive axis direction (positive x values).

Figure 63A:
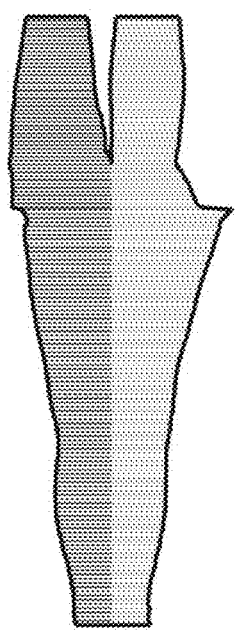
FIG. 63A illustrates an example of a front of a pants panel in accordance with aspects of the disclosure and FIG. 63B illustrates an example of a preliminary back of a pants panel in accordance with aspects of the disclosure.
Figure 63B:
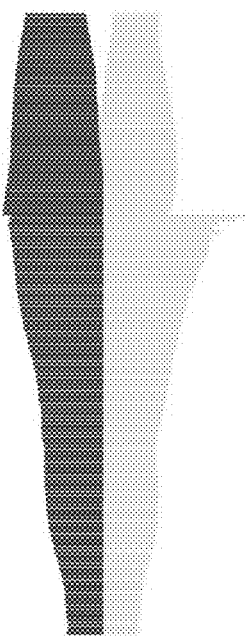

The processor 14 then combines the leg-front panel 6200 with the combined front panel 5800 to create the front of the pants panel 6300 (such as illustrated in FIG. 63A) and combines the leg-back panel 6205 with the combined back panel 5805 to create the back of the pants panel 6305 (such as illustrated in FIG. 63B) (preliminary).

The panel(s) and pattern(s) may also be for shorts and capris; however, the lower cutoff for the legs would be higher. The panel(s) and pattern(S) may also be for skirts.

In an aspect of the disclosure, the back of the panel 6305 may need to be modified at the crotch area. Modification of the back of the panel may not be needed if the panel is for a skirt. In an aspect of the disclosure, the leg-back panel 6205 may be rotated by a determined angle.

Figure 64:
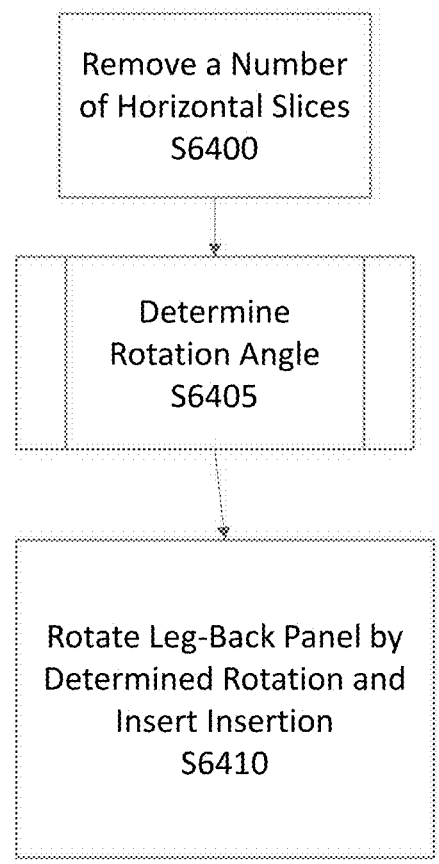
FIG. 64 illustrates an example of a method for modifying the back of the pants panel in accordance with aspects of the disclosure.

FIG. 64 illustrates an example of a method for modifying the back of the pants panel in accordance with aspects of the disclosure. At S6400, the processor 14 removes from the plot of the back of the pants pattern a number of lines corresponding to a number of horizontal slices. As seen in FIG. 63B, the top slices of the central back panel may be much longer than other slices. This may be because the unwrapping may capture points on the hip region. The removal of the lines removes these slices.

In some aspects of the disclosure, the preset number of horizontal slices is 2. However, the number is not limited to 2 and may be based on the differences in the arc lengths between adjacent horizontal lines in the central back panel. The lines are removed from the leg-back panel 6205. Specifically, the uppermost lines in the plot of the leg-back panel 6205 are removed, e.g., top two lines.

At S6405, the processor 14 determines the rotation angle. In an aspect of the disclosure, the rotation angle is to account for the space for an insert 6500 to be added into the panel 6305. The insert 6500 is added between the leg-back panel 6205 and combined back panel 5805.

In some aspects, the insert 6500 may be a right triangle. FIG. 65A illustrates an example of the insert 6500 between the two parts of the panels. In FIG. 65A only a portion of the panels 6205 and 5805 are shown. The right triangle has sides A'D, A'C and DC. The right angle of the right triangle is DA'C.

The angle of rotation as mentioned above is formed from sides A'D and DC and will be referred to as angle A'DC. A'D is the arc-length of the bottom hip slice (line on the 2D plot) of the combined back panel 5805, which was previously determined (which can be retrieved from memory 16).

B'D is the arc-length of the top remaining slice (leg-slice) (line on the 2D plot) in the leg-back panel 6205 (after lines on the 2D plot are removed) (which can also be retrieved from memory 16).

The processor 14 also determines the distance between two specific datapoints, Datapoint A and Datapoint B on the surface of the body in the 3D image. Datapoint A is the datapoint at the center back (e.g., 270°) on the bottom slice of the first processing portion 5200 (hip portion). Datapoint B is the datapoint on the top remaining slice (leg-slice) on the leg-back panel 6205 at the inseam (e.g., 180°). FIG. 65B illustrates an example of the locations of the two specific datapoints A and B.

The processor 14 retrieves the three-dimensional coordinates of the Datapoints A, B from memory 16 and calculates the distance, e.g., distance AB. The length of A'C+B'C equals the calculated distance AB to match the body shape.

Since the insert 6500 may be a right triangle, the relationship between sides is:

$$A'C^2 + A'D^2 = DC^2.$$

The length of B'C may be defined as "X", then A'C may be defined as AB-X and DC may be defined as B'D-X. Since the length of A'D is known (previously determined), the processor 14 can determine X and thus the lengths of all of the sides of the insert 6500 can be determined. Once the lengths of the sides of the insert 6500 are determined, the rotation angle can be calculated based of the ratio such as either the SIN, COSINE or TANGENT of ratios of the sides of the insert 6500.

At S6410, the processor 14 rotates the leg-back panel (with the removed lines) by the determined rotation angle and inserts the insert 6500 between the combined back panel 5805 and the rotated leg-back panel. FIG. 66 illustrates an example of the final back panel 6600.

In accordance with aspects of the disclosure, as described above, customized panels and patterns may be created for garments based on analyzing a 3D image of an individual. These customized panels and patterns may be generated from sorted datapoints from the 3D image such as illustrated in FIG. 27 (bodice pattern), FIGS. 46A and 47C (sleeve patterns) and FIG. 63A and FIG. 66 (pants) (datapoints may be adjusted for shoulder regions too). The customized panels and patterns may also be generated from adjusting the sorted datapoints for one or more reasons such as for fabric drape such as illustrated in FIG. 35A (bodice pattern) and FIG. 46B (sleeve pattern). The customized panels and patterns may be also generated by changing one or more processing parameters such as separation angles for defined regions/subregions/panels and separation angles for different horizontal slices such as in FIGS. 31A and 32A, respectively (bodice patterns). These panels and patterns may be referred to as basic panels and patterns for the individual. However, in other aspects of the disclosure, once these panels and patterns have been created as described above, the panels and patterns may be further modified to create different stylistic panels and patterns for the same basic panels and patterns.

For example, in an aspect of the disclosure, the boundaries (e.g., width of each panel in certain areas (e.g., side-front combination 2700, central-front combination 2705, central-back combination 2715 and side-back combination 2710) may be adjusted to create customized seamlines.

In an aspect of the disclosure, an operator may select a stored basic pattern from memory 16 for adjustment. The basic pattern may be displayed on the display 16.

Figure 67:
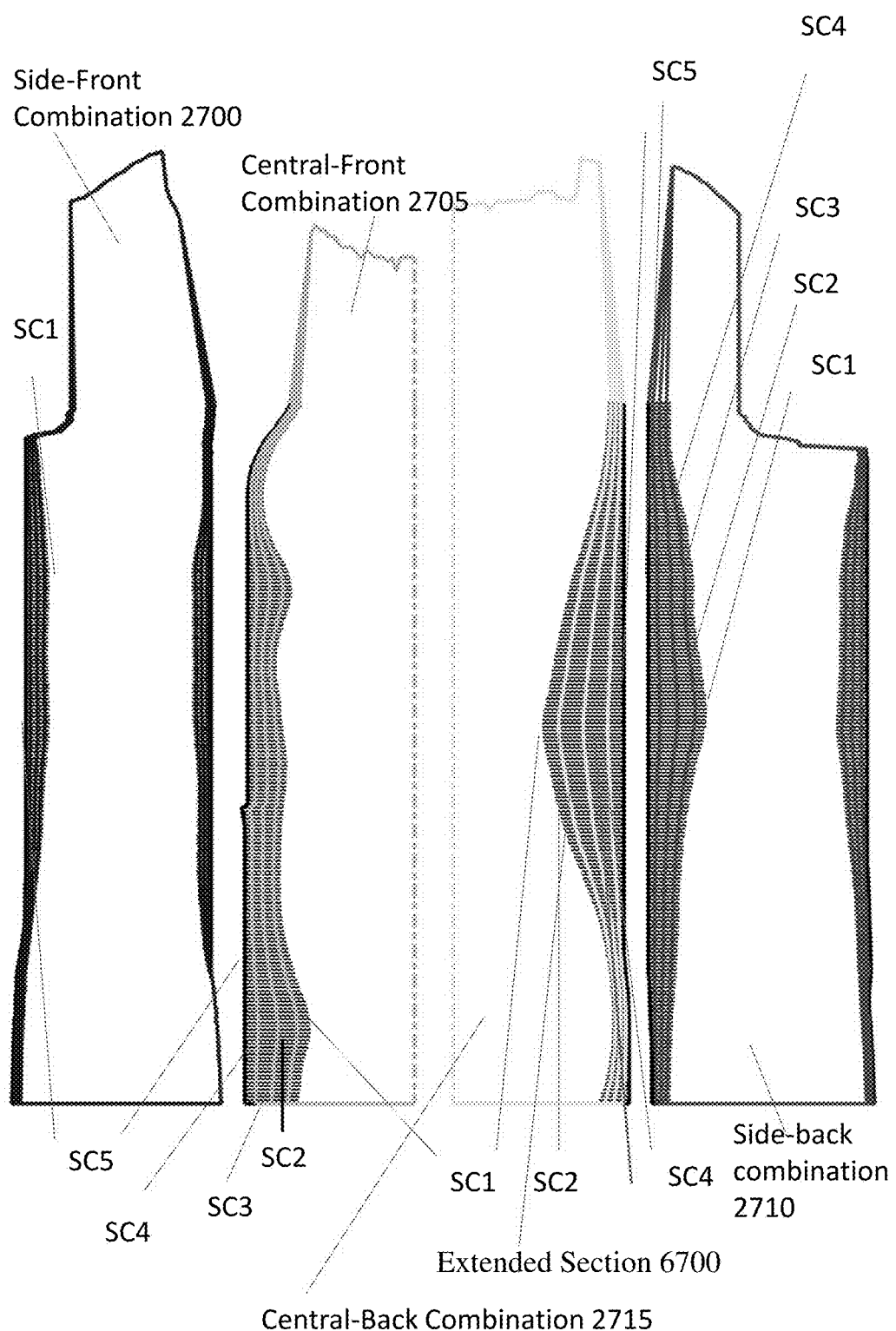
FIG. 67 illustrates an example of the plurality of difference seam combinations in accordance with aspects of the disclosure.

In as aspect of the disclosure, a plurality of different seamline combinations (SC) may be superposed on the basic pattern. FIG. 67 illustrates an example of the plurality of difference seamline combinations, e.g., SC1-SC5. While FIG. 67 illustrates 5 different seamline combinations, these are presented only for descriptive purposes, there may be a different number of available seamline combinations. In FIG. 67, SC 1 is the seamline combination for the basic pattern, e.g., no adjustment. SC 5 is the seamline combination which corresponds to a bodice pattern accounting for drape (e.g., equivalent to FIG. 35A). SC2-SC4 are different seamline combinations of width ratios between the basic pattern and the drape pattern. The darker portion in FIG. 67 represents an extended section 6700, e.g., the section of the panels which would be extended or modified based on a different seamline combination. The maximum extension corresponds to the seamlines when maximum draping is incorporated (SC5). The extended section 6700 is different for each panel and for each horizontal slice. However, the ratio of the extension with respect to the maximum extension of the same panel of the same horizontal slice is consistent across the panels. For example, if SC2 extends to 25% of the maximum extension for the central-front-panel, it would extend 25% of the corresponding maximum extension for the other panels as well.

In an aspect of the disclosure, when the operator selects a seamline combination or an extension ratio with respect to the maximum extension, the dimensions of panels may change on the display 18 such that the new seamline pattern may be confirmed. For example, the darker lines in the display may change to the white to be consistent with the remaining portion of the panels. If the new seamline pattern is confirmed, the new bodice pattern may be stored in memory 16 as a different pattern.

In another aspect of the disclosure, instead of displaying available SCs such as shown in FIG. 67, the operator may use an input device such as a mouse and manual adjust the seamline combinations as desired, e.g., move the boundary of one of the panels as desired. When the operator moves the boundary of one of the panels, the boundary of the other panels (which is combined with the panel) may automatically change as well.

In another aspect of the disclosure, the basic bodice pattern may be changed to create different darts. Darts are folds (tucks coming to a point) sewn into fabric to take in ease and provide shape to a garment. The two sides of a dart are sewn together. For example, different darts may be created where two adjacent panels are combined and the touching seamlines merged. As described above, such as shown in FIG. 28 and FIG. 29, there are seamlines to connect the panels. e.g., the side-front combination 2700 and the central-front combination 2705 or the central-back combination 2715 and the side-back combination 2710. However, in an aspect of the disclosure, the side-front combination 2700 may be merged with the central-front combination 2705, and the central-back combination 2715 may be merged with the side-back combination 2710. The panels are merged by bringing the two panels as close as possible horizontally and side-by-side without overlapping.

Figure 68A:
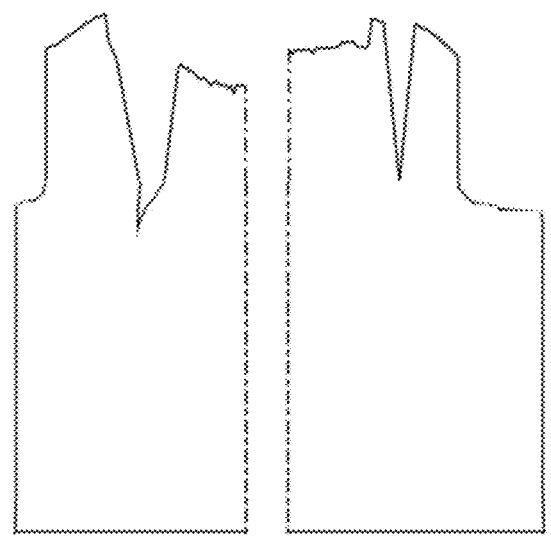
FIGS. 68A-68C illustrate different examples of darts in accordance with aspects of the disclosure.
Figure 68B:
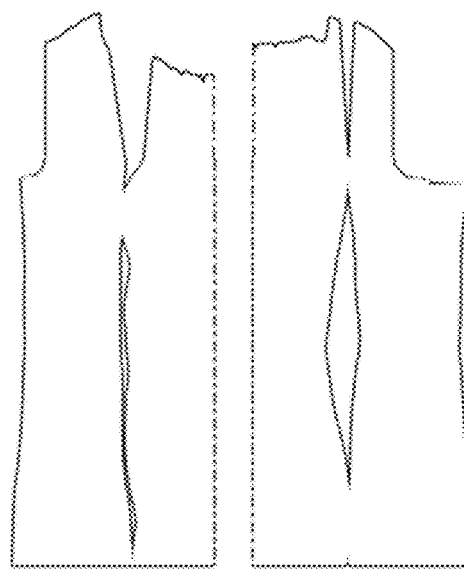
Figure 68C:
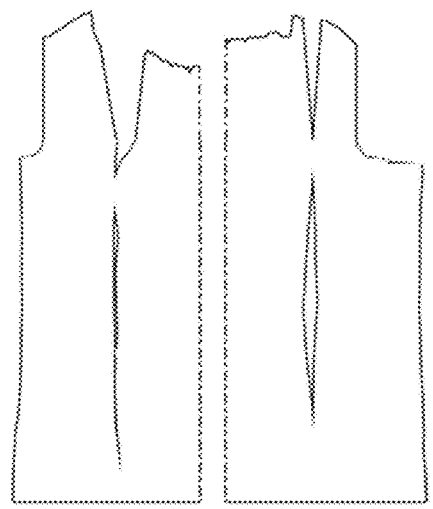

In an aspect of the disclosure, FIG. 68A corresponds to the panels with maximum drape incorporated (e.g., also corresponds to SC5 in FIG. 67). In FIG. 68A, the princess seams below the bust level are touching and merged between the central and side panels, either in the front or in the back. Princess seams refer to the seamlines located at angles 45° and 315°, i.e., the seamlines between the central panel and the side panel, either in the front or in the back. The seamline between the side panels is called side seam. FIG. 68B and FIG. 68C correspond to different seamline combinations in FIG. 67. The seamline combinations that are less extended would result in larger darts and vice versa.

In an aspect of the disclosure, the system or device may be used to define one or more design paths and subsequently apply the same design path(s) to basic patterns created in accordance with aspects of the disclosure. For example, the memory 16 may contain a library of design paths to achieve a variety of styles from the basic patterns. Body scans of different individuals may be collected and processed so that basic patterns may be generated for each individual and stored in memory 16, e.g., a plurality of bodice patterns for a plurality of individuals. A mass production of custom-fit patterns with varying styles can be achieved for different individuals by applying one or more design paths to the basic patterns of the individuals.

Figure 69:
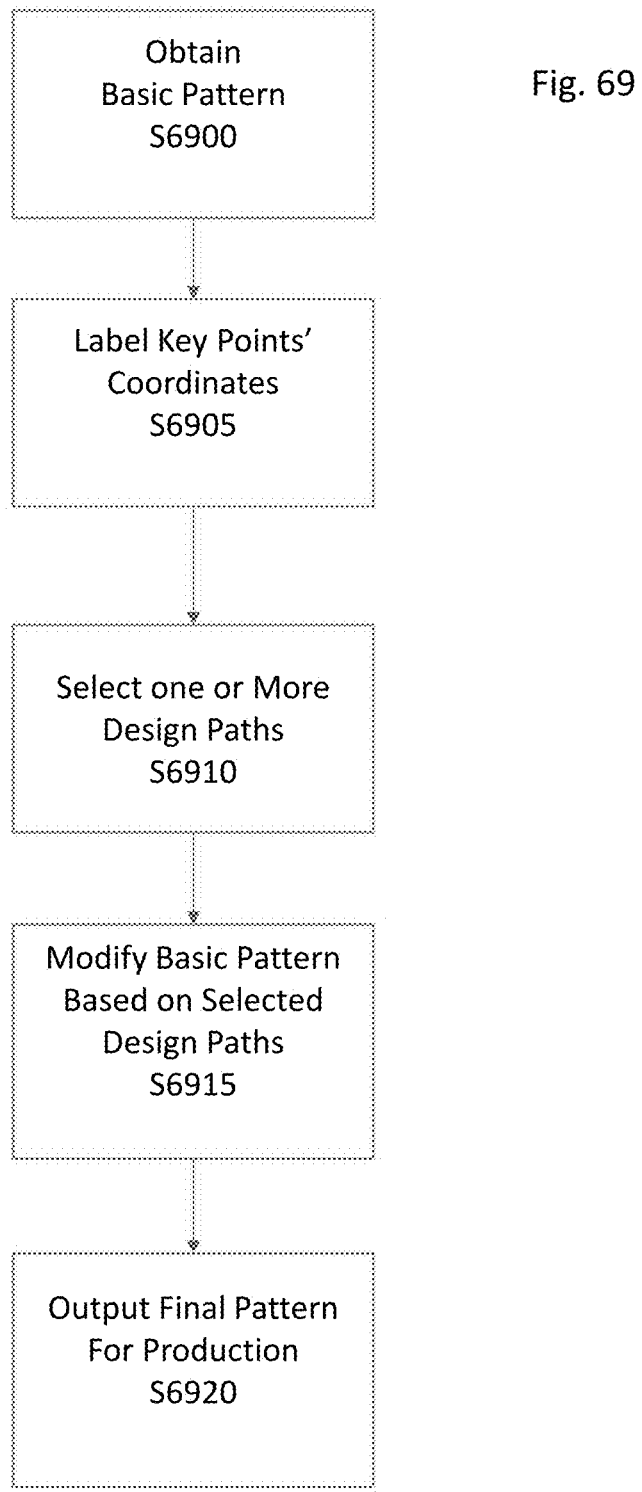
FIG. 69 illustrates an example of a method for further customizing a custom-fit basic pattern in accordance with aspects of the disclosure.

FIG. 69 illustrates an example of a method for further customizing a custom-fit basic pattern in accordance with aspects of the disclosure. In an aspect of the disclosure, the processor 14 displays on the display 18 a list of styles of which design paths are available in the memory 16 (library). The operator may select one or more styles from the list. Each style may be stored in memory 16 with a unique identifier.

In response to a customer submitting their 3D scan, the processor 14 generates the basic patterns and displays them on the display 18 (S6900). At S6905, the key points are labeled, e.g., coordinates. Key points may define the boundary shape. For example, a line in the boundary of a panel may be defined by two key points. Curves may be defined by three or more key points.

At S6910, the processor 14 displays a list of available design paths. Each design path may be identified by a unique name. A design path used herein is a step-by-step description of points and modifications for the same to create the design. The design paths may modify the boundary lines, seamlines, dart lengths and/or dart width. They may also include the design of pockets, lapels, vents, button holes, pleats, darts for handkerchief, ribs, belt lines, etc. The step-by-step process may include adding a new point, moving a point, connecting two or more points, and other processing to achieve the final design.

This design path only needs to be defined based on one set of standard basic patterns or on the basic patterns of one individual and stored.

The operator may select one or more design paths S6910. At S6915, in response to the selection of the one or more design paths, the processor 14 modifies the basic pattern based on the selected one or more design paths. In particular, the processor 14 performs the step-by-side process to create the final pattern.

At S6920, the processor 14 displays the final pattern. In an aspect of the disclosure, the operator may confirm the final pattern. Once confirmed, the final pattern may be stored in memory 16. In an aspect of the disclosure, the final pattern may be transmitted by the processor 14 to a cutting machine, sewing machine etc. for fabricating the garment having the final pattern.

In the figures, the first processing portion is illustrated as being processed first and followed by the processing of the second processing portion. However, the order is not limited to the order illustrated in the figures.

In an aspect of the disclosure, the coordinate of points of the surface may be adjusted or modified. The points may be surface points as described herein before sorting and defining or datapoints as described herein after sorting and defining.

In the discussion and claims herein, the term "about" indicates that the value listed may be somewhat altered, as long as the alteration does not result in nonconformance of the process or device. For example, for some elements the term "about" can refer to a variation of ±0.1% for other elements, the term "about" can refer to a variation of ±1% or ±10%, or any point therein. For example, the term about when used for a measurement in mm, may include +/0.1, 0.2, 0.3, etc., where the difference between the stated number may be larger when the state number is larger. For example, about 1.5 may include 1.2-1.8, where about 20, may include 19.0-21.0.

Reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description but is not intended to be exhaustive or limited to the invention in the form disclosed. Many modifications and variations will be apparent to those of ordinary skill in the art without departing from the scope and spirit of the disclosure. Aspects were chosen and described in order to best explain the principles and the practical application, and to enable others of ordinary skill in the art to understand the invention for various embodiments with various modifications as are suited to the particular use contemplated.

What is claimed is:

1. A method for generating custom-fit garment patterns comprising:
   receiving, by a processor, a three-dimensional image, the three-dimensional image including one or more body parts of a body;
   identifying a target region in the three-dimensional image;
   dividing along a dividing plane the target region into at least a first target portion and a second target portion,
   for the first target portion,
   identifying, by the processor, a number of datapoints on a surface of the first target portion, where the datapoints are arranged in a plurality of horizontal slices, where each horizontal slice contains datapoints in the same plane,
   dividing half of the first target portion into a plurality of subregions, the plurality of subregions being based on angular position with respect to a central axis, where the central axis is parallel to a longitudinal axis of the body,
   for each subregion,
   unwrapping, by the processor, the three-dimensional image by determining at least one arc length associated with each horizontal slice in the subregion using the identified datapoints for the respective slice; and
   generating, by the processor, a first portion based on the at least one arc length for each slice and the respective slice,
   for the second target portion,
   identifying, by the processor, a number of second datapoints, where the second datapoints are arranged in a plurality of vertical slices, where each vertical slice contains second datapoints in the same plane, the second datapoints including interpolated points,
   dividing half of the second target portion into a plurality of second subregions, respectively corresponding to the plurality of subregions in the first target portion;
   for each second subregion,
   assigning vertical slices to a respective second subregion;
   determining, by the processor, a length of a curve orthogonal to the vertical slices, the curve connecting a respective second datapoint in each vertical slice in the respective second subregion, the second datapoint being at a preset angle with respect to a reference point for each vertical slice, each reference point being on the dividing plane;
   determining, by the processor, an arc length associated with each vertical slice in the respective second subregion using the second datapoints for the respective vertical slice with respect to the reference point for each vertical slice, including the interpolated points;
   determining, by the processor, a length of an accumulative curve connecting tops of lines representing the arc lengths of the vertical slices, the lines representing the arc length extend orthogonally from a base, where the base intersects the dividing plane;
   determining a ratio of the length of the curve and the length of the accumulative curve;
   adjusting, by the processor, the position of the top portion of each line representing the arc length of vertical slices, respectively, based on the ratio;
   recalculating, by the processor, the arc length associated with each vertical slice in the respective subregion using the second datapoints for the respective vertical slice without the interpolated points; and
   generating, by the processor, a second portion based on the recalculated arc length for each vertical slice and the adjusted position; and
   for each subregion and its corresponding second subregion, combining the first portion and the second portion to generate a combined panel of a pattern.

2. The method of claim 1, wherein the central axis is determined by the processor by:
   determining a first average value of surface points in first target region in a first direction, the first direction being orthogonal to the longitudinal axis of the body; and
   determining a second average value of surface points in the first target region in a second direction orthogonal to the first direction and orthogonal to the longitudinal axis of the body, where the central axis is the intersection of the first average value and the second average value, and the central axis is orthogonal to the first and second directions.

3. The method claim 2, wherein the method further comprises shifting, by the processor, the first target region to align the central axis with a zero coordinate in the first direction and a zero coordinate in the second direction.

4. The method claim 1, wherein the target region comprises a torso and a shoulder area, wherein the torso is the first target portion and wherein the shoulder area is the second target portion.

5. The method of claim 4, wherein the identification of the target region comprises the processor removing areas outside the torso and the shoulder area included in the three-dimensional image including limbs and a head.

6. The method of claim 4, further comprising defining a neckline in the three-dimensional image.

7. The method of claim 6, wherein defining the neckline comprises rotating the three-dimensional image, selecting points in the three-dimensional image and deleting the selected points.

8. The method of claim 4, wherein dividing the target region into the first target portion and the second target portion divides the three-dimensional image into the torso and the shoulder area based on a ratio using a dividing plane and wherein the dividing plane is orthogonal to the central axis.

9. The method of claim 1, further comprising determining another central axis.

10. The method of claim 1,
   wherein the identifying, by the processor, the number of datapoints on the surface of the first target portion comprises partitioning, by the processor, each horizontal slice into a plurality of portions based on a fixed angular interval, wherein each portion corresponds to an angle value, and each portion includes a set of points;

for each portion on each horizontal slice:
  determining, by the processor, an average distance among distances of the set of points with respect to the central axis; and
  setting, by the processor, a point associated with the average distance as a datapoint represented by the angle value corresponding to the portion, where the datapoint is one of the number of datapoints identified;
wherein the identifying, by the processor, the number of second datapoints of the second target portion comprises partitioning, by the processor, each vertical slice into a plurality of portions based on a fixed angular interval, wherein each portion corresponds to an angle value, and each portion includes a set of points;
for each portion on each vertical slice:
  determining, by the processor, an average distance among distances of the set of points with respect to the reference point for each slice; and
  setting, by the processor, a point associated with the average distance as a datapoint represented by the angle value corresponding to the portion, where the datapoint is one of the number of second datapoints identified, wherein certain portions corresponding to an angle value, respectively, contain points which have be interpolated from other points.

11. The method of claim 10, wherein the subregions for the first target portion include a side-front panel, a central-front panel, a central-back panel and a side-back panel.

12. The method of claim 11, wherein for the side-front panel and the side-back panel, two arc lengths are calculated for each horizontal slice corresponding to angular regions.

13. The method of claim 12, wherein the generating the first portion of the panel for the pattern comprises plotting a two-dimensional plot using the at least one arc length for a respective horizontal slice, for each horizontal slice, wherein the lines representing arc lengths extend orthogonally from a vertical axis, lines representing the arc lengths for different horizontal slices are offset from each other and wherein when there are two arc lengths per slice for a subregion, the lines representing the arc lengths for the same horizontal slice extend in opposite directions with respect to the vertical axis.

14. The method of claim 13, further comprising determining, by the processor, which horizontal slices correspond to an armhole, wherein the generating of the first portion by the processor comprises adjusting the lines representing the arc lengths from extending from the vertical axis to extending from a preset position toward the vertical axis.

15. The method of claim 1, wherein the assigning vertical slices to a respective second subregion, comprises determining a ratio of arc lengths of the top horizontal slice of adjacent subregions, the ratio being for adjacent subregions in a first direction, and assigning the number of slices based on the ratio.

16. The method of claim 15, wherein lines representing the at least one arc length of the top horizontal slice of a corresponding subregion is the base for the lines representing the arc length for the corresponding second subregion.

17. The method of claim 16, wherein the second subregions for the second target portion include a central-front shoulder, a side-back shoulder, a side-front shoulder, and a central-back shoulder, wherein a central-front panel is combined with the central-front shoulder to form a first combined panel for the pattern, wherein a side-front panel is combined with the side-front shoulder to form a second combined panel for the pattern, wherein a central-back panel is combined with the central-back shoulder to form a third combined panel for the pattern and wherein a side-back panel is combined with the side-back shoulder to form a fourth combined panel the pattern.

18. The method of claim 1, further comprising modifying coordinates of surface points or at least one of datapoints on a surface of the target portion prior to determining arc lengths.

19. The method of claim 18, wherein the modifying accounts for a representation of a fabric drape.

20. The method of claim 19, wherein the modifying comprises:
  converting surface points or datapoints in the first target portion into polar coordinates with a reference point for each horizontal slice as the origin, the reference point for each horizontal slice intersecting the central axis and the respective horizontal slice, wherein the polar coordinates contain an angle and a corresponding radius associated with a surface point or datapoint at the angle and a coordinate in a direction of the central axis,
  identifying the horizontal slice with a maximum coordinate in a direction of the central axis, the horizontal slice with the maximum coordinate being closest to the second target portion and for each angle:
  starting from the horizontal slice with the maximum coordinate, comparing the corresponding radius for the horizontal slice with the corresponding radius of the adjacent horizontal slice, when the corresponding radius of the adjacent horizontal slice is less than the corresponding radius for the same angle, changing the corresponding radius to a new radius value for the adjacent horizontal slice; and
  repeating comparing of the corresponding radius for the same angle for adjacent horizontal slices moving downward in the direction of the central axis, wherein when the corresponding radius for the same angle increases for the subsequent adjacent horizontal slice from the corresponding radius in a larger coordinate in the direction of the central axis, changing the corresponding radius to the new radius value for the same surface point or datapoint for each subsequent horizontal adjacent slice until the corresponding radius value for the same angle is greater than the new radius value.

21. The method of claim 20, further comprising converting coordinates to a cartesian coordinate system using the new radius values.

22. The method of claim 18, wherein the modifying is based on a fabric type or a garment type and the modifying comprises adjusting surface points or datapoints using a scaling factor.

23. The method of claim 18, wherein the modifying is based on a body part.

24. The method of claim 23, wherein the modifying comprises determining a location of a landmark, determining a length parameter of the landmark, adding a value to the length parameter and generating a scaling factor based on a ratio of the length parameter and the added value and the length parameter and adjusting datapoints or surface points based on the ratio with an area of the target region.

25. The method of claim 24, wherein the body part is the bust region, and wherein the modifying further comprises horizontally slicing the second target portion and determining surface points or additional datapoints and adjusting the surface points or additional datapoints on the lowest slice of the second target portion based on the ratio and gradually adjusting surface points or the additional datapoints on the other horizontal slices in the second target portion by a reduced scaling factor.

26. The method of claim 18, wherein the modifying comprises adjusting a coordinate associated with a second direction for surface points or datapoints in a horizontal slice between two datapoints or surface points having the maximum absolute value coordinate associated with the second direction for the horizontal slice in the front and adjusting a coordinate associated with a second direction for datapoints or surface points in a horizontal slice between two datapoints or surface points having the maximum absolute value coordinate associated with the second direction for the horizontal slice in the back, for each horizontal slice.

27. The method of claim 23, wherein the modifying comprising determining a location of a landmark, determining a length parameter of the landmark, subtracting a value from the length parameter and generating a scaling factor based on a ratio of the length parameter and the length parameter after subtraction and adjusting data points based on the ratio within an area of the target region.

28. The method of claim 1, wherein each of the plurality of subregions in the first target portion is 45°.

29. The method of claim 1, wherein different horizontal slices in the first target portion are divided into the plurality of subregions at different angles.

30. The method of claim 17, further comprising combining the first combined panel and the second combined panel and combining the third combined panel and the fourth combined panel.

31. A method for generating custom-fit sleeve patterns comprising:
  receiving, by a processor, a three-dimensional image, the three-dimensional image including one or more body parts of a body;
  identifying a target region in the three-dimensional image;
    determining a central axis in the target region;
      dividing along a dividing plane the target region into at least a first target portion and a second target portion;
      for the first target portion:
        identifying, by the processor, a number of datapoints on a surface of the first target portion, where the datapoints are arranged in a plurality of slices, where each slice contains datapoints in the same plane;
        dividing the first target portion into a plurality of subregions,
        for each subregion,
        unwrapping, by the processor, the three-dimensional image by determining an arc length associated each slice in the subregion using the identified datapoints for the respective slice; and
        generating, by the processor, a first portion of the pattern based on the arc length for each slice and the respective slice,
        combining the first portion for each subregion to obtain a combined first portion, for the second target portion:
        identifying, by the processor, a number of second datapoints on a surface of the second target portion, where the second datapoints are arranged in a plurality of second slices, where each second slice contains second datapoints in the same plane;
      determining, by the processor, a length of a curve connecting a respective second datapoint in each second slice, the second datapoint being at a preset angle with respect to the central axis, repeating for each preset angle around the central axis;
    generating, by the processor, a second portion of the pattern based on the length of the curve at each preset angle; and
    combining, by the processor, the combined first portion and the second portion of the pattern.

32. A method for generating custom-fit patterns for pants comprising:
  receiving, by a processor, a three-dimensional image, the three-dimensional image including one or more body parts of a body;
  identifying a target region in the three-dimensional image;
  dividing along a dividing plane the target region into a leg portion and a hip portion, the leg portion having image data for one leg;
  for the hip portion:
    identifying, by the processor, a number of datapoints on a surface of the hip portion, where the datapoints are arranged in a plurality of horizontal slices, where each horizontal slice contains datapoints in the same plane, the datapoints being with respect to a central axis, the central axis being parallel to a longitudinal axis of the body;
    dividing half of the hip portion into a plurality of subregions based on angular position with respect to the central axis;
    for each subregion:
    unwrapping, by the processor, the three-dimensional image by determining two arc lengths associated each horizontal slice in the subregion using the identified datapoints for the respective horizontal slice; and
    generating, by the processor, a first portion based on the two arc lengths for each horizontal slice in the subregion and the respective slice;
    combining the first portion for adjacent subregions in the front and adjacent subregions the back to obtain combined first portions,
  for the leg portion:
    identifying, by the processor, a number of leg datapoints on a surface of the leg portion, where the leg datapoints are arranged in a plurality of leg slices, where each leg slice contains leg datapoints in the same plane, the leg datapoints being with respect to a respective central point for each leg slice;
    dividing each leg slice into a plurality of sub-slices based on angular position with respect to the respective central point to generate a plurality of leg subregions, the leg subregions having corresponding sub-slices with the same angular position with respect to the respective central point,
    calculate an arc length of each sub-slice for each leg slice;
    for each leg subregion, generating, by the processor, a second portion based on the calculated arc length for each sub-slice in the subregion and slice;
  combining the second portion for adjacent subregions in the front and adjacent subregions the back to obtain combined second portions; and
  combining one of the combined first portions with a corresponding one of the combined second portions and combining another of the combined first portions with another corresponding one of the combined second portions.

* * * * *